US011591990B2

(12) United States Patent
Cronin et al.

(10) Patent No.: US 11,591,990 B2
(45) Date of Patent: Feb. 28, 2023

(54) LOW EMISSION ADSORBENT AND CANISTER SYSTEM

(71) Applicant: INGEVITY SOUTH CAROLINA, LLC, North Charleston, SC (US)

(72) Inventors: Stephan Charles Cronin, Summerville, SC (US); Marta Leon Garcia, Mount Pleasant, SC (US); Laurence H. Hiltzik, Charleston, SC (US); Eyma Y. Marrero-Alfonso, Charleston, SC (US); Erik W. Versen, Charleston, SC (US); James R. Miller, Mount Pleasant, SC (US); Roger S. Williams, Daniel Island, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 17/216,361

(22) Filed: Mar. 29, 2021

(65) Prior Publication Data

US 2021/0317803 A1 Oct. 14, 2021

Related U.S. Application Data

(60) Provisional application No. 63/111,768, filed on Nov. 10, 2020, provisional application No. 63/001,164, filed on Mar. 27, 2020.

(51) Int. Cl.
*F02M 1/00* (2006.01)
*F02M 25/08* (2006.01)
(Continued)

(52) U.S. Cl.
CPC ..... *F02M 25/0854* (2013.01); *B01D 53/0415* (2013.01); *B01D 53/0446* (2013.01);
(Continued)

(58) Field of Classification Search
CPC ........ F01D 3/00; F01D 3/0897; F01D 3/0828; F02M 25/0854; F02M 25/0872
(Continued)

(56) References Cited

U.S. PATENT DOCUMENTS 4,894,072 A 1/1990 Turner et al.
5,204,310 A 4/1993 Tolles et al.
(Continued)

FOREIGN PATENT DOCUMENTS

EP 1788230 A1 5/2007
EP 1508686 B1 4/2008
(Continued)

OTHER PUBLICATIONS

Burchell, T.D., "Carbon Material for Advanced Technologies" 1999, pp. 252-253 (1999).
(Continued)

*Primary Examiner* — John Kwon
(74) *Attorney, Agent, or Firm* — Bryan D. Zerhusen; Cantor Colburn LLP

(57) ABSTRACT

The present description provides low DBL bleed emission performance properties that allows the design of evaporative fuel emission control systems that are simpler and more compact than those possible by prior art by inclusion of a vent-side volume comprising a parallel passage adsorbent such as a carbon honeycomb with narrow channel width and low cell pitch.

32 Claims, 46 Drawing Sheets

(51) Int. Cl.
*B01D 53/04* (2006.01)
*B01J 20/20* (2006.01)
*B01J 20/28* (2006.01)
*F02M 35/10* (2006.01)

(52) U.S. Cl.
CPC ......... *B01J 20/20* (2013.01); *B01J 20/28011* (2013.01); *B01J 20/28045* (2013.01); *F02M 25/0872* (2013.01); *F02M 35/10222* (2013.01); *B01D 2253/102* (2013.01); *B01D 2253/3425* (2013.01); *B01D 2257/702* (2013.01); *B01D 2259/40086* (2013.01); *B01J 2220/46* (2013.01); *B01J 2220/66* (2013.01)

(58) Field of Classification Search
USPC .................................................. 123/516, 518
See application file for complete search history.

(56) References Cited

U.S. PATENT DOCUMENTS

| | | |
|---|---|---|
| 5,288,307 A | 2/1994 | Goltz et al. |
| 5,303,547 A | 4/1994 | Mieville et al. |
| 5,338,450 A | 8/1994 | Maurer |
| 5,356,852 A | 10/1994 | DeLiso et al. |
| 5,376,609 A | 12/1994 | Guile |
| 5,451,554 A | 9/1995 | Guile et al. |
| 5,543,096 A | 8/1996 | Wu |
| 5,683,532 A | 11/1997 | Kuma |
| 5,776,227 A | 7/1998 | Meiller et al. |
| 5,910,637 A | 6/1999 | Meiller et al. |
| 5,914,294 A | 6/1999 | Park et al. |
| 5,957,114 A | 9/1999 | Johnson et al. |
| 6,098,601 A | 8/2000 | Reddy |
| 6,171,556 B1 | 1/2001 | Burk et al. |
| 6,248,421 B1 | 6/2001 | Koike et al. |
| 6,279,548 B1 | 8/2001 | Reddy |
| 6,472,343 B1 | 10/2002 | McCrae et al. |
| 6,537,355 B2 | 3/2003 | Scardino et al. |
| 6,540,815 B1 | 4/2003 | Hiltzik et al. |
| 6,695,896 B2 | 2/2004 | Hara et al. |
| 6,699,561 B2 | 3/2004 | Wolff |
| 6,866,699 B2 | 3/2005 | MacDowall et al. |
| RE38,844 E | 10/2005 | Hiltzik et al. |
| 7,077,891 B2 | 7/2006 | Jaffe et al. |
| 7,160,361 B2 | 1/2007 | Meiller et al. |
| 7,160,366 B2 | 1/2007 | Blackburn et al. |
| 7,422,628 B2 | 9/2008 | Foong et al. |
| 7,455,718 B2 | 11/2008 | Ackley et al. |
| 7,597,745 B2 | 10/2009 | Lebowitz et al. |
| 7,666,507 B2 | 2/2010 | Ishikawa et al. |
| 7,753,034 B2 | 7/2010 | Hoke et al. |
| 7,759,276 B2 | 7/2010 | Wolff |
| 7,902,114 B2 | 3/2011 | Keefer et al. |
| 7,989,047 B2 | 8/2011 | Segawa et al. |
| 8,413,433 B2 | 4/2013 | Lupescu |
| 8,709,138 B2 | 4/2014 | Lazarevic et al. |
| 8,814,987 B2 | 8/2014 | Tschantz et al. |
| 8,864,877 B2 | 10/2014 | Nishita et al. |
| 9,174,195 B2 | 11/2015 | Yamasaki et al. |
| 9,322,368 B2 | 4/2016 | Arase et al. |
| 9,457,340 B2 | 10/2016 | Buelow et al. |
| 9,657,691 B2 | 5/2017 | Eguchi et al. |
| 9,732,649 B2 | 8/2017 | Hiltzik et al. |
| 9,835,063 B2 | 12/2017 | Hosoi et al. |
| 9,855,825 B2 | 1/2018 | Felber et al. |
| 9,908,098 B2 | 3/2018 | House et al. |
| 10,150,097 B2 | 12/2018 | Hasumi et al. |
| 10,280,820 B2 | 5/2019 | Hiltzik et al. |
| 10,323,553 B2 | 6/2019 | Hiltzik et al. |
| 10,422,261 B2 | 9/2019 | Hiltzik et al. |
| 10,865,724 B2 | 12/2020 | Woodring et al. |
| 10,960,342 B2 | 3/2021 | Hiltzik et al. |
| 11,242,824 B2 | 2/2022 | Hasumi et al. |
| 2002/0073847 A1 | 6/2002 | Sheline et al. |
| 2006/0141256 A1 | 6/2006 | Ishikawa et al. |
| 2007/0122609 A1 | 5/2007 | Hiltzik et al. |
| 2007/0266997 A1 | 11/2007 | Clontz, Jr. et al. |
| 2008/0236389 A1 | 10/2008 | Leedy et al. |
| 2010/0011746 A1 | 1/2010 | Lupescu |
| 2011/0168025 A1 | 7/2011 | Huynh |
| 2015/0328962 A1 | 11/2015 | Felber et al. |
| 2016/0271555 A1* | 9/2016 | Hiltzik .............. B01J 20/28045 |
| 2018/0363594 A1* | 12/2018 | Byrne ................ B01D 53/0407 |
| 2019/0099917 A1 | 4/2019 | Tamai et al. |
| 2019/0226426 A1 | 7/2019 | Hiltzik et al. |
| 2019/0275496 A1 | 9/2019 | Johnson |
| 2020/0018265 A1 | 1/2020 | Chen et al. |
| 2020/0147586 A1 | 5/2020 | Ruettinger et al. |
| 2021/0162368 A1* | 6/2021 | Thomson .......... B01J 20/28045 |
| 2021/0170324 A1* | 6/2021 | Hiltzik .............. B01D 53/0407 |
| 2022/0040627 A1* | 2/2022 | Seki ..................... B60K 15/035 |

FOREIGN PATENT DOCUMENTS

| | | |
|---|---|---|
| GB | 2569353 A | 6/2019 |
| JP | 4610273 B2 | 1/2011 |
| WO | WO2009061533 A1 | 5/2009 |
| WO | WO2015054332 A1 | 4/2015 |
| WO | WO2019003157 A1 | 1/2019 |
| WO | WO2019115810 A1 | 6/2019 |
| WO | 2020067007 A1 | 4/2020 |

OTHER PUBLICATIONS

Carb's LEV III BETP procedure (section D.12 in California Evaporative Emissions Standards and Test Procedures for 2001 and Subsequent Model Motor Vehicles, Mar. 22, 2012, (2012).
Clontz, R., et al., Effects of Low-Purge Vehicle Applications and Ethanol-Containing Fuels on Evaporative Emissions Canister Performance, 2007—JSAE Paper 20077051—2007-01-1929; Final, 2007.
Clontz, R., et al., Effects of Low-Purge Vehicle Applications and Ethanol-Containing Fuels on Evaporative Emissions Canister Performance, JSAE 20077051 SAE 2007-01-1929, Paper Presentation 101307, 2007.
Crittenden, B.D., et al., Nonuniform Channels in Adsorbent Monoliths, AICHE Journal, vol. 57., No. 5, pp. 1163-1172, May 2011.
Limits and Measurement Methods for Emissions from Light-Duty Vehicles, GB 18352.6-2016, also known as "China 6".
Rezaei, F., et al., Optimum structured adsorbents for gas separation processes, Chemical EngineeringScience64(2009)5182-5191, Sep. 1, 2009.
SAE Technical Paper 2001-01-0733, Mar. 5, 2001, "Impact and Control of Canister Bleed Emissions," (by R. S. Williams and C. R. Clontz) (2001).
SAE Technical Papers 902119, Oct. 25, 1990, "Performance of Activated Carbon in Evaporative Loss Control Systems" (by H.R. Johnson, R.S. Williams) (1990).
Tank.tech Conference Agenda, Munich, Germany, Nov. 5-6, 2015.
Valdes-Solis, T., et al., Adsorption and breakthrough performance of carbon-coated ceramic monolighs at low concentration of n-butane, Chemical Engineering Science, 59, pp. 2791-2800, Mar. 25, 2004 2004—CES Article on C4 Adsorption by Coated Monoliths.
Versen, E., et al., Low Bleed Solutions Meeting LEV III/Tier 3 Evaporative Emission Standards, Tank.Tech 2015 (Final), Munich Germany, Nov. 6, 2015.

* cited by examiner

Average Channel Hydraulic Diameter, mm
$$t_{c,Dh} = 4 \Sigma A_C / \Sigma P_c$$

Cell Pitch, mm based on Hydraulic Diameter
$$CP_{Dh} = t_{c,Dh} + t_{w,avg}$$

Channel Width Plurality, mm $t_{c,avg}$ = Average ($t_{c,m}$, $t_{c,b}$, $t_{c,nxn}$)

LOW EMISSION ADSORBENT AND CANISTER SYSTEM

CROSS-REFERENCE TO RELATED APPLICATIONS

The present application claims the benefit of priority under 35 U.S.C. 119(e) to U.S. Provisional Patent Application 63/001,164, titled: Low Emission Adsorbent and Canister System, filed: 27 Mar. 2020, and U.S. Provisional Patent Application 63/111,768, titled: Low Emission Adsorbent and Canister System, filed: 10 Nov. 2020, both of which are incorporated herein by reference in their entirety.

BACKGROUND

1. Field of the Discovery. The present disclosure, in various embodiments, relates generally to evaporative emission control systems.

2. Background Information. Evaporation of gasoline fuel from motor vehicle fuel systems is a major potential source of hydrocarbon air pollution. These fuel vapor emissions occur when the vehicle is running, refueling, or parked (i.e., engine off). Such emissions can be controlled by the canister systems that employ activated carbon to adsorb the fuel vapor emitted from the fuel systems. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

It is well known in the art that a more space efficient activated carbon adsorbent for this concentration-swing application is characterized by an n-butane vapor adsorption isotherm that has adsorption capacity steeply sloped towards high vapor partial pressures (U.S. Pat. No. 6,540,815). In that way, the adsorbent has a high capacity at relatively high concentrations of the type of vapors present with gasoline fuel, and the adsorbent favors release of these captured vapors when exposed to a low vapor concentration or partial pressure, such as during purge. These high performance activated carbons have a large amount of pore volume as "small mesopores" (e.g., SAE Technical Papers 902119 and 2001-03-0733, and Burchell 1999, pp. 252-253), which are preferably about 1.8 nm to about 5 nm in size as measured by the Barrett, Joyner and Halenda (BJH) method of analysis of nitrogen adsorption isotherms (e.g., U.S. Pat. No. 5,204,310). (According to IUPAC classification, small mesopores are pores of about 1.8-2 nm size within the <2 nm micropore size range, plus pores of about 2-5 nm size within the 2-50 nm mesopore size range.). The small mesopores are sufficiently small to capture vapors as a condensed phase, and yet readily empty upon exposure to a low partial pressure of vapor. Accordingly, the volume in these pores correlates linearly with the recoverable vapor capacity by the adsorbent in a canister volume, known as gasoline working capacity (GWC), and likewise correlates linearly with the ASTM butane working capacity (herein, "ASTM BWC") of the adsorbent, as measured by the standard ASTM 5228 method, which are incorporated herein by reference. The range of ASTM BWC of commercial activated carbon products for this application is from about 3 to about 17 g/dL, with 9+ g/dL BWC carbons favored for working capacity towards the fuel vapor source of the canister system, and lower BWC carbons used in one or more subsequent volumes towards the atmosphere port or vent-side (i.e., vent-side adsorbent volumes). Generally, cylindrical pellet and other engineered shaped (e.g., spherical granule) activated carbons are preferred over irregularly shaped or crushed particulates, especially for canister systems where moderated flow restriction is required such as for vapor capture during refueling. Advantages of pelletized and engineered shaped activated carbons include good mechanical strength, low dust, low dusting rate, high on-size yield in processing, and a narrow particle size distribution that provides consistency across liter-size canister fills after bulk shipment and handling.

Though a highly mesoporous adsorbent is favored for working capacity, high ASTM BWC of the adsorbent and its high GWC appear to run counter, in practice, from the concurrent need of the fuel vapor emission control system to provide low emissions even when the vehicle is not operating.

For example, an increase in environmental concerns has continued to drive strict regulations of hydrocarbon emissions. When a vehicle is parked in a warm environment during the daytime (i.e., diurnal heating), the temperature in the fuel tank increases resulting in an increased vapor pressure in the fuel tank. Normally, to prevent the leaking of the fuel vapor from the vehicle into the atmosphere, the fuel tank is vented through a conduit to a canister containing suitable fuel adsorbent materials that can temporarily adsorb the fuel vapor. The canister defines a vapor or fluid stream path such that when the vehicle is at rest the fuel vapor of fluid passes from the fuel tank, through the fuel tank conduit, through one or more adsorbent volumes, and out to a vent port, which opens to the atmosphere. A mixture of fuel vapor and air from the fuel tank enters the canister through a fuel vapor inlet of the canister and diffuses into the adsorbent volume where the fuel vapor is adsorbed in temporary storage and the purified air is released to the atmosphere through a vent port of the canister. Once the engine is turned on, ambient air is drawn into the canister system through the vent port of the canister. The purge air flows through the adsorbent volume inside the canister and desorbs the fuel vapor adsorbed on the adsorbent volume before entering the internal combustion engine through a fuel vapor purge conduit. The purge air does not desorb the entire fuel vapor adsorbed on the adsorbent volume, resulting in a residue hydrocarbon ("heel") that may be emitted to the atmosphere.

In addition, the heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing loss" (DBL) emissions. The California Low Emission Vehicle Regulations made it desirable for these DBL emissions from the canister system to be below 10 mg ("PZEV") for a number of vehicles beginning with the 2003 model year and below 50 mg, typically below 20 mg, ("LEV-II") for a larger number of vehicles beginning with the 2004 model year.

Now the California Low Emission Vehicle Regulation ("LEV-III") and United States Federal Tier 3 regulations require canister DBL emissions not to exceed 20 mg as per the Bleed Emissions Test Procedure (BETP) as written in the *California Evaporative Emissions Standards and Test Procedures for* 2001 *and Subsequent Model Motor Vehicles,* Mar. 22, 2012. Furthermore, the regulations on DBL emissions continue to create challenges for the evaporative emission control systems, especially when the level of purge air is low. For example, the potential for DBL emissions may be more severe for a hybrid vehicle, including a vehicle whose powertrain is both an internal combustion engine and an electric motor ("HEV"), and a vehicle where there is a start-stop system that automatically shuts down and restarts the internal combustion engine to reduce the amount of time the engine spends idling, thereby reducing fuel consumption and tailpipe emissions. In such hybrid vehicles, the internal combustion engine can be turned off nearly half of the time during vehicle operation. Since the adsorbed fuel vapor on the adsorbents is purged only when the internal combustion engine is on, the adsorbents in the canister of a hybrid vehicle are purged with fresh air less than half of the time compared to conventional vehicles and frequently within the range of 55 bed volumes (BV) to 100 BV (based on U.S. EPA Federal Test Procedure (FTP)-75 drive cycle), where "BV" is the ratio of the total volume of purge flow relative to the volumes of adsorbent in the canister system. And yet, hybrid vehicles generate nearly the same amount of evaporative fuel vapor as conventional vehicles. The lower purge frequency and lower purge volume of the hybrid vehicle can be insufficient to clean the residue hydrocarbon heel from the adsorbents in the canister, resulting in high DBL emissions. Other powertrains when engineered for optimum drive performance, fuel efficiency and tailpipe emissions, are similarly challenged to provide a high level of purge for refreshing the canister and are challenged to provide optimum air-fuel mixtures and rates to the engine. These powertrains include turbocharged or turbo-assisted engines, and gasoline direct injection ("GDI") engines.

Globally, by contrast, evaporative emission regulations have been less stringent than in the US, but the trend is now for more stringent regulations, along the path that the US has taken. There is increased recognition of the benefits from tighter controls for better use of vehicle fuel and for cleaner air, especially in regions where light duty vehicle use is growing rapidly and air quality issues require urgent attention. As a notable example, the Ministry of Environmental Protection of the People's Republic of China released regulations in 2016 that include limitations on fuel vapor emissions, for implementation in 2020 (See "Limits and Measurement Methods for Emissions from Light-Duty Vehicles, GB 18352.6-2016, also known as "China 6"). This standard specifies the limits and measurement methods for light-duty vehicles, including hybrid electric vehicles, equipped with positive ignition engines for exhaust emissions in regular and low temperatures, real driving emissions (RDE), crankcase emissions, evaporative emissions and refueling emissions, technical requirements, and measurement methods of the durability for pollution control equipment, and onboard diagnostic system (OBD).

While the testing protocol and the emissions limits for the whole vehicle testing are provided in the regulations, there is leeway in the allocation by the vehicle manufacturers for the design limits of the components contributing to the total emissions (e.g., evaporative emission control canister system, fuel tank walls, hoses, tubing, etc.). Among the allocations, the limit for the evaporative emission control canister system is generally set in the fuel system and vehicle design processes to be less than 100 mg for the worst day DBL emissions as part of the design balance for meeting the overall vehicle requirements of China 6 regulations.

In order to meet the evaporative fuel emission regulatory standards in the vehicle design stage, vehicle manufacturers typically provide potential suppliers with target specifications on overall canister system performance, in terms of functional content, appearance, physical characteristics, and durability, hence leaving appropriate design flexibility for achieving those targets to the canister system manufacturers. For example, General Motors Corporation sets many design specifications for evaporative emission control canister systems (See GMW16494). A notable specification is the total allowable pressure drop of a carbon canister system. In this example, the maximum flow restriction for a canister system intended for on-board refueling vapor recovery (ORVR) "shall be 0.90±0.225 kPa at 60 liter/min (1 pm) air flow . . . as measured at the tank tube while flowing air from the canister tank tube to the fresh air tube" (see Section 3.2.1.3.2.2 of GMW-16494). This specification and others in GMW-16494 offer examples of the degree that vehicle manufacturer allow for flow restriction.

As a result of such specifications, canister system designers appreciate a wide array of chamber design and adsorbent selection options because, in addition to varied fuel emissions regulations around the world, the demands are quite varied across different vehicle platforms from different vehicle manufacturers per engine type, engine operational design, space availability, purge availability, and canister system control strategy. Certainly, "one size does not fit all" for canister system design and its adsorbent fills.

For satisfying the apparently opposing needs of high working capacity and low DBL emission performance, several approaches have been reported. One approach is to significantly increase the volume of purge gas to enhance desorption of the residue hydrocarbon heel from the adsorbent volume. See U.S. Pat. No. 4,894,072. This approach, however, has the drawback of complicating management of the fuel/air mixture to the engine during the purge step and tends to adversely affect tailpipe emissions, and such high levels of purge are simply unavailable for certain powertrain designs. At the cost of design and installation, an auxiliary pump may be employed at some location within the evaporative emission control system to supplement, assist, or augment the purge flow or volume, as a means to complement the engine vacuum and to avoid some issues with engine performance and tailpipe emission control when otherwise depending on the engine vacuum alone.

Another approach is to design the canister to have a relatively low cross-sectional area on the vent-side of the canister, either by the redesign of existing canister dimensions or by the installation of a supplemental vent-side canister of appropriate dimensions. This approach reduces the residual hydrocarbon heel by increasing the intensity of purge air. One drawback of such approach is that the relatively low cross-sectional area imparts an excessive flow restriction to the canister system. See U.S. Pat. No. 5,957, 114.

Another approach for increasing the purge efficiency is to heat the purge air, or a portion of the adsorbent volume having adsorbed fuel vapor, or both. However, this approach increases the complexity of control system management and poses some safety concerns. See U.S. Pat. Nos. 6,098,601 and 6,279,548.

Another approach is to route the fuel vapor through a fuel-side adsorbent volume, which is located proximal to the fuel source in the fluid stream, and then at least one subsequent (i.e., vent-side) adsorbent volume, which is located down-stream from the fuel-side adsorbent, prior to venting to the atmosphere, wherein the fuel-side adsorbent volume (herein, the initial adsorbent volume") has a higher isotherm slope, defined as an incremental adsorption capacity, than the subsequent (i.e., vent-side) adsorbent volume. See U.S. Pat. No. RE38,844, which is incorporated herein by reference in its entirety.

Another approach, especially useful when only a low level of purge might be available, is to route the fuel vapor through at least one subsequent (i.e., vent-side) adsorbent comprising a window of incremental adsorption capacity, volume-averaged ASTM BWC, a particular g-total BWC capacity, and/or substantially uniform structure that facilitates approximately uniform air and vapor flow distribution across its flow path cross section. See U.S. Pat. No. 9,732,649 and U.S. Pat. No. 10,960,342, which are both incorporated herein by reference in their entirety.

One effective format for a subsequent adsorbent volume with low incremental adsorption capacity towards the vent-side of the canister system is an elongated, cylindrically shaped, ceramic-bound activated carbon honeycomb, such as Nuchar® HCA or HCA-LBE (Ingevity®, North Charleston, S.C., USA), typically available in diameters of 29, 35 and 41 mm and certain lengths between 50 and 200 mm. The internal parallel passage structure is a square grid of about 200 cells per square inch (cpsi), with cell walls of about 0.3 mm in thickness. These engineered parts are costly to make, requiring special skill and equipment to manufacture. Care must be taken for precise control of ingredient properties, formulation, mixing, extrusion, thermal processing, and cutting in order to meet final product specifications of mechanical strength, adsorptive capacity, and flow restriction. The finished adsorbent part must be durable, defect-free and dimensionally exact, and it must perform for emissions control over virtually the life of the vehicle. Though quite effective as a vent-side adsorbent volume fill for controlling diurnal breathing loss emissions, these ceramic-bound honeycombs, for some fuel systems, require larger size parts and multiple parts in-series for meeting emission control targets. Even still, under extremely low purge levels, the honeycombs may not be able to meet emission control targets, resulting in the use of very costly sealed tank fuel systems.

Accordingly, new adsorbent options and approaches for balancing the tradeoffs in terms of cost, size, flow restriction, working capacity, diurnal breathing loss (DBL) performance, complexity, and placement flexibility, are in high demand. For example, it would be desirable to have a higher performing adsorbent honeycomb that could allow smaller and less complicated approaches for system design and operation, both for when normal levels or low levels of purge are available.

SUMMARY

Presently described is an adsorbent material in the form of a parallel passage adsorbent volume (PPAV) that is configured to provide surprisingly and unexpectedly low DBL bleed emission performance properties when incorporated into a vehicle emissions canister system, evaporative emission control canister systems, and methods of using the same. The described PPAV advantageously allows the design of evaporative fuel emission control systems that are simpler and more compact than those currently known or available. As described herein, when tested under a standard vapor cycling protocol, an evaporative emission control canister system comprising a PPAV as described herein demonstrated significantly lower emissions using a standard bleed emission test procedure, for example, the BETP as written in the *California Evaporative Emissions Standards and Test Procedures for 2001 and Subsequent Model Motor Vehicles,* Mar. 22, 2012.

Thus, in one aspect, the description provides a PPAV comprising an outer surface and a plurality of parallel passages or channels extending therethrough parallel to the outer surface, and wherein the parallel passages or channels are configured to have at least one of an average channel hydraulic diameter (herein, "$t_{c,Dh}$") of less than 1.25 mm, a hydraulic diameter cell pitch (herein, "$CP_{Dh}$") of less than 1.5 mm, or a combination thereof. As detailed herein, when incorporated into evaporative emission systems, PPAVs as described herein surprisingly and unexpectedly resulted in reduced DBL bleed emissions while providing for less complicated design.

In another aspect, the description provides an evaporative emission control canister system comprising one or more canisters including a fuel-side adsorbent volume, and at least one vent-side parallel passage adsorbent volume (PPAV), wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm, or a combination thereof. In other aspects or embodiments described herein, the description provides an evaporative emission control system comprising a fuel tank for storing fuel, an engine having an air induction system and adapted to consume fuel, and one or more canisters including a fuel-side adsorbent volume and at least one vent-side PPAV, wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm, or a combination thereof, and wherein the canister includes a fuel vapor inlet conduit connecting the evaporative emission control canister system to the fuel tank;

a fuel vapor purge outlet conduit connecting the evaporative emission control canister system to the air induction system of the engine; and a vent conduit for venting the evaporative emission control canister system to the atmosphere and for admission of purge air to the evaporative emission control canister system, wherein the evaporative emission control canister system is defined by a fuel vapor flow path from the fuel vapor inlet conduit to the fuel-side adsorbent volume toward the at least one PPAV and the vent conduit, and by an air flow path from the vent conduit to the at least one PPAV toward the fuel-side adsorbent volume and the fuel vapor purge outlet.

In any of the aspects or embodiments described herein, the evaporative emission control canister system has a two-day diurnal breathing loss (DBL) of no more than 50 mg at no more than 315 liters of purge or no more than 150 bed volumes (BV) applied after a 40 g/hr butane loading step as determined by the 2012 California Bleed Emissions Test Procedure (BETP).

In any of the aspects or embodiments described herein, the PPAV comprises an adsorbent material selected from the group consisting of activated carbon, carbon charcoal, zeolites, clays, porous polymers, porous alumina, porous silica, molecular sieves, kaolin, titania, ceria, metal organic framework, and combinations thereof.

In any of the aspects or embodiments described herein, the shaped PPAV adsorbent material comprises activated carbon derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof. In any of the aspects or embodiments described herein, the shaped PPAV adsorbent material comprises activated carbon derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables or a combination thereof.

In any of the embodiments described herein, the evaporative emission control system may further comprise a heating unit.

In an additional aspect, the description provides methods for reducing fuel vapor emissions in an evaporative emission control system, the method comprising contacting the fuel vapor with an evaporative emission control system as described herein, comprising a PPAV as described herein.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages objects and embodiments are expressly included within the scope of the present invention. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION

Figure 1:
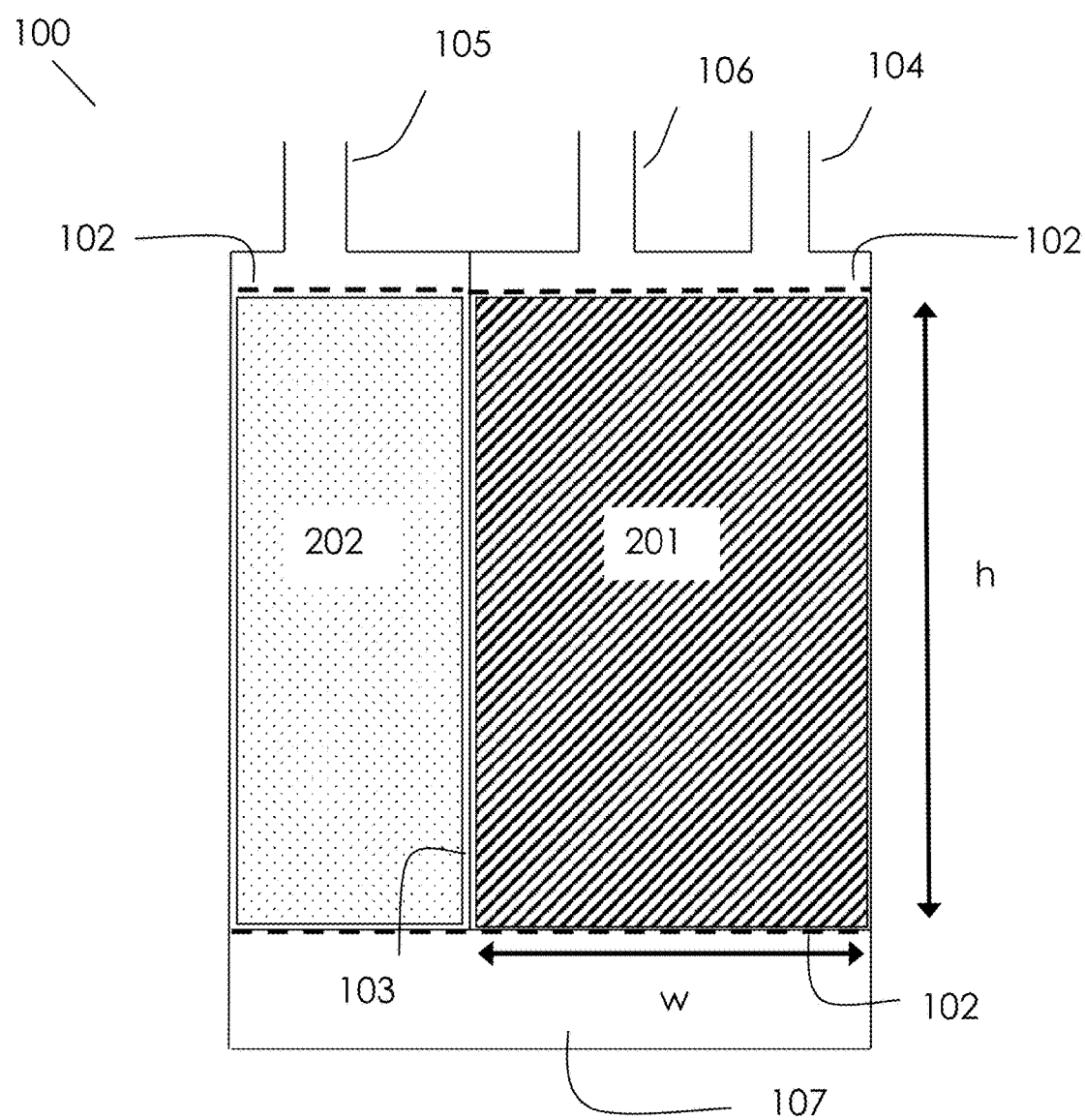
FIG. 1 is a cross-sectional view of an exemplary evaporative emission control canister system (100) as described herein.

The present disclosure now will be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

Where a range of values is provided, it is understood that each intervening value between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

As used herein, the phrase "less than" (e.g., less than about 2) or "less than or equal to" (e.g., less than or equal to about 2) followed by a number, means a non-zero number that is less than the stated number or a non-zero number that is less than or equal to the stated number, respectively.

As used herein, the terms "fluid," "gas" or "gaseous" and "vapor" or "vaporous" are used in a general sense and, unless the context indicates otherwise, are intended to be interchangeable.

Described herein are parallel passage adsorbent volume (PPAV) articles (herein, "shaped PPAV" or "PPAV") and evaporative emissions control canister systems comprising the same that surprisingly and unexpectedly demonstrate lowered diurnal breathing loss (DBL) emissions as a result of PPAV being located towards the vent-side of the system. As used herein, unless the context indicates otherwise, PPAV refers to an individual article or part (i.e., nominal volume), wherein the PPAV comprises an adsorbent material and has an outer surface and a plurality of parallel passages or channels extending therethrough parallel to the outer surface, and wherein the parallel passages or channels are configured as described herein.

Thus, in one aspect, the description provides a PPAV comprising an outer surface and a plurality of parallel passages or channels extending therethrough parallel to the outer surface, and wherein the parallel passages or channels are configured to have at least one of an average channel hydraulic diameter ($t_{c,Dh}$) of less than 1.25 mm, a hydraulic diameter cell pitch ($CP_{Dh}$) of less than 1.5 mm or a combination thereof. As detailed herein, when incorporated into evaporative emission systems, PPAVs as described herein surprisingly and unexpectedly resulted in reduced DBL bleed emissions while providing for less complicated design.

In any aspects or embodiments described herein, the average channel hydraulic diameter ($t_{c,Dh}$) of the PPAV calculated as $4\Sigma A_c / \Sigma P_c$ as described herein, is independently selected from, for example, less than or equal to 1.25 mm, less than or equal to 1.20 mm, less than or equal to 1.10 mm, less than or equal to 1.0 mm; or from about 0.01 mm to about 1.25 mm, from about 0.1 mm to about 1.25 mm, from about 0.2 mm to about 1.25 mm, from about 0.3 mm to about 1.25 mm, from about 0.4 mm to about 1.25 mm; or from about 0.1 mm to about 1.20 mm, from about 0.1 mm to about 1.15 mm, from about 0.1 mm to about 1.10 mm, from about 0.1 mm to about 1.0 mm, from about 0.2 mm to about 1.20 mm, from about 0.2 mm to about 1.15 mm, from about 0.2 mm to about 1.1 mm, from about 0.2 mm to about 1.0 mm, from about 0.3 mm to about 1.25 mm, from about 0.3 mm to about 1.20 mm, from about 0.3 mm to about 1.15 mm, from about 0.3 mm to about 1.1 mm, from about 0.3 mm to about 1.0 mm, from about 0.4 mm to about 1.25 mm, from about 0.4 mm to about 1.20 mm, from about 0.4 mm to about 1.15 mm, from about 0.4 mm to about 1.1 mm, from about 0.4 mm to about 1.0 mm, from about 0.4 mm to about 0.95, or from about 0.4 mm to about 0.9 mm, and including all subranges and combinations thereof.

In any aspects or embodiments described herein, the hydraulic diameter cell pitch ($CP_{Dh}$) of the PPAV calculated as the sum of average channel hydraulic diameter ($t_{c,Dh}$) plus average wall thickness ($t_{w,avg}$) as described herein is independently selected from, for example, less than 1.50 mm, less than 1.40 mm, or less than 1.30 mm; or from about 0.5 mm to about 1.5 mm, or from about 0.5 mm to about 1.4 mm, or from about 0.5 mm to about 1.3 mm, or from about 0.5 mm to about 1.2 mm, or from about 0.6 mm to about 1.5 mm, or from about 0.6 mm to about 1.4 mm, or from about 0.6 mm to about 1.3 mm, or from about 0.6 mm to about 1.2 mm, or from about 0.7 mm to about 1.5 mm, or from about 0.7 mm to about 1.4 mm, or from about 0.7 mm to about 1.3 mm, or from about 0.7 mm to about 1.2 mm, or from about 0.8 mm to about 1.5 mm, or from about 0.75 mm to about 1.4 mm, or from about 0.75 mm to about 1.3 mm, or from about 0.75 mm to about 1.2 mm, and including all subranges and combinations thereof.

In another aspect, the description provides an evaporative emission control canister system comprising one or more canisters including a fuel-side adsorbent volume, and at least one vent-side parallel passage adsorbent volume (PPAV), wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof.

In certain aspects, the description provides an evaporative emission control canister system comprising one or more canisters having a plurality of chambers, each chamber defining a volume, which are in fluid communication allowing a fluid or vapor to flow directionally from one chamber to the next, and a chamber near a fuel vapor inlet (i.e., fuel port or fuel tank port) includes a fuel-side adsorbent volume, and one chamber near a vent port includes a vent-side parallel passage adsorbent volume (PPAV), wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof.

In other aspects or embodiments described herein, the description provides an evaporative emission control system comprising a fuel tank for storing fuel, an engine having an air induction system and adapted to consume fuel, and one or more canisters including a fuel-side adsorbent volume and at least one vent-side PPAV, wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof, and wherein the canister includes a fuel vapor inlet conduit connecting the evaporative emission control canister system to the fuel tank;

a fuel vapor purge outlet conduit connecting the evaporative emission control canister system to the air induction system of the engine; and a vent conduit for venting the evaporative emission control canister system to the atmosphere and for admission of purge air to the evaporative emission control canister system, wherein the evaporative emission control canister system is defined by a fuel vapor flow path from the fuel vapor inlet conduit to the fuel-side adsorbent volume toward the at least one PPAV and the vent conduit, and by an air flow path from the vent conduit to the at least one PPAV toward the fuel-side adsorbent volume and the fuel vapor purge outlet.

In any aspects or embodiments of the evaporative emission control system or the evaporative emission control canister system described herein, the average channel hydraulic diameter ($t_{c,Dh}$) of the at least one vent-side PPAV as described herein is independently selected from, for example, less than or equal to 1.25 mm, less than or equal to 1.20 mm, less than or equal to 1.10 mm, less than or equal to 1.0 mm; or from about 0.01 mm to about 1.25 mm, from about 0.1 mm to about 1.25 mm, from about 0.2 mm to about 1.25 mm, from about 0.3 mm to about 1.25 mm, from about 0.4 mm to about 1.25 mm; or from about 0.1 mm to about 1.20 mm, from about 0.1 mm to about 1.15 mm, from about 0.1 mm to about 1.10 mm, from about 0.1 mm to about 1.0 mm, from about 0.2 mm to about 1.20 mm, from about 0.2 mm to about 1.15 mm, from about 0.2 mm to about 1.1 mm, from about 0.2 mm to about 1.0 mm, from about 0.3 mm to about 1.25 mm, from about 0.3 mm to about 1.20 mm, from about 0.3 mm to about 1.15 mm, from about 0.3 mm to about 1.1 mm, from about 0.3 mm to about 1.0 mm, from about 0.4 mm to about 1.25 mm, from about 0.4 mm to about 1.20 mm, from about 0.4 mm to about 1.15 mm, from about 0.4 mm to about 1.1 mm, from about 0.4 mm to about 1.0 mm, from about 0.4 mm to about 0.95, or from about 0.4 mm to about 0.9 mm, and including all subranges and combinations thereof.

In any aspects or embodiments of the evaporative emission control system or the evaporative emission control canister system described herein, the hydraulic diameter cell pitch ($CP_{Dh}$) of the at least one vent-side PPAV as described herein is independently selected from, for example, less than or equal to 1.50 mm, less than or equal to 1.40 mm, or less than or equal to 1.30 mm; or from about 0.5 mm to about 1.5 mm, or from about 0.5 mm to about 1.4 mm, or from about 0.5 mm to about 1.3 mm, or from about 0.5 mm to about 1.2 mm, or from about 0.6 mm to about 1.5 mm, or from about 0.6 mm to about 1.4 mm, or from about 0.6 mm to about 1.3 mm, or from about 0.6 mm to about 1.2 mm, or from about 0.7 mm to about 1.5 mm, or from about 0.7 mm to about 1.4 mm, or from about 0.7 mm to about 1.3 mm, or from about 0.7 mm to about 1.2 mm, or from about 0.75 mm to about 1.5 mm, or from about 0.75 mm to about 1.4 mm, or from about 0.75 mm to about 1.3 mm, or from about 0.75 mm to about 1.2 mm, and including all subranges and combinations thereof.

In any of the aspects or embodiments of the PPAV, the evaporative emission control system or the evaporative emission control canister system described herein, the PPAV further comprises at least one of the following: (i) plurality channel width ($t_{a,\ avg}$) of less than about 1.25 mm; (ii) plurality width cell pitch ($CP_{tc}$) of less than about 1.5 mm; (iii) cell density of from about 285 to about 1000 cpsi; (iv) cell wall thickness of less than about 0.5 mm; (v) BWC of less than about 10 g/dL; (vi) an incremental adsorption capacity between 5% and 50% n-butane at 25 C of less than about 50 g/L; or (vii) a combination thereof. The features (i)-(vii) are contemplated in all combinations described herein with any of the options described above for $t_{c,\ Dh}$ and/or $CP_{Dh}$.

In any of the aspects or embodiments of the PPAV, the evaporative emission control system or the evaporative emission control canister system described herein, the plurality channel width ($t_{c,\ avg}$) of the PPAV is, for example, less than about 1.25 mm, less than about 1.20 mm, less than about 1.15 mm, less than about 1.1 mm, less than 1.0 mm; or from about 0.1 mm to about 1.25 mm, from about 0.1 mm to about 1.20 mm, from about 0.1 mm to about 1.15 mm, from about 0.1 mm to about 1.10 mm, from about 0.1 mm to about 1.0 mm; or from about 0.2 mm to about 1.20 mm, from about 0.2 mm to about 1.15 mm, from about 0.2 mm to about 1.1 mm, from about 0.2 mm to about 1.0 mm; or from about 0.3 mm to about 1.25 mm, from about 0.3 mm to about 1.20 mm, from about 0.3 mm to about 1.15 mm, from about 0.3 mm to about 1.1 mm, from about 0.3 mm to about 1.0 mm; or from about 0.4 mm to about 1.25 mm, from about 0.4 mm to about 1.20 mm, from about 0.4 mm to about 1.15 mm, from about 0.4 mm to about 1.1 mm, from about 0.4 mm to about 1.0 mm, or from about 0.4 mm to about 0.9 mm, and including all subranges and combinations thereof.

In any of the aspects or embodiments of the PPAV, the evaporative emission control system or the evaporative emission control canister system described herein, the plurality width cell pitch ($CP_{tc}$) of the PPAV, which is the average of the plurality of channel widths of channels of approximately the same cross-sectional dimensions, and not including peripheral channels (i.e., peripheral cells) in the cross-section, plus the average channel wall thickness (excluding the outer skin wall thickness)) is, for example, less than 1.6 mm, less than 1.55 mm, 1.5 mm, less than about 1.45 mm, less than about 1.4 mm, less than about 1.35 mm, less than about 1.3, less than about 1.25 mm; from about 0.5 mm to about 1.5 mm, or from about 0.5 mm to about 1.4 mm, or from about 0.5 mm to about 1.3 mm, or from about 0.5 mm to about 1.2 mm, or from about 0.6 mm to about 1.5 mm, or from about 0.6 mm to about 1.4 mm, or from about 0.6 mm to about 1.3 mm, or from about 0.6 mm to about 1.2 mm, or from about 0.7 mm to about 1.5 mm, or from about 0.7 mm to about 1.4 mm, or from about 0.7 mm to about 1.3 mm, or from about 0.7 mm to about 1.2 mm, or from about 0.75 mm to about 1.5 mm, or from about 0.75 mm to about 1.4 mm, or from about 0.75 mm to about 1.3 mm, from about 0.75 mm to about 1.25 mm or from about 0.75 mm to about 1.2 mm, and including all subranges and combinations thereof.

In any of the aspects or embodiments of the PPAV, the evaporative emission control system or the evaporative emission control canister system described herein, the cell density (i.e., channels or cells if viewed in cross-section per square inch ("cpsi") of the PPAV is, for example, from about 285 to about 1000 cpsi, from about 300 to about 1000 cpsi, from about 325 to about 1000 cpsi, from about 350 to about 1000 cpsi, from about 375 to about 1000 cpsi, from about 400 to about 1000 cpsi, from about 425 to about 1000 cpsi, from about 450 to about 1000 cpsi, from about 500 to about 1000 cpsi, from about 550 to about 1000 cpsi, from about 600 to about 1000 cpsi; or from 300 to about 950 cpsi, from 300 to about 900 cpsi, from about 300 to about 850 cpsi, from about 300 to about 800 cpsi; or from about 400 to about 900 cpsi, from about 400 to about 850 cpsi, from about 400 to about 800 cpsi, and including all subranges and combinations thereof.

In any of the aspects or embodiments of the PPAV, the evaporative emission control system or the evaporative emission control canister system described herein, the cell wall thickness of the PPAV is, for example, from 0.1 mm to about 0.5 mm, from about 0.1 mm to about 0.45 mm; or from about 0.15 mm to about 0.5 mm, 0.15 to about 0.4 mm; or from about 0.2 mm to about 0.5 mm; or from about 0.2 mm to about 0.45 mm, and including all subranges and combinations thereof. The average channel wall thickness is determined as described herein.

In any of the aspects or embodiments of the PPAV, the evaporative emission control system or the evaporative emission control canister system described herein, the BWC (g/dL) of the PPAV is, for example, less than about 9.5, less than about 9.0, less than about 8.5, less than about 8.0, less than about 7.5, less than about 7.0, less than about 6.5, less than about 6.0, less than about 5.5, less than about 5.0, less than about 4.5, less than about 4.0, less than about 3.5, less than about 3.0, less than about 2.5, less than about 2.0 g/dL, less than about 1.5 g/dL, less than about 1.0 g/dL, or less than about 0.5 g/dL; or from about 0.5 to about 10 g/dL, from about 0.5 to about 9 g/dL, from about 0.5 to about 8 g/dL, from about 0.5 to about 7 g/dL, from about 0.5 to about 6 g/dL, from about 0.5 to about 5 g/dL, from about 0.5 to about 4 g/dL, from about 0.5 to about 3 g/dL, from about 0.5 to about 2 g/dL, from about 0.5 to about 1 g/dL; or from about 1 to about 10 g/dL, from about 1 to about 9 g/dL, from about 1 to about 8 g/dL, from about 1 to about 7 g/dL, from about 1 to about 6 g/dL, from about 1 to about 5 g/dL, from about 1 to about 4 g/dL, from about 1 to about 3 g/dL, from about 1 to about 2 g/dL; or from about 2.0 to about 10, from about 2.0 to about 9.5, from about 2.0 to about 9.0, from about 2.0 to about 8.5, from about 2.0 to about 8.0, from about 2.0 to about 7.5, from about 2.0 to about 7.0, from about 2.0 to about 6.5, from about 2.0 to about 6.0 g/dL, from about 2.0 to about 5.5 g/dL, from about 2.0 to about 5.0 g/dL, from about 2.0 to about 4.5 g/dL; or from about 2.5 to about 10, from about 2.5 to about 9.5, from about 2.5 to about 9.0, from about 2.5 to about 8.5, from about 2.5 to about 8.0, from about 2.5 to about 7.5, from about 2.5 to about 7.0, from about 2.5 to about 6.5, from about 2.5 to about 6.0 g/dL, from about 2.5 to about 5.5 g/dL, from about 2.5 to about 5.0 g/dL, from about 2.5 to about 4.5 g/dL; or from about 3.0 to about 10, from about 3.0 to about 9.5, from about 3.0 to about 9.0, from about 3.0 to about 8.5, from about 3.0 to about 8.0, from about 3.0 to about 7.5, from about 3.0 to about 7.0, from about 3.0 to about 6.5, from about 3.0 to about 6.0 g/dL, from about 3.0 to about 5.5 g/dL, from about 3.0 to about 5.0 g/dL, or from about 3.0 to about 4.5 g/dL, including all subranges and combinations thereof.

Unless specified otherwise, BWC is determined in accordance with the method described herein. In any of the aspects or embodiments described herein, the PPAV (i.e., each article or part) as described herein has a length of between about 25 mm and 250 mm, or between about 50 mm and 150 mm In any of the aspects or embodiments of the PPAV, the evaporative emission control system or the evaporative emission control canister system described herein, the incremental adsorption capacity (IAC) between 5% and 50% n-butane at 25° C. of the PPAV is, for example, less than about 50 g/L, less than about 45 g/L, less than about 40 g/L, less than about 35 g/L, less than about 30 g/L, less than about 25 g/L, less than about 20 g/L, less than about 15 g/L, less than about 10 g/L, less than about 5 g/L, less than about 4 g/L, less than about 3 g/L, less than about 2 g/L, or less than about 1 g/L; or from about 5 to about 50 g/L, from about 5 to about 45 g/L, from about 5 to about 40 g/L, from about 5 to about 35 g/L, from about 5 to about 30 g/L, from about 5 to about 25 g/L, from about 5 to about 20 g/L, from about 5 to about 15 g/L, from about 5 to about 10 g/L; or from about 10 to about 50 g/L, from about 10 to about 45 g/L, from about 10 to about 40 g/L, from about 10 to about 35 g/L, from about 10 to about 30 g/L, from about 10 to about 25 g/L, from about 10 to about 20 g/L; or from about 15 to about 50 g/L, from about 15 to about 45 g/L, from about 15 to about 40 g/L, from about 15 to about 35 g/L, from about 15 to about 30 g/L, from about 15 to about 25 g/L, or from about 15 to about 20 g/L, and including all subranges and combinations thereof.

In any of the aspects or embodiments of the evaporative emission control system or the evaporative emission control canister system described herein, has a two-day diurnal breathing loss (DBL) of no more than (i.e., less than or equal to) 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15,14, 13, 12, 11, 10, 9, 8, 7, 6, 5, 4, 3, 2, 1 mg at no more than (i.e., less than or equal to) 350, 340, 330, 320, 315, 310, 300, 290, 280, 270, 260, 250, 240, 230, 220, 210, 200, 190, 180, 170, 160, 150, 140, 130, 120, 110, or 100 liters or no more than (i.e., less than or equal to) 150, 140,130, 120, 110, 100, 90, 80, 75, 70, 65, 60, 55, 50, 45, 40, 35, or 30 bed volumes (BV) of purge applied after a 40 g/hr butane loading step as determined by the 2012 California Bleed Emissions Test Procedure (BETP).

In any of the aspects or embodiments of the PPAV, the evaporative emission control system or the evaporative emission control canister system described herein, the PPAV comprises a channel having a width of less than 1.25 mm, and a cell pitch of less than 1.5 mm. In certain embodiments, the PPAV demonstrates low vapor release properties as measured by an incremental adsorption capacity between 5 and 50% n-butane at 25° C. of less than 50 g/L between vapor concentration of 5 vol % and 50 vol % n-butane.

In any of the aspects or embodiments of the PPAV, the evaporative emission control system or the evaporative emission control canister system described herein, the PPAV has a feature as exemplified by the experimental results provided herein, including, e.g., a numerical range based on data in the experimental results.

In any of the aspects or embodiments of the PPAV, the evaporative emission control system or the evaporative emission control canister system described herein, the PPAV is in the form of a prism, e.g., circular (i.e., cylinder), square, rectangular, triangular, pentagonal, etc., and as such, the parallel passages extend internally along the length of the prism parallel to each other and parallel to the outer surface.

In any of the aspects or embodiments of the PPAV, the evaporative emission control system or the evaporative emission control canister system described herein, the PPAV comprises an adsorbent material derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, or a combination thereof. In any of the aspects or embodiments described herein, the PPAV comprises an adsorbent material derived from wood or wood dust.

In any of the aspects or embodiments of the PPAV, the evaporative emission control system or the evaporative emission control canister system described herein, the PPAV includes an adsorbent such as activated carbon or carbon charcoal.

In any of the aspects or embodiments of the PPAV, the evaporative emission control system or the evaporative emission control canister system described herein, the PPAV comprises an adsorbent material selected from the group consisting of activated carbon, carbon charcoal, zeolites, clays, porous polymers, porous alumina, porous silica, molecular sieves, kaolin, titania, ceria, metal organic framework, and combinations thereof.

In any of the aspects or embodiments of the PPAV, the evaporative emission control system or the evaporative emission control canister system described herein, the PPAV comprises one or more binders, e.g., an organic binder such as carboxymethyl cellulose (CMC) or an inorganic binder, such as bentonite clay, or a combination of binders. In any of the aspects or embodiments described herein, the PPAV comprises one or more cellulosic binders, e.g., carboxymethyl cellulose (CMC), and one or more inorganic binders, e.g., a clay. In certain embodiments, the binder comprises at least one of a clay or a silicate material. For example, in certain embodiments, the binder is at least one of zeolite clay, bentonite clay, montmorillonite clay, illite clay, French green clay, pascalite clay, redmond clay, terramin clay, living clay, Fuller's Earth clay, ormalite clay, vitallite clay, rectorite clay, cordierite, ball clay, kaolin or a combination thereof.

Additional potential binders include, thermosetting binders and hot-melt binders. Thermosetting binders are compositions based on thermosetting resins which are liquid or solid at ambient temperature and in particular those of urea-formaldehyde, melamine-urea-formaldehyde or phenol-formaldehyde type, resins of melamine-urea-formaldehyde type being preferred as well as emulsions of thermosetting (co)polymers in the latex foam. Crosslinking agents can be incorporated in the mixture. Mention may be made, as example of crosslinking agents, of ammonium chloride. Hot-melt binders are generally solid at ambient temperature and are based on resins of hot-melt type. Use may also be made, as binders, of pitch, tar or any other known binder.

In any of the embodiments described herein, the binder can comprise an aqueous soluble binders (e.g., polar binders), including but not limited to cellulosic binders and related esters, including methyl and ethyl cellulose and their derivatives, e.g., carboxymethyl cellulose (CMC), ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, crystalline salts of aromatic sulfonates, polyfurfuryl alcohol, polyester, polyepoxide or polyurethane polymers etc.

In any of the embodiments described herein, the binder can comprise an non-aqueous binder, such as clays, phenolic resins, lignins, lignosulfonates, polyacrylates, poly vinyl acetates, polyvinylidene chloride (PVDC), ultra-high molecular weight polyethylene (UHMWPE), etc., fluoropolymer, e.g., polyvinylidene difluoride (PVDF), polyvinylidene dichloride (PVDC), a polyamide (e.g., Nylon-6,6' or Nylon-6), a high-performance plastic (e.g. polyphenylene sulfide), polyketones, polysulfones, and liquid crystal polymers, copolymers with a fluoropolymer (e.g. poly(vinylidene difluoride)), polytetrafluoroethylene (PTFE), fluorinated ethylene propylene, or perfluoroalkoxy alkanes), copolymers with a polyamide (e.g., Nylon-6,6' or Nylon-6), a copolymer with a polyimide, a copolymer with a high-performance plastic (e.g. polyphenylene sulfide) or a combination thereof.

In any of the aspects or embodiments of the PPAV, the evaporative emission control system or the evaporative emission control canister system described herein, the PPAV is produced from the binder crosslinking of a ground precursor activated carbon material, wherein the ground activated carbon material is in the form of a powder. For example, in certain embodiments, the shaped PPAV as described herein is produced by taking a powdered activated carbon material and applying the crosslinking binder technology of U.S. Pat. No. 6,472,343.

Alternatively, or in combination, an inorganic binder may be used. The inorganic binder may be a clay or a silicate material. For example, the binder may be at least one of Zeolite clay, Bentonite clay, Montmorillonite clay, Illite clay, French Green clay, Pascalite clay, Redmond clay, Terramin clay, Living clay, Fuller's Earth clay, Ormalite clay, Vitallite clay, Rectorite clay, Cordierite, ball clay, kaolin or a combination thereof.

In any of the aspects or embodiments of the PPAV, the evaporative emission control system or the evaporative emission control canister system described herein, the PPAV is formed into a monolith structure, e.g., a honeycomb configuration. In any of the aspects or embodiments described herein the PPAV monolith structure is prepared by a method that includes extruding a blend comprising an adsorbent material and a binder to form the parallel passage shape. In any of the aspects or embodiments of the PPAV, the evaporative emission control system or the evaporative emission control canister system described herein, the PPAV (e.g., PPAV monolith structure) is prepared by a method that includes coating the channels of a parallel passage structure scaffold with a coating layer comprising an adsorbent material. In any of the aspects or embodiments of the PPAV, the evaporative emission control system or the evaporative emission control canister system described herein, the PPAV monolith structure is prepared by a method that includes coating the channels of a parallel passage structure scaffold with a coating layer comprising a carbonaceous material that is converted in situ to an adsorbent by further thermal and/or chemical processing (e.g., pyrolizing or chemical activation).

In any of the aspects or embodiments of the PPAV, the evaporative emission control system or the evaporative emission control canister system described herein, the PPAV monolith structure is prepared by a method that includes forming the parallel passage shape by stacking or winding a corrugated sheet. In any of the aspects or embodiments described herein, the parallel passage shape is made from corrugated sheet that contains adsorbent. In certain embodiments, the parallel passage shape made from corrugated sheet that has adsorbent present in a coating layer. In any of the aspects or embodiments described herein, the PPAV or the at least one vent-side PPAV of the evaporative emission control system described herein, monolith structure is prepared by a method that includes co-rolling a solid adsorbent sheet or layer with another sheet or another material to create parallel passages. In any of the aspects or embodiments of the PPAV, the evaporative emission control system or the evaporative emission control canister system described herein, the PPAV monolith structure is prepared by a method that includes rolling a solid adsorbent sheet or layer that comprises ribs or nubs to create parallel passages. In any of the aspects or embodiments described herein, the adsorbent material is formed into a structure that includes a combination of any of the foregoing.

In any aspects or embodiments described herein, the evaporative emission control system or the evaporative emission control canister system comprises at least one additional vent-side adsorbent volume having an incremental adsorption capacity at 25° C. of from about 2 to about 35 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 2 to about 30 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 2 to about 25 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 2 to about 20 grams n-butane per liter (g/L) between vapor concentration of 5 vol % and 50 vol % n-butane.

In any aspects or embodiments described herein, the evaporative emission control system or the evaporative emission control canister system comprises at least one vent-side adsorbent volume having an incremental adsorption capacity at 25° C. of from about 2 to about 15 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 2 to about 10 grams n-butane per liter (g/L) between vapor concentration of 5 vol % and 50 vol % n-butane.

In any aspects or embodiments described herein, the evaporative emission control system or the evaporative emission control canister system comprises at least one vent-side adsorbent volume having an incremental adsorption capacity at 25° C. of from about 2 to about 5 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 5 to about 30 grams n-butane per liter (g/L) between vapor concentration of 5 vol % and 50 vol % n-butane.

In any aspects or embodiments described herein, the evaporative emission control system or the evaporative emission control canister system comprises at least one vent-side adsorbent volume having an incremental adsorption capacity at 25° C. of from about 10 to about 30 grams n-butane per liter (g/L) between vapor concentration of 5 vol % and 50 vol % n-butane. In any aspects or embodiments described herein, the evaporative emission control system or the evaporative emission control canister system comprises at least one vent-side adsorbent volume having an incremental adsorption capacity at 25° C. of from about 15 to about 25 grams n-butane per liter (g/L) between vapor concentration of 5 vol % and 50 vol % n-butane.

In any of the aspects or embodiments of the PPAV, the evaporative emission control system or the evaporative emission control canister system described herein, the PPAV has a gram-total ("g-tot") BWC of less than 20 g, less than 19 g, less than 18 g, less than 17 g, less than 16 g, less than 15 g, less than 14 g, less than 13 g, less than 12 g, less than 11 g, less than 10 g, less than 9 g, less than 8 g, less than 7 g, less than 6 g, less than 5 g, less than 4 g, less than 3 g, less than 2 g or less than 1g. In certain embodiments, the PPAV has a g-tot BWC of from 0.1-20 g, from 0.1-20 g, from 0.1-19.5 g, from 0.1 -18 g, from 0.1-17.5 g, from 0.1-17 g, from 0.1-16.5 g, from 0.1-16 g, or from 0.1- 15.5 g, from 0.1-15 g, from 0.1-14.5 g, from 0.1-14 g, from 0.1-13.5 g, from 0.1-13 g, from 0.1-12.5 g, from 0.1-12 g, from 0.1-11.5 g, or from 0.1-11 g, from 0.1-10.5 g, from 0.1-10 g, from 0.1-9.5 g, from 0.1-9 g, from 0.1-8.5 g, from 0.1-8 g, from 0.1-7.5 g, from 0.1-7 g, or from 0.1-6.5 g, from 0.1-6 g, from 0.1-5.5 g, or from 0.1-5 g or a g-tot BWC of one or more examples. As used herein, "gram-total BWC" refers to the gram amount of butane purged from the PPAV.

In any of the aspects or embodiments of the PPAV, the evaporative emission control system or the evaporative emission control canister system described herein, the PPAV as described herein has a cross-sectional hydraulic diameter of between 20 mm and 75 mm, or between about 29 mm and 41 mm.

In any of the aspects or embodiments of the PPAV, the evaporative emission control system or the evaporative emission control canister system described herein, the PPAV as described herein has a length/hydraulic diameter ratio of between about 0.3 and 12.5, or between about 1.2 and 5.2.

In any of the aspects or embodiments of the PPAV, the evaporative emission control system or the evaporative emission control canister system described herein, the PPAV as described herein has between about 140 and 6450 channels (or cells in cross-section), or between about 680-1365 channels (or cells in cross-section), inclusive of partial cells, e.g., cells in the periphery of the cross-section of a cylindrical part). As would be readily apparent to the skilled artisan, the cells of the PPAV are representative of a cross-sectional view of the channels that extend along the interior length of the PPAV. As such, the number and density of cells is equivalent to the number and density of channels.

In any of the aspects or embodiments of the PPAV, the evaporative emission control system or the evaporative emission control canister system described herein, the PPAV as described herein has a total channel area of between about 60 mm$^2$ and 2760 mm$^2$, or between about 125 mm$^2$ and 660 mm$^2$.

In any of the aspects or embodiments of the PPAV, the evaporative emission control system or the evaporative emission control canister system described herein, the PPAV as described herein has flow restriction at 40 1pm of between about 0.01 and 2.7 kPa) or between about 0.03 and 0.9 kPa.

In any of the aspects or embodiments of the evaporative emission control system or the evaporative emission control canister system described herein, the canister system as described herein has adsorbent particulate volumes that total between 1 liter and 5 liters.

In any of the aspects or embodiments of the PPAV, the evaporative emission control system or the evaporative emission control canister system described herein, the PPAV comprises an adsorbent material selected from the group consisting of activated carbon, carbon charcoal, zeolites, clays, porous polymers, porous alumina, porous silica, molecular sieves, kaolin, titania, ceria, metal organic framework, and combinations thereof.

The adsorbent material may include any one or more of the above features, which can be combined in any number of ways according to the present description, and are expressly contemplated herein.

In additional aspects, the description provides evaporative emission control systems including one or more canisters comprising at least one PPAV as described herein.

FIG. 1 illustrates an exemplary embodiment of the evaporative emission control canister system 100 having adsorbent volumes in-series within a single canister. Canister system 100 includes screens or foams 102, a dividing wall 103, a fuel vapor inlet 104 from a fuel tank, a vent port 105 opening to an atmosphere, a purge outlet 106 to an engine, a fuel-side or initial adsorbent volume 201, and vent-side or subsequent adsorbent volume 202. The screens or foams 102 provide containment and support of the adsorbent volumes, as well as to serve as a distributor, to even the distribution of vapor flow into the adsorbent volumes. The two chambers containing the adsorbent volumes 201 and 202 are separated by the dividing wall 103 and connected for sequential vapor flow below a support screen 102 by way of the passage 107, called the canister plenum. Thus, in this example, the canister system defines a vapor flow path from the fuel port 104, through the fuel-side adsorbent volume 201, the plenum space 107, vent-side adsorbent 202, to the vent port 105. When an engine is off, the fuel vapor from a fuel tank enters the canister system 100 through the fuel vapor inlet 104. The fuel vapor diffuses or flows into the fuel-side or initial adsorbent volume 201, and then the vent-side or subsequent adsorbent volume 202 before being released to the atmosphere through the vent port 105 of the canister system. Once the engine is turned on, ambient air is drawn into the canister system 100 through the vent port 105. The purge air flows through volumes 202 in the canister, and finally through the fuel-side or initial adsorbent volume 201. This purge flow desorbs the fuel vapor adsorbed on the adsorbent volumes 202 through 201, before entering an internal combustion engine through the purge outlet 106. As will be appreciated by the skilled artisan, FIGS. 2-8 present additional exemplary canister systems that define adsorbent volumes in fluid communication along analogous fuel vapor/air flow paths.

Figure 2:
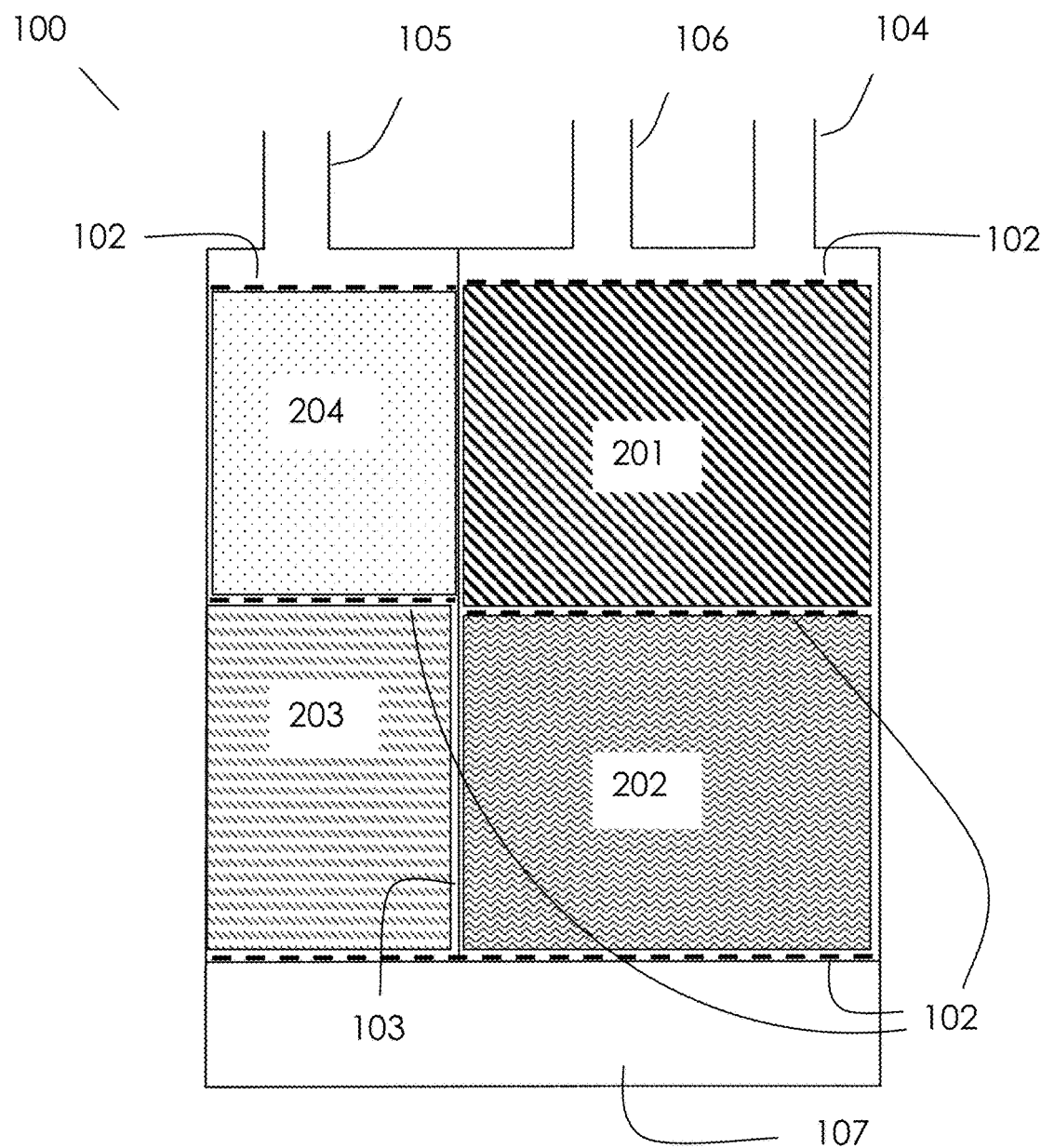
FIG. 2. is a cross-sectional view of an exemplary evaporative emission control canister system (100) as described herein.

In any of the embodiments of the evaporative emission control canister system described herein, the canister system may include more than one vent-side or subsequent adsorbent volume. For example, with reference to FIG. 2, the fuel-side or initial adsorbent volume 201 may have an additional or a plurality of vent-side (or subsequent) adsorbent volumes 202 before the support screen 102 above the plenum 107, as shown in FIG. 2. Additional vent-side (or subsequent) adsorbent volumes 203 and 204 may be found on the other side of the dividing wall.

Figure 3:
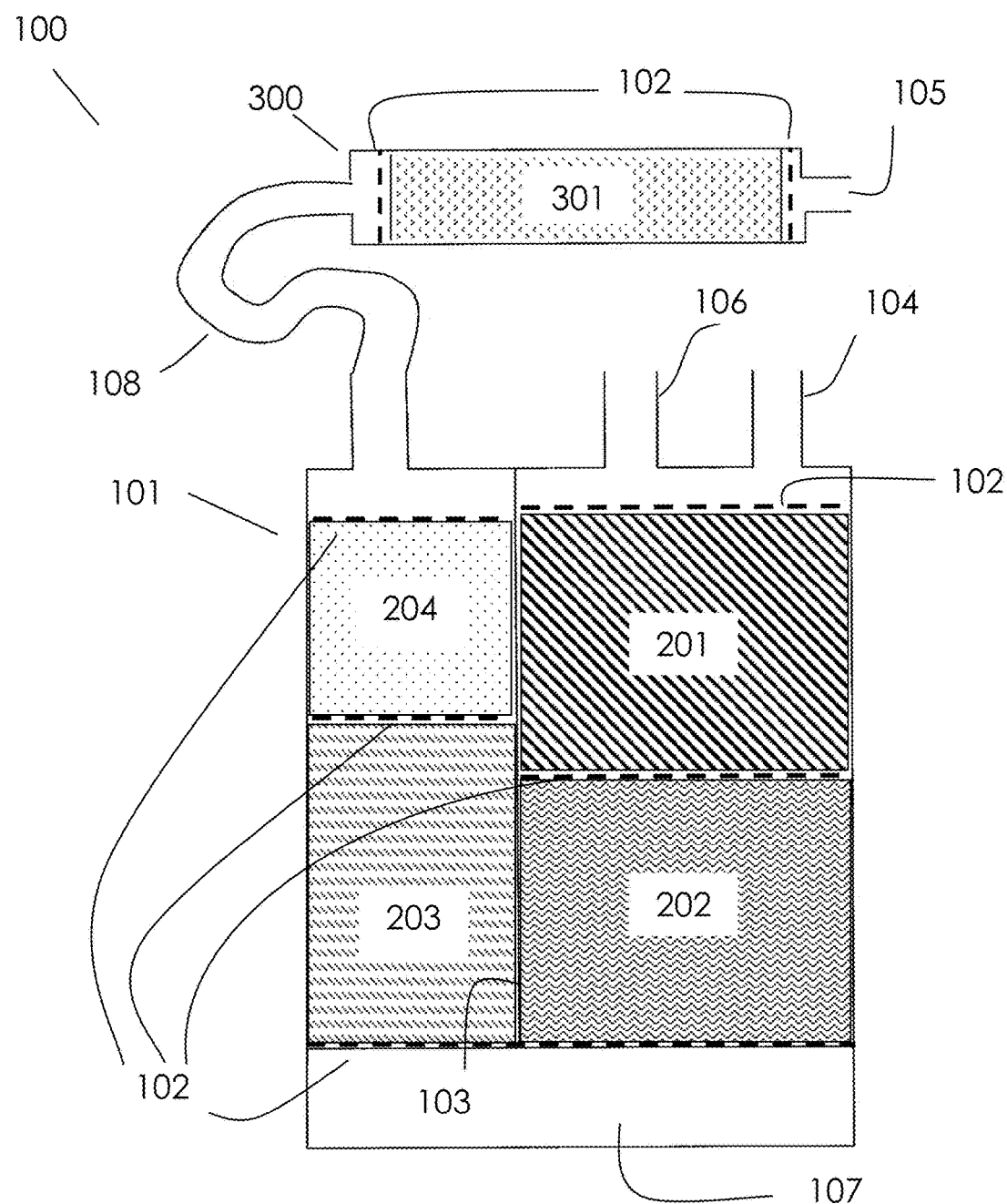
FIG. 3 is a cross-sectional view of an exemplary evaporative emission control canister system (100) as described herein, including four adsorbent volumes in the main canister (201, 202, 203, and 204), and an auxiliary canister (300) including a subsequent adsorbent volume (301) therein.
Figure 4:
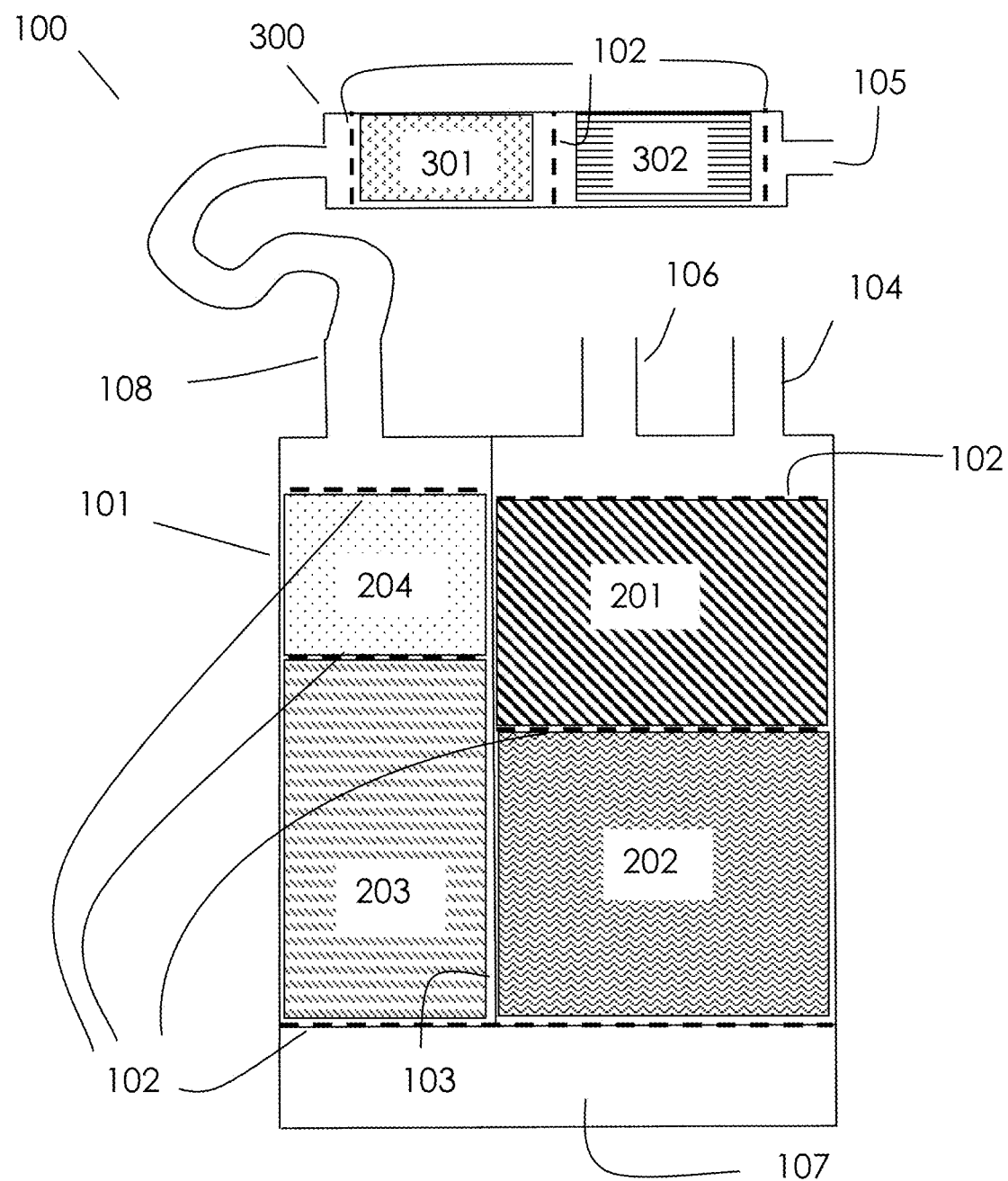
FIG. 4 is a cross-sectional view of an exemplary evaporative emission control canister system (100) as described herein, including four adsorbent volumes in the main canister (201, 202, 203, and 204), and an auxiliary canister (300) including two subsequent adsorbent volumes (301, 302) therein.

Furthermore, in still additional embodiments, the canister system may include more than one type of vent-side adsorbent volume, which can be independently selected, and/or which is comprised in one or more containers. For example, as shown in FIG. 3, an auxiliary chamber 300 containing a vent-side adsorbent volume 301, such as the PPAV as described herein, may be in-series in terms of air and vapor flow with the main canister 101 containing multiple adsorbent volumes connected for vapor flow by way of a connecting hose or snorkel 108. As shown in FIG. 4, the auxiliary chamber 300 may contain two vent-side adsorbent volumes in-series 301 and 302, including, for example, at least one PPAV as described herein. The adsorbent volumes 301 and 302 may also be contained within in-series chambers or auxiliary canisters, rather than the single chamber 300 of FIG. 4.

Figure 5:
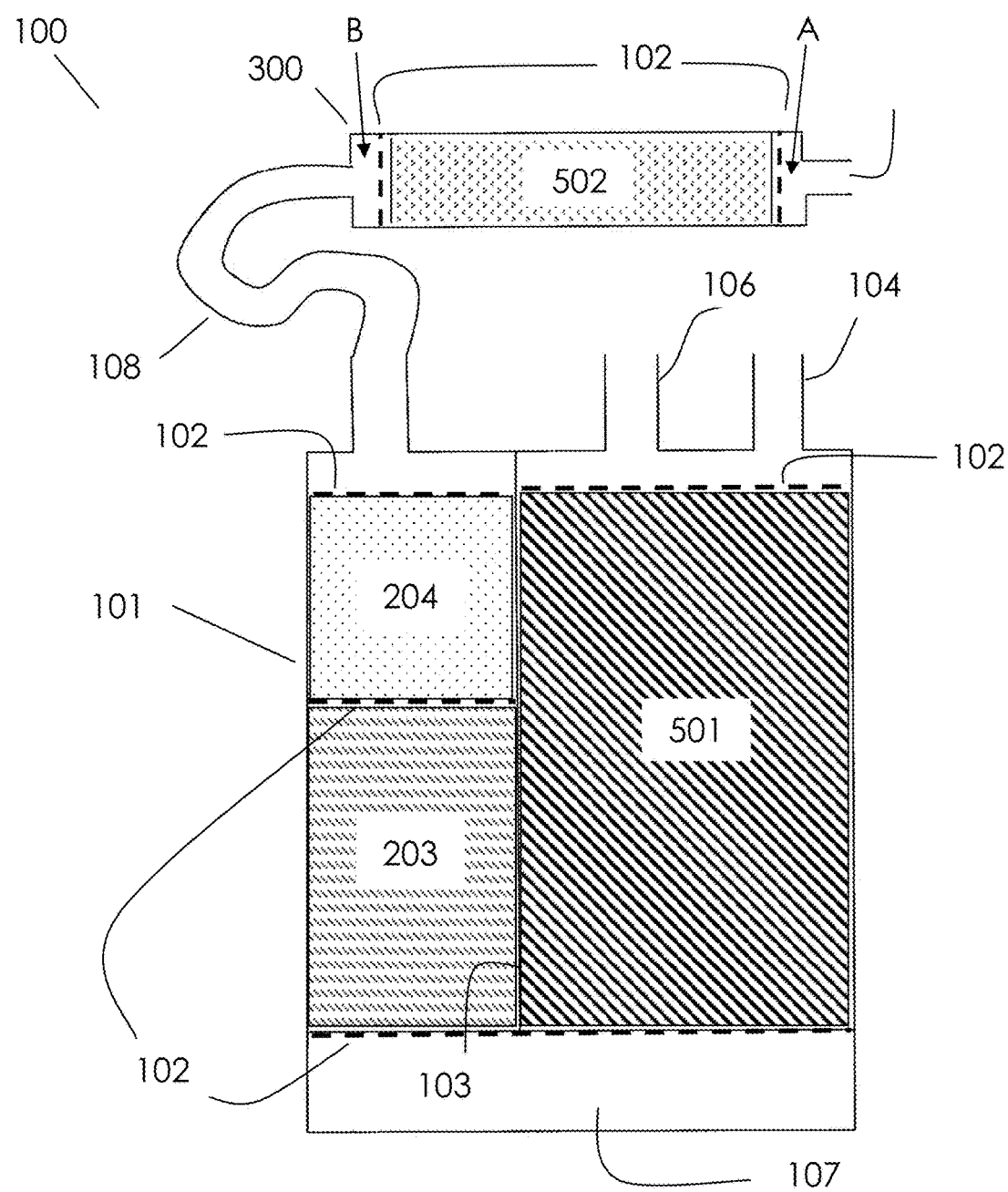
FIG. 5 is a cross-sectional view of an exemplary evaporative emission control canister system (100) illustrating a system with which the DBL emissions performance of the comparative and inventive examples are measured, including three adsorbent volumes in the main canister (501, 203, 204) when a single PPAV honeycomb (502) is present in an auxiliary vent-side canister (300).
Figure 6:
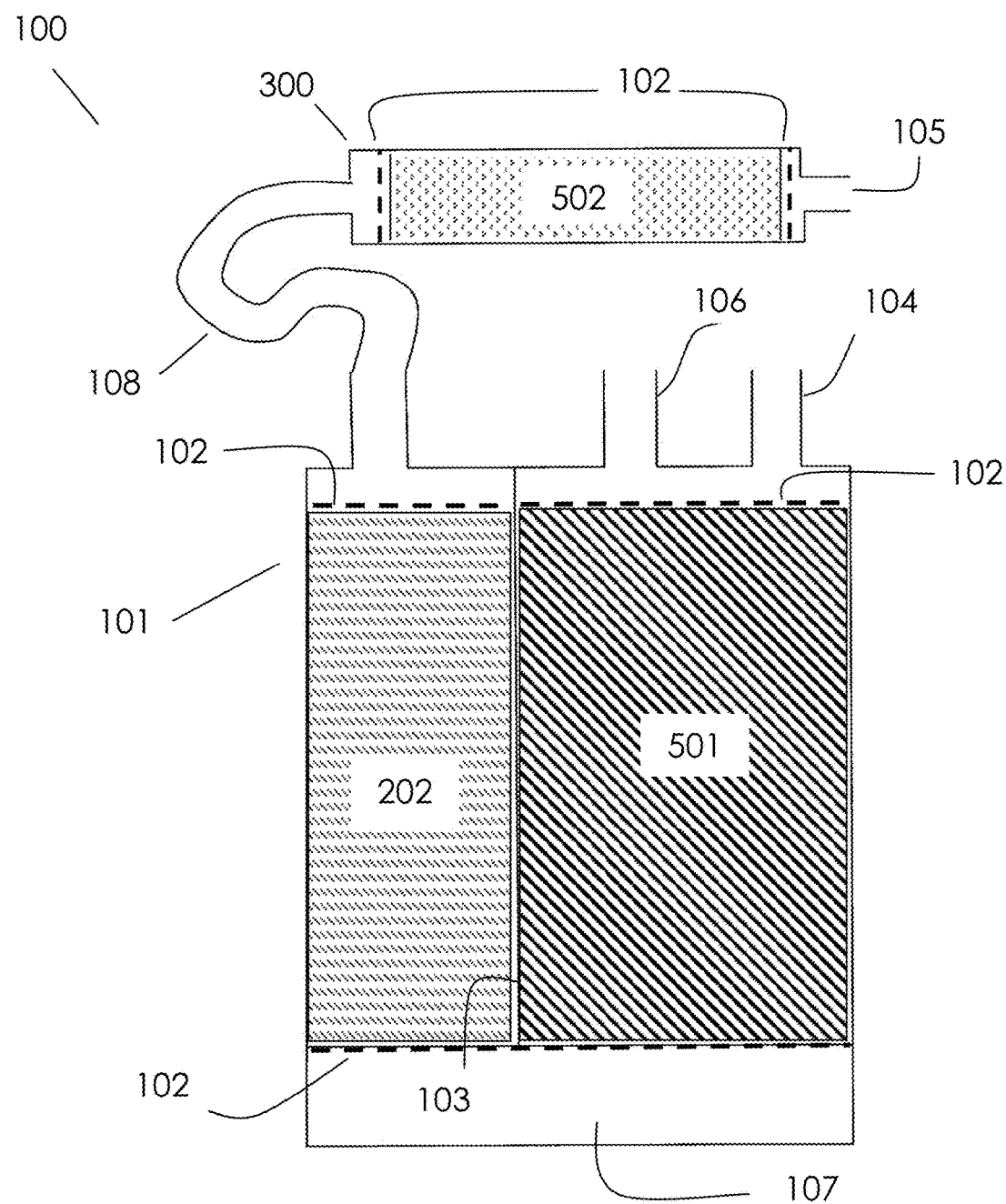
FIG. 6 is a cross-sectional view of an exemplary evaporative emission control canister system (100) illustrating a system with which the DBL emissions performance of the comparative and inventive examples are measured when there are only two adsorbent volumes in the main canister (501, 202) and there is one PPAV honeycomb (502) present in an auxiliary vent-side canister (300).
Figure 7:
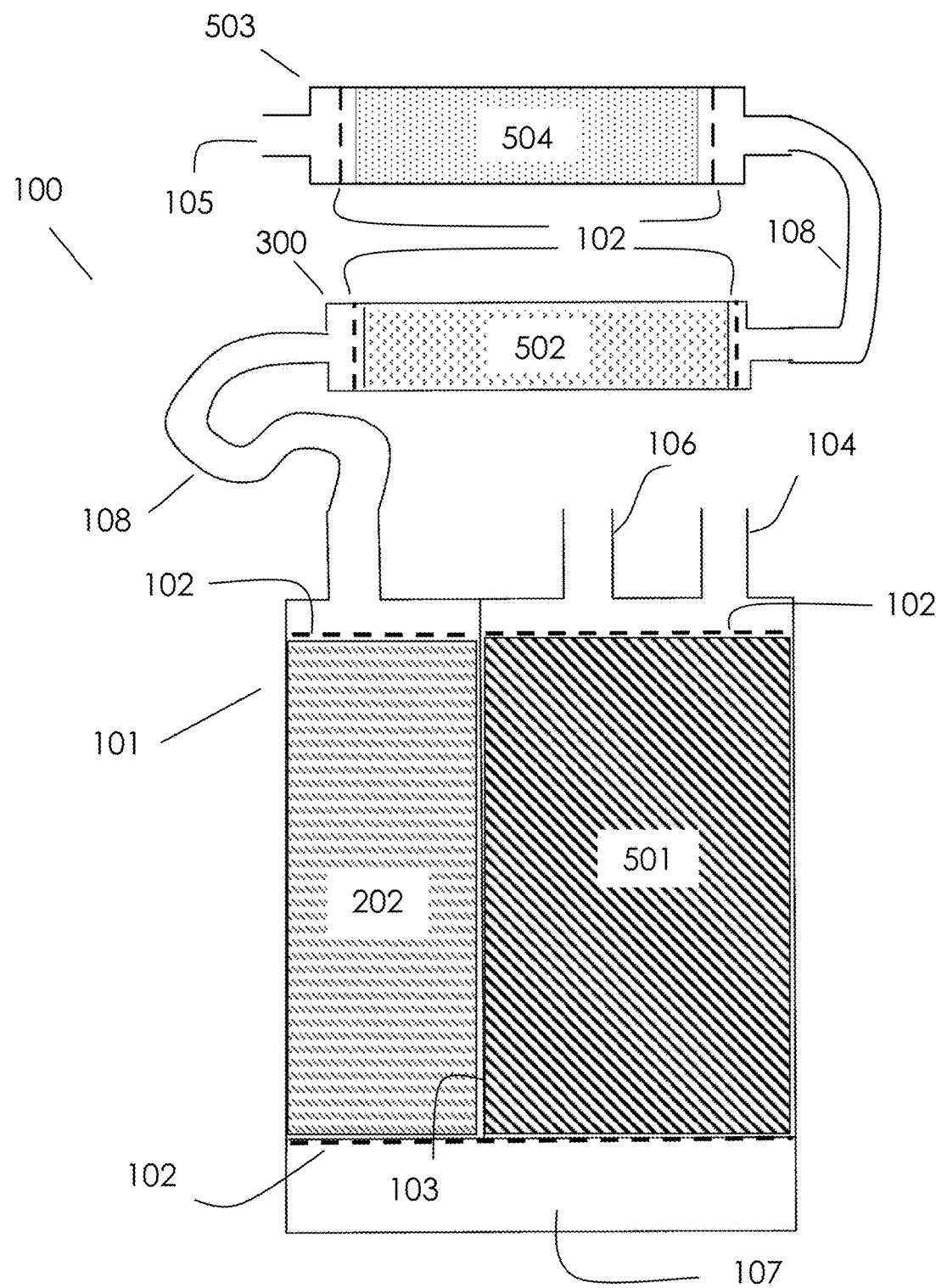
FIG. 7 is a cross-sectional view of an exemplary evaporative emission control canister system (100) illustrating a system with which the DBL emissions performance of the comparative and inventive examples are measured when there are only two adsorbent volumes in the main canister (501, 202) and there are two PPAV honeycombs (502, 504) present inside in-series auxiliary vent-side canisters (300, 503).
Figure 8:
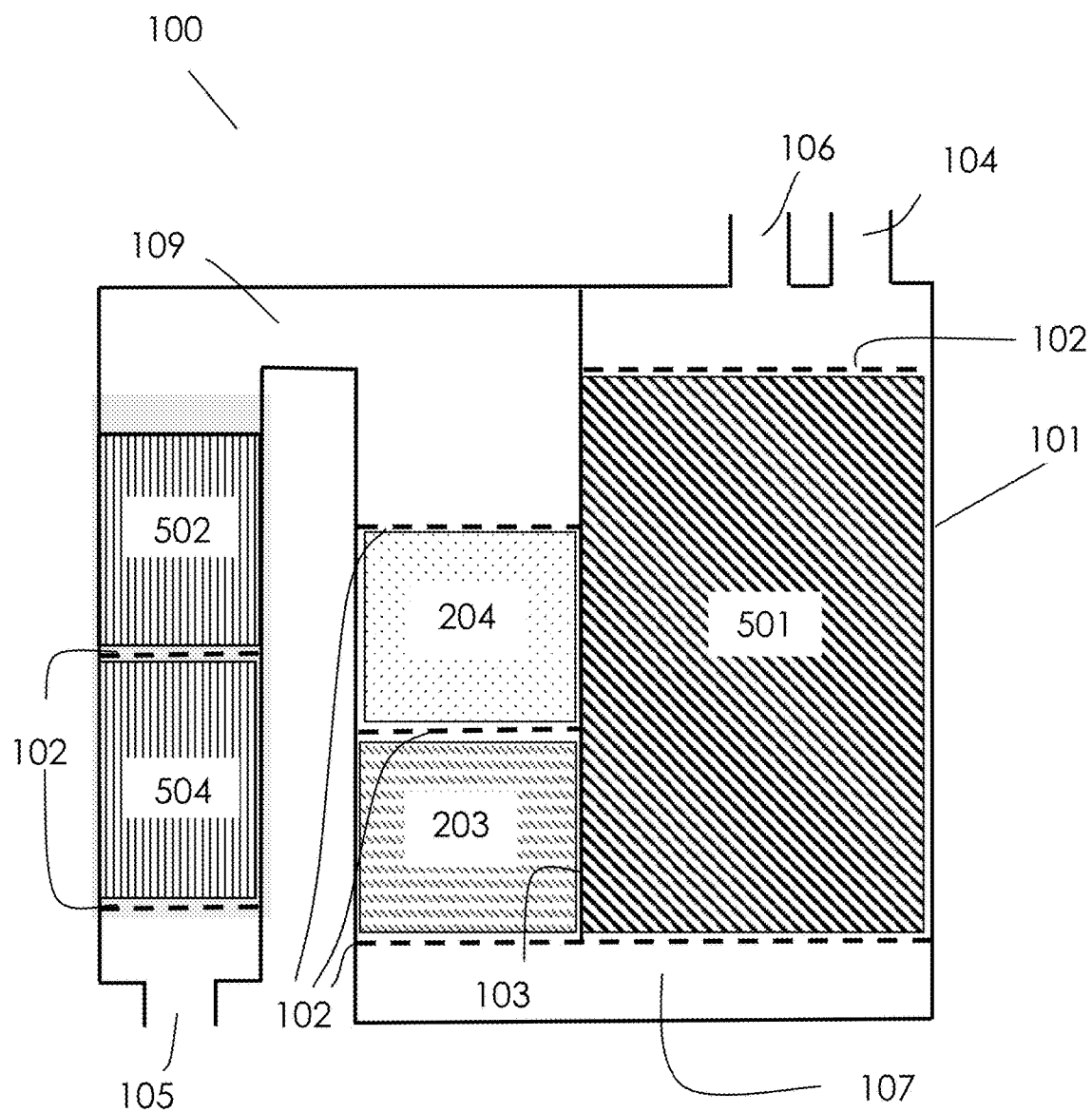
FIG. 8 is a cross-sectional view of an exemplary evaporative emission control canister system (100) illustrating a system with which DBL emissions performance of the comparative and inventive examples are measured when there are three adsorbent volumes in a portion of the main canister (501, 203, 204), and two PPAV honeycombs (502, 504) present in-series in another portion of the canister.

FIGS. 5-8 illustrate additional exemplary canister systems contemplated by the present disclosure. FIGS. 5 and 6 shows a system including a main canister 101 comprising an initial (fuel-side) adsorbent volume 501 and subsequent (vent-side) adsorbent volumes 202, 203 and 204. The system includes a connecting hose or snorkel 108 leading to a supplemental canister 300 on the vent-side, which includes an additional vent-side adsorbent volume 502, for example, a PPAV as described herein, prior to the vent port 105. FIG. 7 shows a system having an initial (fuel-side) adsorbent volume 501 a subsequent adsorbent volume 202 in the main canister 101, connected via connecting hoses 108 to supplemental canisters 300 and 503 that include subsequent (vent-side) adsorbent volumes 502, 504 prior to vent port 105. In an exemplary embodiment, at least one of 502 or 504 is a PPAV as described herein. FIG. 8 illustrates an example of a single canister 101 design that includes an initial (fuel-side) adsorbent volume 501, plenum space 107 leading to subsequent (vent-side) adsorbent volumes 203 and 204, a second plenum space 109 leading to additional subsequent (vent-side) adsorbent volumes 502 and 504 prior to vent port 105. In an exemplary embodiment, at least one of 502 or 504 is a PPAV as described herein.

As used herein, the term "upstream" refers to a location/volume within the system flow path that comes into contact with a fluid, e.g. fuel vapor, prior to or before another location/volume of the system along the flow path in the same relative direction. The term "downstream" refers to a location/volume within the system flow path that comes into contact with a fluid, e.g. fuel vapor, after or subsequent to an upstream location/volume of the system along the flow path in the same relative direction. That is, when referring to the fuel vapor flow path, an upstream location/volume is located closer to the fuel vapor inlet relative to another location/volume.

The term "fuel-side adsorbent volume" is used in reference to a volume of adsorbent material that is proximal to the fuel vapor source, and therefore, earlier in the fuel vapor flow path relative to a subsequent adsorbent volume, which is necessarily positioned closer to the vent port (herein, a "vent-side adsorbent volume"). As the skilled artisan would appreciate, during a purge cycle, a vent-side or subsequent adsorbent volume(s) is contacted earlier in the purge air flow path. For convenience, the fuel-side adsorbent may be referred to as the "initial adsorbent volume" because it is positioned upstream in the fuel vapor flow path relative to the vent-side or subsequent adsorbent volume but the initial adsorbent volume is not necessarily required to be the first adsorbent volume in the canister.

In any of the aspects or embodiments of the evaporative emission control system or the evaporative emission control canister system described herein, the canister(s) can further comprise additional adsorbent volumes as described herein, e.g., at least one adsorbent volume in a chamber nearest to the fuel tank (i.e., fuel-side adsorbent volume), and/or at least one adsorbent volume closer to the outlet to the atmosphere (i.e., subsequent or vent-side adsorbent volume), including a PPAV as described herein.

In an additional embodiment, the disclosure provides an evaporative emission control canister system comprising one or more canisters having a plurality of chambers, each defining a volume, which are connected or in fluid communication permitting a fluid (e.g., air, gas or fuel vapor) to flow directionally and sequentially from one chamber to the next, wherein at least one chamber comprises a PPAV as described herein. In certain embodiments, canister system comprises at least one additional adsorbent volume. In certain embodiments, the adsorbent volumes are located within a single canister or within a plurality of canisters that are connected to permit sequential contact by the fuel vapor.

In any of the aspects or embodiments of the evaporative emission control system or the evaporative emission control canister system described herein, the PPAV as described herein is incorporated into a vent-side volume in a 2.1 liter test canister having the dimensions as described herein and demonstrates two-day DBL bleed emissions performance (second day diurnal breathing loss (DBL) emissions) of about 100 mg or less, about 90 mg or less, about 80 mg or less, about 70 mg or less, about 60 mg or less, about 50 mg or less, about 40 mg or less, about 30 mg or less, about 20 mg or less, or about 10 mg or less.

In any of the aspects or embodiments of the evaporative emission control system or the evaporative emission control canister system described herein, demonstrates two-day DBL bleed emissions performance of from about 10 mg to about 100 mg, from about 10 mg to about 90 mg, from about 10 mg to about 80 mg, from about 10 mg to about 70 mg, from about 10 mg to about 60 mg, from about 10 mg to about 50 mg, from about 10 mg to about 40 mg, from about 10 mg to about 30 mg, from about 10 mg to about 20 mg, from about 15 mg to about 100 mg, from about 15 mg to about 90 mg, from about 15 mg to about 80 mg, from about 15 mg to about 70 mg, from about 15 mg to about 60 mg, from about 15 mg to about 50 mg, from about 15 mg to about 40 mg, from about 15 mg to about 30 mg, from about 15 mg to about 20 mg, from about 20 mg to about 100 mg, from about 20 mg to about 90 mg, from about 20 mg to about 80 mg, from about 20 mg to about 70 mg, from about 20 mg to about 60 mg, from about 20 mg to about 50 mg, from about 20 mg to about 40 mg, from about 20 mg to about 30 mg, from about 30 mg to about 100 mg, from about 30 mg to about 90 mg, from about 30 mg to about 80 mg, from about 30 mg to about 70 mg, from about 30 mg to about 60 mg, from about 30 mg to about 50 mg, from about 30 mg to about 40 mg, from about 40 mg to about 100 mg, from about 40 mg to about 90 mg, from about 40 mg to about 80 mg, from about 40 mg to about 70 mg, from about 40 mg to about 60 mg, from about 40 mg to about 50 mg, from about 50 mg to about 100 mg, from about 50 mg to about 90 mg, from about 50 mg to about 80 mg, from about 50 mg to about 70 mg, from about 50 mg to about 60 mg, from about 60 mg to about 100 mg, from about 60 mg to about 90 mg, from about 60 mg to about 80 mg, from about 60 mg to about 70 mg, from about 70 mg to about 100 mg, from about 70 mg to about 90 mg, from about 70 mg to about 80 mg, from about 80 mg to about 100 mg, from about 80 mg to about 90 mg, or from about 90 mg to about 100 mg, including all values and ranges overlapping, subsumed.

In any of the aspects or embodiments of the evaporative emission control system or the evaporative emission control canister system described herein comprising a PPAV as described herein provides the above two-day DBL bleed emissions performance at no more than 210 liters (i.e., 100

BV) or no more than 315 liters (i.e., 150 BV) of purge applied after a 40 g/hr butane loading step as determined by the 2012 BETP.

In any of the aspects or embodiments of the evaporative emission control system or the evaporative emission control canister system described herein, the evaporative emission control canister system comprises at least one fuel-side adsorbent volume and at least one subsequent (i.e., vent-side) adsorbent volume, wherein at least one of the at least one fuel-side adsorbent volume or at least one subsequent adsorbent volume includes a PPAV as described herein.

In any of the aspects or embodiments of the evaporative emission control system or the evaporative emission control canister system described herein, the evaporative emission control canister system further comprises a heating unit or a means to add heat through electrical resistance or heat conduction.

In any of the aspects or embodiments of the evaporative emission control system or the evaporative emission control canister system described herein, the evaporative emission control canister system comprises one or more vent-side adsorbent volumes having a substantially uniform cell structure at or near the end of the fuel vapor flow path.

In certain embodiments, the at least one fuel-side or initial adsorbent volume and the at least one vent-side or subsequent adsorbent volume (or volumes) are in vaporous or gaseous communication and define an air and vapor flow path therethrough. The air and vapor flow path permits or facilitates directional air or vapor flow or diffusion between the respective adsorbent volumes in the canister system. For example, the air and vapor flow path facilitates the flow or diffusion of fuel vapor from the at least one fuel-side or initial adsorbent volume to the at least one vent-side or subsequent adsorbent volume (or volumes), including a PPAV as described herein.

In any of the aspects or embodiments of the evaporative emission control system or the evaporative emission control canister system described herein, the at least one fuel-side or initial adsorbent volume and the at least one vent-side or subsequent adsorbent volume(s) may be located within a single canister, separate canisters or a combination of both. For example, in certain embodiments, the system comprises one or more canisters comprising a fuel-side or initial adsorbent volume, and one or more vent-side or subsequent adsorbent volumes, wherein the vent-side or subsequent adsorbent volumes are connected to the fuel-side initial adsorbent volume such that they are in vaporous or gaseous communication forming a vapor flow path, and allowing air and/or vapor to flow or diffuse therethrough, and wherein at least one venti-side adsorbent volume is a vent-side PPAV as described herein. In certain aspects, the canister permits sequential contact of the adsorbent volumes by air or fuel vapor.

In additional embodiments, the evaporative emission control canister system comprises a canister comprising an initial adsorbent volume, and one or more subsequent adsorbent volumes connected to one or more separate canisters comprising at least one additional subsequent adsorbent volume, including a vent-side PPAV as described herein, wherein the subsequent adsorbent volumes are connected to the initial adsorbent volume such that they are in vaporous or gaseous communication forming a vapor flow path, and allowing air and/or fuel vapor to flow or diffuse therethrough.

In any of the aspects or embodiments of the evaporative emission control system or the evaporative emission control canister system described herein, the evaporative emission control canister system comprises one or more canisters comprising a fuel-side or an initial adsorbent volume, and one or more vent-side PPAV comprising an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof, and at least one of: (i) plurality channel width ($t_{c,\,avg}$) of less than about 1.25 mm; (ii) plurality channel width cell pitch ($CP_{tc,\,avg}$) of less than about 1.5 mm; (iii) cell density of from about 285 to about 1000 cpsi; (iv) cell wall thickness of less than about 0.5 mm; (v) BWC of less than about 10 g/dL; (vi) an incremental adsorption capacity between 5% and 50% n-butane at 25 C of less than about 50 g/L; or (vii) a combination thereof, wherein the fuel-side adsorbent volume and the PPAV are in vaporous or gaseous communication forming a vapor flow path allowing air and/or fuel vapor to flow or diffuse therethrough.

In certain embodiments, the evaporative emission control canister system has a two-day diurnal breathing loss (DBL) of no more than 50, 40, 30, 20, or 10 mg at no more than 315, 300, 290, 280, 270, 260, 250, 240, 230, 220, 210, 200, 190, 180, 170, 160, 150, 140, 130, 120, 110, or 100 liters of purge or no more than 150, 140, 130, 120, 110, 100, 90, 80, 75, 70, 65, 60, 55, 50, 45, 40, 35 or 30 bed volumes (BV) applied after a 40 g/hr butane loading step as determined by the 2012 California Bleed Emissions Test Procedure (BETP).

In any of the aspects or embodiments of the evaporative emission control system or the evaporative emission control canister system described herein, the evaporative emission control canister system comprises a canister comprising a fuel-side or an initial adsorbent volume, and a PPAV, wherein the PPAV is a monolith such as a honeycomb, having an average channel hydraulic diameter of less than 1.25 mm and an hydraulic diameter cell pitch of less than 1.5 mm. In certain embodiments the plurality of channels of approximately the same cross-sectional dimensions, and not including peripheral channels in the cross-section, have a channel width plurality less than 1.25 mm and a plurality width cell pitch of less than 1.5 mm.

In any of the aspects or embodiments of the evaporative emission control system or the evaporative emission control canister system described herein, the fuel-side or initial adsorbent volume is the first and/or second adsorbent volume, as such, the vent-side or subsequent adsorbent volumes, including a PPAV as described herein, are downstream in the fluid flow path towards the vent port whether in the same or a separate canister or both.

In any of the aspects or embodiments of the evaporative emission control system or the evaporative emission control canister system described herein, the disclosure provides an evaporative emission control canister system comprising one or more canisters having a plurality of chambers, each chamber defining a volume, which are in fluid communication allowing a fluid or vapor to flow directionally from one chamber to the next, and at least one chamber comprises at least one parallel passage adsorbent volume (PPAV), wherein the at least one PPAV has an incremental adsorption capacity (IAC) at 25° C. of less than 35 g/L between vapor concentrations of 5 vol % and 50 vol % n-butane, an average channel hydraulic diameter of less than 1.25 mm, and an hydraulic diameter cell pitch (which is of the sum of the average cell channel hydraulic diameter plus the average cell wall thickness (excluding the outer skin wall thickness)) of less than 1.5 mm.

In any of the aspects or embodiments of the evaporative emission control system or the evaporative emission control canister system described herein, the disclosure provides an evaporative emission control canister system including one or more canisters comprising at least one fuel-side adsorbent volume; and at least one vent-side at least one parallel passage adsorbent volume (PPAV), wherein the at least one PPAV has an incremental adsorption capacity (IAC) at 25° C. of less than 35 g/L between vapor concentrations of 5 vol % and 50 vol % n-butane, an average channel hydraulic diameter of less than 1.25 mm, and an hydraulic diameter cell pitch of less than 1.5 mm.

In any of the aspects or embodiments of the evaporative emission control system or the evaporative emission control canister system described herein, the disclosure provides an evaporative emission control canister system including one or more canisters comprising at least one fuel-side adsorbent volume; and at least one vent-side at least one parallel passage adsorbent volume (PPAV), wherein the at least one PPAV has an incremental adsorption capacity (IAC) at 25° C. of less than 35 g/L between vapor concentrations of 5 vol % and 50 vol % n-butane, an average channel hydraulic diameter ($t_{c,Dh}$) of less than 1.25 mm, and an hydraulic diameter cell pitch ($CP_{Dh}$) of less than 1.5 mm.

In any of the aspects or embodiments of the evaporative emission control system or the evaporative emission control canister system described herein, the disclosure provides an evaporative emission control canister system comprising one or more canisters having a plurality of chambers, each chamber defining a volume, which are in fluid communication allowing a fluid or vapor to flow directionally from one chamber to the next, and at least one chamber comprises at least one parallel passage adsorbent volume (PPAV) as described herein, wherein the at least one PPAV has an average channel hydraulic diameter of less than 1.25 mm, an incremental adsorption capacity (IAC) at 25° C. of less than 50 g/L between vapor concentrations of 5 vol % and 50 vol % n-butane, a plurality of channel width ($t_{c,\ avg}$) of less than 1.25 mm, and a plurality width cell pitch ($CP_{tc,\ avg}$) (which is the average of the plurality of channel widths of channels of approximately the same cross-sectional dimensions, and not including peripheral channels or cells in the cross-section, plus the average channel wall thickness (excluding the outer skin wall thickness)) of less than 1.5 mm.

In any of the aspects or embodiments of the evaporative emission control system or the evaporative emission control canister system described herein, the disclosure provides an evaporative emission control canister system including one or more canisters comprising at least one fuel-side adsorbent volume; and at least one vent-side parallel passage adsorbent volume (PPAV), wherein the at least one vent-side PPAV has an incremental adsorption capacity (IAC) at 25° C. of less than 35 g/L between vapor concentrations of 5 vol % and 50 vol % n-butane, a plurality of channel width ($t_{c,\ avg}$) of less than 1.25 mm, and a plurality width cell pitch ($CP_{tc,\ avg}$) of less than 1.5 mm.

In any of the aspects or embodiments of the evaporative emission control system or the evaporative emission control canister system described herein, the disclosure provides an evaporative emission control canister system including one or more canisters comprising at least one fuel-side adsorbent volume; and at least one vent-side parallel passage adsorbent volume (PPAV), wherein the at least one vent-side PPAV has an incremental adsorption capacity (IAC) at 25° C. of less than 25 g/L between vapor concentrations of 5 vol % and 50 vol % n-butane, a plurality of channel width ($t_{c,\ avg}$) of less than 1.25 mm, and a plurality width cell pitch ($CP_{tc,\ avg}$) of less than 1.5 mm.

In another aspect, the disclosure provides an evaporative emission control system comprising a fuel tank for storing fuel; an engine having an air induction system and adapted to consume the fuel; an evaporative emission control canister system including one or more canisters comprising a plurality of adsorbent volumes including at least one fuel-side adsorbent volume; and at least one vent-side parallel passage adsorbent volume (PPAV) as described herein, wherein the at least one vent-side PPAV has an average channel hydraulic diameter of less than 1.25 mm, an incremental adsorption capacity (IAC) at 25° C. of less than 50 g/L between vapor concentrations of 5 vol % and 50 vol % n-butane, an average channel hydraulic diameter ($t_{c,D}h$) of less than 1.25 mm, and an hydraulic diameter cell pitch ($CP_{Dh}$) of less than 1.5 mm; a fuel vapor inlet conduit connecting the evaporative emission control canister system to the fuel tank; a fuel vapor purge conduit connecting the evaporative emission control canister system to the air induction system of the engine; and a vent port for venting the evaporative emission control canister system and for admission of purge air to the evaporative emission control canister system, wherein the evaporative emission control canister system is defined by: a fuel vapor flow path from the fuel vapor inlet conduit through a plurality of adsorbents to the vent port, and an air flow path from the vent port through the plurality of adsorbent volumes and the fuel vapor purge outlet.

In an additional aspect, the disclosure provides methods for reducing fuel vapor emissions in an evaporative emission control system, the method comprising providing one or more canisters comprising a fuel-side adsorbent volume and at least one parallel-passage adsorbent volume (PPAV), and contacting the fuel vapor with the adsorbent volumes), wherein the at least one vent-side PPAV has an average channel hydraulic diameter of less than 1.25 mm, and an hydraulic diameter cell pitch of less than 1.5 mm, and optionally, an incremental adsorption capacity (IAC) at 25° C. of less than 50 g/L between vapor concentrations of 5 vol % and 50 vol % n-butane.

In an additional aspect, the disclosure provides methods for reducing fuel vapor emissions in an evaporative emission control system, the method comprising providing one or more canisters comprising a plurality of adsorbent volumes including at least one fuel-side adsorbent volume; and at least one vent-side parallel passage adsorbent volume (PPAV), wherein the at least one vent-side PPAV has an average channel hydraulic diameter of less than 1.25 mm, a plurality of channel widths of less than 1.25 mm, and a plurality width cell pitch of less than 1.5 mm, and optionally, an incremental adsorption capacity (IAC) at 25° C. of less than 50 g/L between vapor concentrations of 5 vol % and 50 vol % n-butane.

In any of the aspects or embodiments described herein, the at least one parallel passage adsorbent volume, or at least one vent-side parallel passage adsorbent volume has at least one of: an incremental adsorption capacity (IAC) at 25° C. of less than 50 g/L between vapor concentrations of 5 vol % and 50 vol % n-butane, an average channel hydraulic diameter of less than 1.25 mm, and a hydraulic diameter cell pitch of less than 1.5 mm, or a combination thereof. In any of the aspects or embodiments described herein, the at least one parallel passage adsorbent volume, or at least one vent-side parallel passage adsorbent volume has at least one of: an incremental adsorption capacity (IAC) at 25° C. of less than 50 g/L between vapor concentrations of 5 vol % and 50 vol % n-butane, a plurality of channel widths of less than 1.25 mm, and a plurality width cell pitch of less than 1.5 mm, or a combination thereof.

In any of the aspects or embodiments described herein, the evaporative emission control canister system comprises at least one fuel-side adsorbent volume, at least one vent-side PPAV, and optionally at least one additional vent-side adsorbent volume.

In any of the aspects or embodiments described herein, the adsorbent volumes are located within a single canister or within a plurality of canisters that are connected to permit sequential contact by the fuel vapor.

In any of the aspects or embodiments described herein, the at least one vent-side PPAV is an activated carbon honeycomb.

In any of the aspects or embodiments described herein, the at least one additional vent-side adsorbent volume is an activated carbon honeycomb.

In any of the aspects or embodiments described herein, the activated carbon is derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, ligno-cellulosic material, and combinations thereof.

In any of the aspects or embodiments described herein, the form of the adsorbent includes a member selected from the group consisting of granular, pellet, spherical, honeycomb, monolith, pelletized cylindrical, particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, hollow-cylinder, star, twisted spiral, asterisk, configured ribbons, and combinations thereof.

In any of the aspects or embodiments described herein, the canister system further comprises a heat unit.

In any of the aspects or embodiments described herein, the evaporative emission control canister system comprises at least one vent-side parallel passage adsorbent volume (PPAV), wherein the at least one PPAV has an average channel hydraulic diameter of less than 1.25 mm, and an hydraulic diameter cell pitch of less than 1.50 mm, wherein the at least one vent-side PPAV optionally has an effective BWC of less than about 10 g/dL, an effective incremental adsorption capacity at 25° C. of less than about 50 grams n-butane per liter (g/L) between vapor concentration of 5 vol % and 50 vol % n-butane or a combination thereof.

Additional aspects and embodiments will be evident to the skilled artisan based on the description above in view of the examples that follow, which are expressly contemplated as being part of the description as though expressly set forth herein.

EXAMPLES

Determination of Apparent Density, BWC, and Powder Butane Activity

ASTM D2854 (may be used to determine the apparent density of particulate adsorbents, such as granular and pelletized adsorbents of the size and shape typically used for evaporative emission control for fuel systems.

ASTM D5228 may be used to determine the butane working capacity (BWC) of the adsorbent volumes containing particulate granular and/or pelletized adsorbents. The butane retentivity is calculated as the difference, in units of g/dL, between the volumetric butane activity (i.e., the g/cc apparent density multiplied by the g/100 g butane activity) and the g/dL BWC.

For powdered activated carbon ingredients for extrusion, a powder butane activity ("pBACT") may be measured by any method known to those of skill in the art recognized as equivalent for ascertaining that value, i.e., the equilibrated gram weight capacity of the oven dried powder sample when exposed to 1.00 atm partial pressure of n-butane, for the sample thermostatted at 25° C. One suitable alternative for pBACT, for example, is based on the ASTM 5228 method, as described in US 2019/0226426A1, which is incorporated herein by reference in its entirety.

A modified version of ASTM D5228 method may be used to determine the butane working capacity (BWC) of particulate, honeycomb, monolith, and/or sheet adsorbent volumes. The modified ASTM D5228 method may also be used for particulate adsorbents, where the particulate adsorbents include fillers, voids, structural components, or additives. Furthermore, the ASTM D5228 modified method may be used where the particulate adsorbents are not compatible with the standard method ASTM D5228, e.g., a representative adsorbent sample may not be readily placed as the 16.7 mL fill in the sample tube of the test.

The modified version of ASTM D5228 method is as follows. The adsorbent sample (e.g., a PPAV honeycomb or monolith) is oven-dried for a minimum of three hours at 110±5° C., and then placed in desiccators to cool down. The dry mass of the adsorbent sample is recorded. The mass of the empty testing assembly (which is 47 mm inside diameter×200 mm long) is determined before the adsorbent sample is assembled into a testing assembly. Then, the test assembly is installed into the flow apparatus and loaded with n-butane gas for a minimum of 25 minutes (±0.2 min) at a butane flow rate of 500 ml/min at 25° C. and 1 atm pressure. The test assembly is then removed from the BWC test apparatus. The mass of the test assembly is measured and recorded to the nearest 0.001 grams. This n-butane loading step may be repeated for successive 5 minutes flow intervals until constant mass is achieved. In the examples described herein, the time for loading and purging time was calculated based on part volume. For example, the total butane load time for a 35 mm diameter×150 mm long honeycomb was from 87 to 92 minutes. The test assembly may be a holder for a honeycomb or monolith part, for the cases where the volume may be removed and tested intact. Alternatively, the volume may need to be a section of the canister system, or a suitable reconstruction of the volume with the contents appropriately oriented to the gas flows, as otherwise encountered in the canister system.

The test assembly is reinstalled to the test apparatus and purged with 2 liter/min dry air at 25° C. and 1 atm pressure for a set selected purge time (±0.2 min) according to the formula:

Purge Time(min)=(719×Volume(ml))/(2000(ml/min)).

The direction of the air purge flow in the BWC test is in the same direction as the purge flow to be applied in the canister system. After the purge step, the test assembly is removed from the BWC test apparatus. The mass of the test assembly is measured and recorded to the nearest 0.001 grams within 15 minutes of test completion.

The butane working capacity (BWC) of the adsorbent sample was determined using the following equation:

BWC (g/dL)=Amount of Butane Purged (g)/Nominal Adsorbent Volume (dL).

wherein the Amount of Butane Purged=Mass of the test assembly after loading−Mass of the test assembly after purge. For examples including a cylindrical PPAV, the following calculations were also used:

Apparent Density (g/mL) is calculated as Volume (mL)/mass of adsorbent (g);

Adsorbent Volume (ml) is calculated as $\pi D_{o,c}(mm)^2 L(mm)/4000$;

Butane Activity (g/100 g) is calculated as, BACT (g/100 g)=amount of butane loaded (g)/(100×mass of adsorbent (g));

Butane Purge Ratio (%)=BPR (%) is calculated as, amount of butane purged (g)/amount of butane loaded (g)×100.

Determination of Diurnal Breathing Loss (DBL) Emissions According to a BETP Test The evaporative emission control systems in the examples were tested by a protocol that include the following. For tests with the type A canister system, the defined 2.1 L canister that was used for generating the DBL emissions data was of the type illustrated in FIG. 5. The three pellet bed volumes 501, 203, and 204 were located in a main canister 101, containing 1.40 L, 0.40 L and 0.30 L of pellets, respectively. The example PPAV honeycomb was present as adsorbent volume 502 in an auxiliary canister 300, including seals around the cylinders for sealing (not shown in canister illustrations) and thin disks of non-adsorbent open cell foam on each end of the honeycomb (102 in FIG. 5).

For tests with the type B canister system (examples are noted herein with a 'B' suffix), the adsorbent bed configuration was the same as with the type A system, except that 1) a different, single grade of carbon pellets was used in the main canister, and 2) the two adsorbent volumes 203 and 204 of FIG. 4 were configured as a single 0.70 L volume of pellets, as illustrated in FIG. 6. For the example noted as "12a+bB", the canister system was type B, with the exception that there were two auxiliary canisters in-series, as illustrated in FIG. 7. The first auxiliary canister 300 contained PPAV honeycomb 12a as adsorbent volume 502 and the in-series second auxiliary canister 503 contained PPAV honeycomb 12b as adsorbent volume 504, with seals (not shown) and, and with non-adsorbent open cell foam disks 102 at each end of the two PPAV honeycombs.

In the type A system, a 1.40 L of NUCHAR® BAX 1500 (Ingevity®, North Charleston, S.C., USA) as adsorbent volume 501, with about a 19.5 cm height above the support screen 102 located above the plenum 107, plus a 0.40 L adsorbent volume 203 of NUCHAR® BAX 1500 with about a 11.1 cm height above the support screen 102 located above the plenum 107, and plus a 0.3 L adsorbent volume 204 of NUCHAR® BAX LBE with about a 8.4 cm height above a support screen 102 between adsorbent volumes 203 and 204. The adsorbent volume 501 had an average width of 9.0 cm from the dividing wall 103 to the right side wall of the canister, and the adsorbent volumes 203 and 204 have average widths of about 4.5 cm from the dividing wall 103 to its left sidewall. Adsorbent volumes 501, 203, and 204 had similar depths (into the page in FIG. 5) of 8.0 cm. Each adsorbent bed of pellets was filled with the dry-basis mass determined by the apparent density that would meet the respective volume target (mass fill=AD×volume target). Table 1 describes the grade and properties of the main canister adsorbent volume fills. For type B canister systems, the adsorbent volumes in the main canister were only filled with NUCHAR® BAX 1100 LD, as described in Table 1.

For tests with Type C canisters, the defined canister that was used for generating the DBL emissions data was of the type illustrated in FIG. 8. This canister system was a commercial canister used in Honda CR-V Model Year 2017 vehicles (Evap Family HHNXR01221SA/B). The Type C canister was used with the examples noted as 20 a+bC and 21 a+bC, The type C system had 1.86 L of NUCHAR® BAX 1100 LD (Ingevity®, North Charleston, S.C., USA) as adsorbent volume 501 with about a 22.6 cm height above the support screen 102 located above the plenum 107, plus a 0.26 L adsorbent volume 203 of NUCHAR® BAX 1100 LD with about a 7.8 cm height above the support screen 102 located above the plenum 107, and plus a 0.23 L adsorbent volume 204 of NUCHAR® BAX LBE with about a 7.4 cm height above a support screen 102 between adsorbent volumes 203 and 204. The adsorbent volume 501 was cylindrical and had a diameter of 11.1 cm, and the adsorbent volumes 203 and 204, also cylindrical, with average diameters of about 6.8 cm. Following air gap 109, was PPAV honeycomb 20a (or 21a) as adsorbent volume 502 and the in-series second PPAV honeycomb 20b (or 21b) as adsorbent volume 504, with seals (not shown) and with non-adsorbent open cell foam disks 102 at each end of the two PPAV honeycombs.

Each example canister system was uniformly preconditioned (aged) by repetitive cycling of gasoline vapor adsorption using certified Tier 3 fuel (8.7-9.0 RVP, 10 vol % ethanol) and 300 bed volumes of dry air purge at 22.7 LPM based on the main canister (e.g., 630 liters for a 2.1 L main canister). The gasoline vapor load rate was 40 g/hr and the hydrocarbon composition was 50 vol %, generated by heating two liters of gasoline to about 38° C. and bubbling air through at 200 ml/min. The two-liter aliquot of fuel was replaced automatically with fresh gasoline regularly to maintain an approximately constant vapor generation rate until 5000 ppm breakthrough as butane was detected by an FID (flame ionization detector) or infrared detector. A minimum of 25 aging cycles were used on a virgin canister. The gasoline working capacity (GWC) was measured as the average weight gain of loaded vapors and loss of purged vapors for the last 2-3 cycles and is reported as grams per liter of adsorbent volumes in the canister system. In proceeding further to measure bleed emission performance, the GWC aging cycles were followed by a single butane adsorption/air purge step. Butane was loaded at 40 g/hour at a 50 vol % concentration in air at one atm to 5000 ppm breakthrough, followed by soaking for one hour, then purging with dry air for 21 minutes with a total purge volume attained by selecting the appropriate constant air purge rate for that period. The canister system was then soaked with the ports sealed for about 14-18 hrs at about 25° C. (where 12-36 hrs is the requirement for the soak time). For the DBL data in FIGS. 17 through 22, 25-32, and 42-44 the total purge volume following the above single butane adsorption loading was 210 L, equivalent, for example, to about 91-95 BV for a complete canister system that includes all adsorbent volumes present, e.g., the 2.1 L adsorbent volume fills of the defined canister, plus a vent-side activated carbon honeycomb adsorbent 502 placed in the subsequent auxiliary canister 300, or two activated carbon honeycomb adsorbents 502 and 504 placed in subsequent in-series auxiliary canisters 300 and 503. In these configurations, the volume to be added to the adsorbent pellet volumes in the defined main canister was the caliper measured dimensional volume of the activated carbon honeycomb present within auxiliary canister 300, plus, if present, the caliper-measured dimensional volume of the second activated carbon honeycomb within the in-series auxiliary canister 503.

Figure 32:
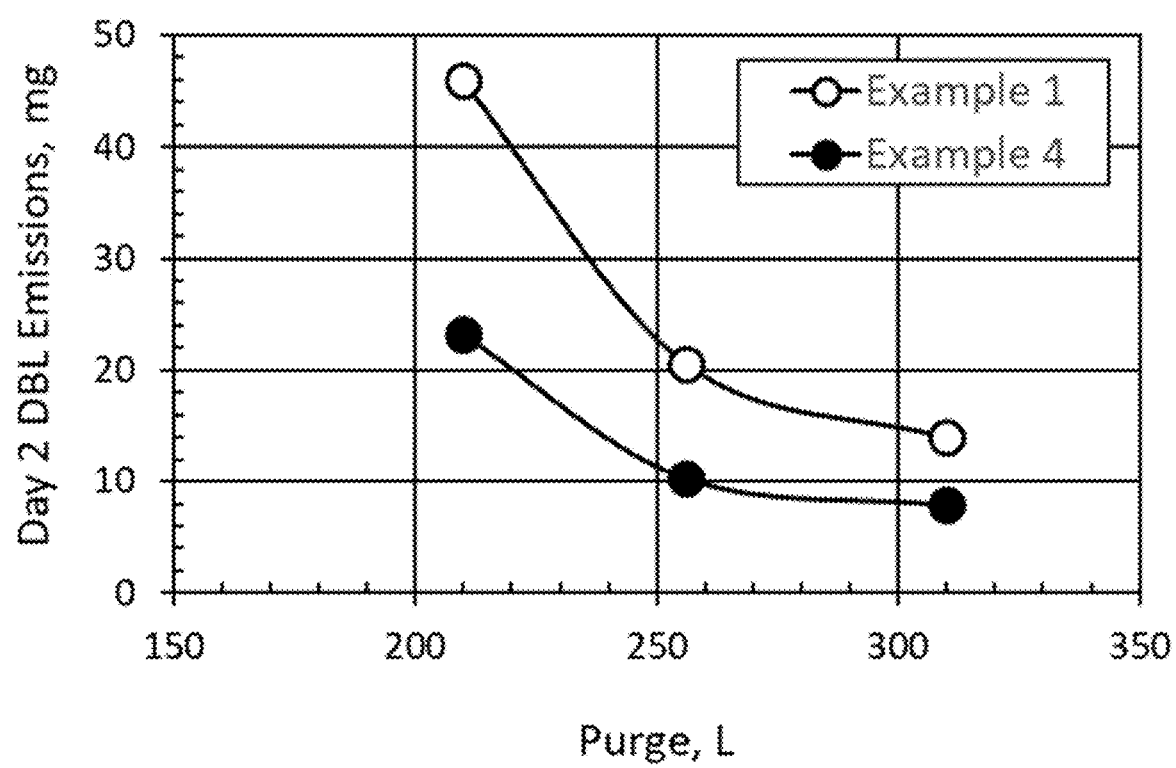
FIG. 32 are test data for comparative (open circles) and inventive examples (filled circles) for day 2 DBL emissions as a function of liters of purge volume (L).
Figure 33:
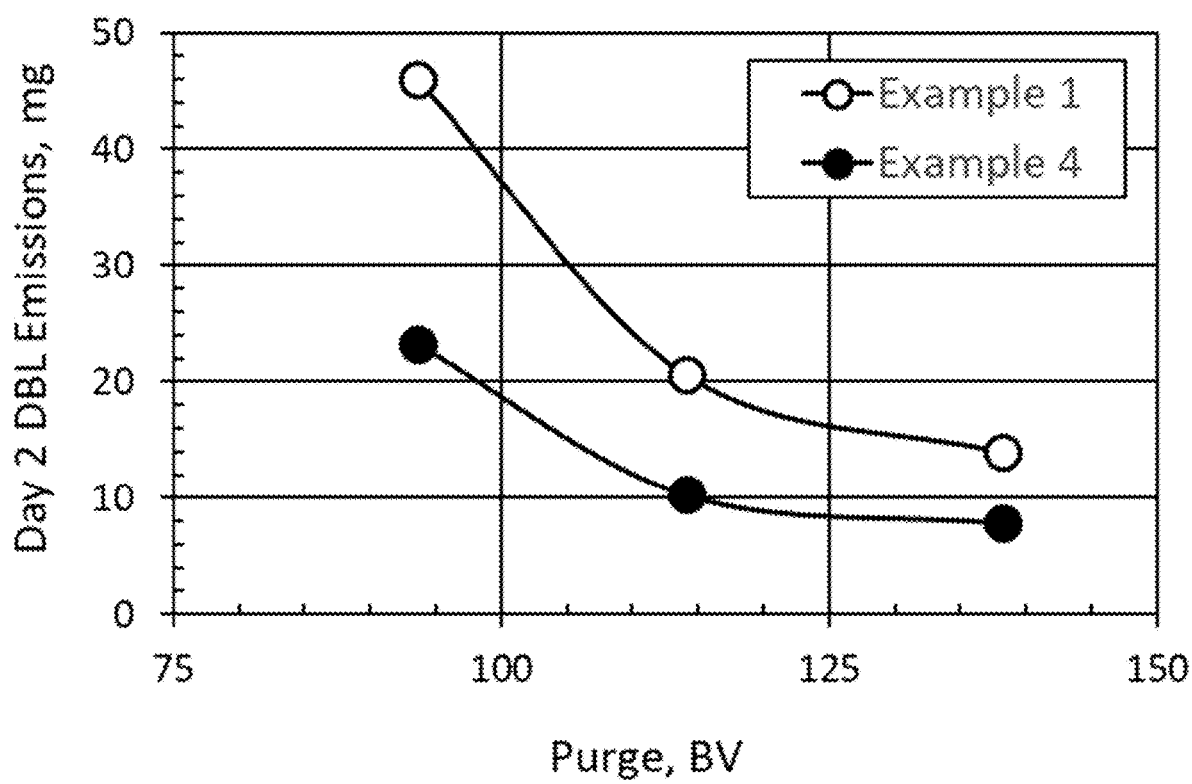
FIG. 33 are test data for comparative (open circles) and inventive examples (filled circles) for day 2 DBL emissions as a function of bed volumes of purge (BV).

For the DBL data in FIGS. 32 and 33, the total purge volume ranged from 210-310 liters, equivalent to about 94-138 BV for a complete canister system that includes all adsorbent volumes present. For the DBL data in FIGS. 34 and 35, the total purge volume ranged from 124-210 liters, equivalent to about 50-85 BV for a complete canister system that includes all adsorbent volumes present.

The DBL emissions were subsequently generated by attaching the tank port of the example to a fuel tank filled with CARB LEV III fuel (6.9-7.2 RVP, 10% ethanol). The canister system examples with the majority of pellets present as BAX 1500 grade carbon in the main canister were connected to a 20 gallon tank (total volume) filled with 6.2 gallons of liquid fuel (13.8 gal ullage). The canister system examples with BAX 1100 LD in the main canister were connected to a 15 gallon tank (total volume) filled with 4.0 gallons of liquid fuel (11 gal ullage). The type C canister system examples were connected to a 14 gallon tank (rated volume) filled with 5.6 gallons of liquid fuel.

Prior to attachment, the filled fuel tank had been stabilized at 18.3° C. for 18-20 hours while venting (where 12-36 hrs is the requirement of the soak time while venting). The tank and the canister system were then temperature-cycled per CARB's two-day temperature profile, each day from 18.3° C. to 40.6° C. over 11 hours, then back down to 18.3° C. over 13 hours. Emission samples were collected from the example vent at 6 hours and 12 hours during the heat-up stage into Kynar bags (to allow the fuel in the tank to reach peak temperature). The Kynar bags were filled with nitrogen to a known total volume based on pressure and then evacuated into a FID to determine hydrocarbon concentration. The FID was calibrated with a precisely known-butane standard of about 5000 ppm concentration. From the Kynar bag volume, the emissions concentration, and assuming an ideal gas, the mass of emissions (as butane) was calculated. For each day, the mass of emissions at 6 hours and 12 hours were added. Following CARB's protocol the day with the highest total emissions was reported as "2-day emissions." In all cases, except example 24, the highest emissions were on Day 2. For example 24, the day 1 emissions were 278 mg while the day 2 emissions were 178 mg. This procedure is generally described in SAE Technical Paper 2001-01-0733, titled "Impact and Control of Canister Bleed Emissions," by R. S. Williams and C. R. Clontz, and in CARB's LEV III BETP procedure (section D.12 in California Evaporative Emissions Standards and Test Procedures for 2001 and Subsequent Model Motor Vehicles, Mar. 22, 2012).

TABLE 1

Exemplary evaporative emission control canister systems.

| EXAMPLE (PPAV in chamber 300) | 1-6[8] | 7, 8, 11, 13, 14, 15, 16, 17 | 22, 23, 24 | 9, 10 | 1[9], 4[9] 1R, 2R, 4R 25 | 18, 19 | 9B, 12a + bB[3] | 20a + bC[4], 21a + bC[4] |
|---|---|---|---|---|---|---|---|---|
| Canister System Type: | A | A | | A | A | A | B | C |
| Pellet Type in FIG. 5 Volume 501, 1.40 L | 1 | 1 | | 1 | 1 | 1 | 1[1] | 1[5] |
| Pellet Type in FIG. 5 Volume 203, 0.40 L | 1 | 1 | | 1 | 1 | 1 | 1[2] | 1[6] |
| Pellet Type in FIG. 5 Volume 204, 0.30 L | 2 | 2 | | 2 | 2 | 2 | | 2[7] |
| Pellet Type 1 Properties: | | | | | | | | |
| NUCHAR ® Pellet Grade | | BAX 1500 | | | | | BAX 1100LD | BAX 1100 LD |
| Apparent Density, g/mL; AD | 0.282 | 0.289 | 0.285 | 0.278 | 0.285 | | 0.316 | 0.322 |
| Butane Activity, g/100 g; BACT | 62.8 | 57.9 | 62.5 | 63.8 | 62.5 | | 40.8 | 43.7 |
| Butane Activity, g/dL; VACT = AD × BACT | 17.7 | 16.7 | 17.8 | 17.7 | 17.8 | | 12.9 | 14.1 |
| BWC, g/dL | 15.3 | 14.9 | 15.3 | 15.5 | 15.3 | | 11.0 | 11.9 |
| Butane Purge Ratio; BPR = BWC/VACT × 100 | 86.4 | 88.8 | 86.8 | 87.2 | 86.8 | | 85.0 | 84.5 |
| Incremental Adsorption Capacity 5-50%, g/L; IAC | 73.0 | 74.1 | 79.9 | 78.2 | 79.9 | | 56.3 | 58.9 |
| Pellet Type 2 Properties: | | | | | | | | |
| NUCHAR ® Pellet Grade | | BAX LBE | | | | | — | BAX LBE |
| Apparent Density, g/mL; AD | 0.374 | 0.370 | 0.374 | 0.370 | 0.370 | | — | 0.382 |
| Butane Activity, g/100 g; BACT | 18.4 | 18.5 | 18.4 | 18.5 | 18.5 | | — | 19.0 |
| Butane Activity, g/dL; VACT = AD × BACT | 6.9 | 6.8 | 6.9 | 6.8 | 6.8 | | — | 7.3 |
| BWC, g/dL | 6.1 | 6.1 | 6.1 | 6.1 | 6.1 | | — | 6.6 |

TABLE 1-continued

Exemplary evaporative emission control canister systems.

| EXAMPLE (PPAV in chamber 300) | 1-6[8] | 7, 8, 11, 13, 14, 15, 16, 17 | 9, 10 | 1[9], 4[9] 1R, 2R, 4R | 18, 19 | 9B, 12a + bB[3] | 20a + bC[4], 21a + bC[4] |
|---|---|---|---|---|---|---|---|
| Butane Purge Ratio; BPR = BWC/VACT × 100 | 89.3 | 89.6 | 89.3 | 89.6 | 89.6 | — | 90.8 |
| Incremental Adsorption Capacity 5-50%, g/L; IAC | 28.7 | 27.2 | 28.7 | 27.2 | 27.2 | — | 29.8 |

[1]Pellet type in the 1.40 L volume 501 in FIG. 6 and 7.
[2]Pellet type in a single, 0.70 L volume 202 in FIG. 6 and 7.
[3]Example 12a + bB in chambers 300 + 503 in FIG. 7Examples 20a + bC and 21a + bC as PPAV 502 + 504 in FIG. QX4
[5]Pellet type in the 1.86 L volume 501 in FIG. 8Pellet type in the 0.26 L volume 203 in FIG. 8Pellet type in the 0.23 L volume 204 in FIG. 8In Table 12 Effect of Purge LEV II System Examples 1 and 4, these are the pellet properties for the test only at 210 L
[9]In Table 12 Effect of Purge LEV II System Examples 1 and 4, these are the pellet properties for the tests at 256 and 310 L Determination of Flow Restriction For the honeycomb PPAV monoliths, the flow restriction (kPa) was measured from 10-100 slpm at 10 slpm increments using the PPAV holder normally otherwise used for canister system tests (e.g., holder 300 shown in FIGS. 3-5). A correction to the flow restriction was applied for the pressure drop of the empty holder at the same flow rate. A quadratic equation was employed for fitting the flow restriction data as a function of flow rate. The data are reported here as the flow restrictions calculated at 40 slpm and at flows equivalent to a superficial velocity of 46 cm/s by taking into account the cross-sectional area of the monolith as measured by calipers for diameter. For the canister system that includes the main canister and PPAV monolith-containing auxiliary canister(s) on the vent-side, flow restrictions were measured under pressurized load flow from the fuel tank port 104 to the vent port 105 with the engine purge port 106 closed in FIGS. 3-5 ("system load dP") and were measured under pressurized purge flow from the vent port 105 to the engine port 106 with the fuel tank port 104 closed (system purge dP). A quadratic equation was employed for fitting the flow restriction data as a function of flow rate and the system load and purge dP is reported here at the calculated 40 slpm.

Measurement of Dynamic Butane Adsorption Capacity

The PPAV honeycomb monolith part samples were placed inside a cylindrical sample holder oriented in the vertical direction, and tested in a 25 C chamber for dynamic adsorption capacity (DAC) according to a load-purge-reload protocol (see US 2020/0018265A1, which is incorporated herein by reference in its entirety).

In DAC testing, the sample and its holder were initially weighed, and then loaded with a 25 C, 1:1 n-butane:$N_2$ test gas flow rate (50 vol % n-butane) of 134 mL/min (9.5 g/hour of butane flow), until saturation. The direction of flow was downward from the top of the sample holder to the bottom. The gas composition of the effluent flow from the sample holder was monitored by an Emerson X-STREAM IR Spectrometer. After the saturation step, the sample and its holder were reweighed and then briefly purged with $N_2$ at 100 mL/min for 10 minutes in the same flow direction as saturation. After the brief purge, the sample and its holder were reweighed and then desorbed with a 10 L/min flow of $N_2$ for 15 minutes in the opposite flow as the initial saturation flow direction relative to the sample (i.e., 10 L/min purge gas flow was downward, but with the sample flipped 180°). In the following step after a final standard 5-minute pause for mechanical adjustments, the gas composition was switched to a mixture of 0.5 vol % butane in $N_2$ at 134 ml/min (0.1 g/hour of butane flow), and this loading step was also conducted as a downflow, in the same flow direction as the initial saturation relative to the sample (i.e., 0.5 vol % butane flow was downward, but with the sample flipped again 180°, to its original orientation). The breakthrough curve of adsorbate in the effluent stream was recorded using the IR spectrometer described above.

The key measured response of the PPAV part in the DAC test is the effluent concentration as the sample undergoes progressive saturation across the length of the adsorbent volume, including any background seepage of adsorbate emissions, called bleedthrough, and the breakthrough of the wavefront of adsorbate concentration gradient that passes through the volume, known as the mass transfer zone (MTZ). Thus, this progression of adsorption has three periods: 1) An initial period of bleedthrough with relatively steady zero or low concentration of adsorbate in the effluent as all, or nearly all, inlet adsorbate is removed by the adsorbent bed, 2) a period of accelerated and then decelerated rise in adsorbate concentration in the effluent stream when there is breakthrough of the MTZ, and 3) a final period full equilibrated saturation of the adsorbate bed, subsequent to the MTZ breakthrough, as the adsorbent bed across its length reaches thermal and concentration equilibration with the influent stream conditions. As typical in the art, the MTZ wavefront is quantified by the point of 5% of the influent adsorbate concentration detected in the effluent and the point of 95% of the influent adsorbate concentration detected in the effluent. A highly efficient adsorbent bed has a sharp MTZ such that there is minimal mass of adsorbate in the effluent prior to saturation, i.e., a greater percentage of the adsorbent beds potential capacity for the adsorbate is utilized as compared with the losses in the effluent for a given point of MTZ concentration breakthrough ("BT"). Prior to MTZ breakthrough, there can be a significant amount of bleedthrough if the adsorbent bed has a residual heel of adsorbate from a previous contact with adsorbate such as from sequential adsorption and purge steps, allowing an unimpeded flow of influent adsorbate to pass through the bed.

Figure 14:
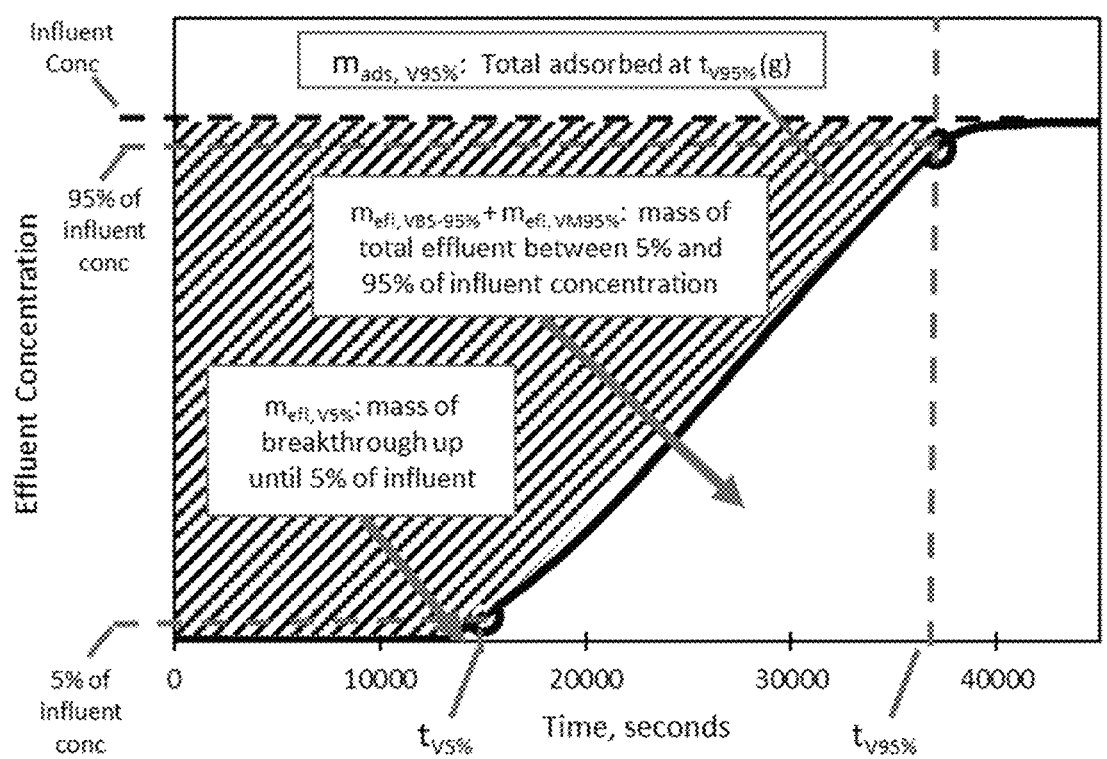
FIG. 14 is an illustration of effluent concentration response features for a virgin PPAV during the initial saturation according to the dynamic butane adsorption capacity test. Efficiency is the cumulative mass fraction adsorbed (shaded area) relative to the cumulative influent mass up to a point of saturation (e.g., 95%).

For a virgin PPAV part (i.e., free of adsorbate at t=0 time), the effluent curve typically has the appearance of FIG. 14. Key points of the effluent curve occur at the time of 5% influent adsorbate concentration in the effluent beyond the initial bleedthrough concentration, $t_{v5\%}$, and the time $t_{v95\%}$, when the effluent adsorbate concentration reaches 95% of the difference between the initial bleedthrough concentration and the influent adsorbate concentration, "the time for 95% BT beyond intial bleedthrough". (For a virgin adsorbent bed, the bleedthrough is about zero, so that $t_{v5\%}$ is essentially the time of 5% of the influent measured in the effluent, and $t_{v95\%}$ is the time of 95% of the influent concentration present in the effluent.). At $t_{v5\%}$, from a mass balance on the influent and effluent rates of adsorbate flow over time, the cumulative mass adsorbed by the bed is $m_{ads, V5\%}$ (a portion of the shaded area in FIG. 14, between t=0 and $t_{v5\%}$) and the cumulative mass of adsorbate in the effluent is $m_{efl, V5\%}$. An efficiency of adsorption for that initial period, $DAE_{V5\%}$, is the ratio of the amount adsorbed up until that time, $m_{ads, V5\%}$, and the total influent mass of adsorbate delivered to the adsorbent bed over that time period (e.g., the ratio of $m_{ads, V5\%}$ over $m_{efl, V5\%}+m_{ads, V5\%}$). By time $t_{v95\%}$, with the passage of the majority of the MTZ into the bed effluent, the cumulative mass adsorbed by the bed is $m_{ads, V95\%}$ (the entire shaded area in FIG. 14). The mass of adsorbate in the effluent during this period of MTZ breakthrough may be divided into two contributions: 1) the effluent mass attributed to continued bleedthrough based on the initial bleedthrough concentration at t=0, $m_{efl, YB5-95\%}$ (equal to about zero for a virgin adsorbent bed), and 2) the remaining effluent mass, $m_{efl, VM5-95\%}$, that includes the mass attributed to the passage of the MTZ between 5 and 95% breakthrough. The total mass of effluent for the period from t=0 through $t_{v95\%}$ is $m_{efl, V95\%}$, equal to the sum of $m_{efl, V5\%}+m_{efl, VB5-95\%}+M_{efl, VM5-95\%}$. An efficiency of adsorption for the period from t=0 through $t_{v95\%}$, $DAE_{V95\%}$, is the ratio of the cumulative amount adsorbed up until that time, $m_{ads, V95\%}$, and the total influent mass of adsorbate delivered to the adsorbent bed over that time period, $m_{del, V95\%}$ (e.g., $DAE_{V95\%}$ is the ratio of $m_{ads, V95\%}$ over $m_{del, V95\%}$, equal to the ratio of $m_{ads, V95\%}$ over $m_{ads, V95\%}+M_{efl, V95\%}$).

Figure 15:
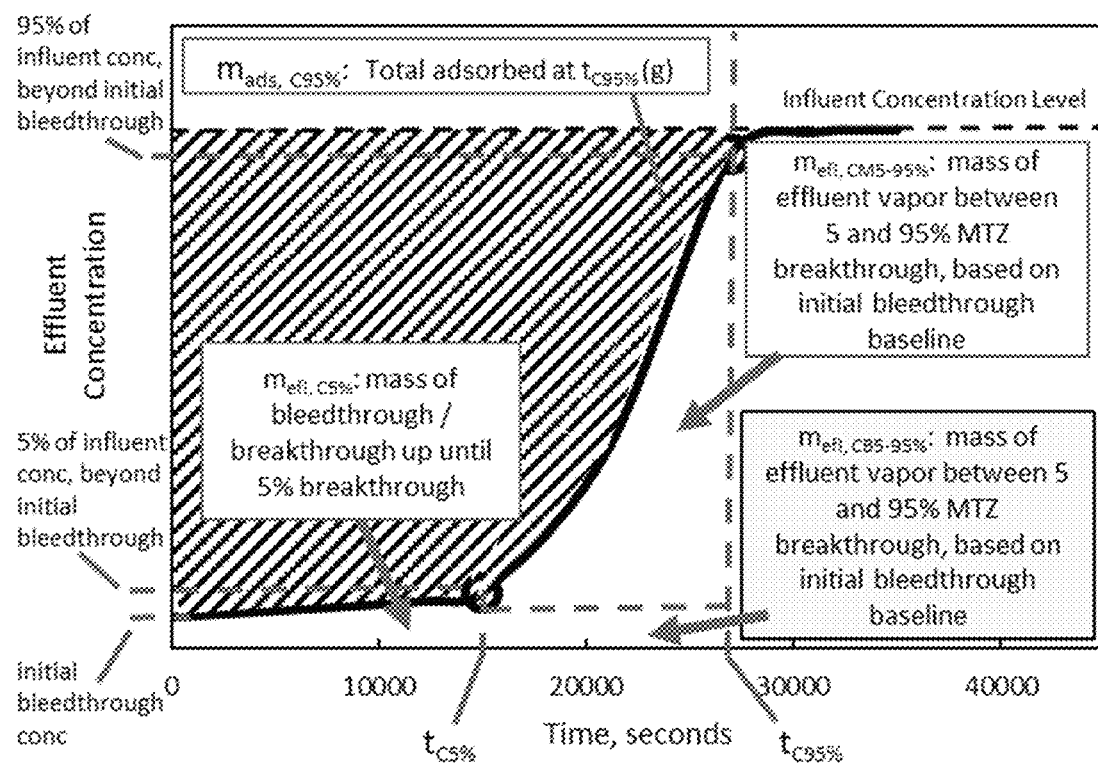
FIG. 15 is an illustration of effluent concentration response features for a cycled PPAV, during the saturation step after the initial saturation and purge steps, according to the dynamic butane adsorption capacity test. For a PPAV cycled through prior adsorption and purge, there is likewise an MTZ breakthrough. Additionally, a residual heel from the incomplete adsorbate removal from the prior purge step results in a bleed through of adsorbate in the effluent prior to the breakthrough of the MTZ.

For a PPAV part that has undergone the prior steps of adsorption and purge in the dynamic adsorption test, the effluent concentration response resembles FIG. 15, and similar mass balances, as applied for the virgin PPAV part, may be applied to the cycled PPAV part, and dynamic adsorption efficiencies may be similarly derived. At $t_{C5\%}$, from a mass balance on the influent and effluent rates of adsorbate flow over time, the cumulative mass adsorbed by the bed is $m_{ads, C5\%}$ (a portion of the shaded area in FIG. 15, between t=0 and $t_{C5\%}$) and the cumulative mass of adsorbate in the effluent is $m_{efl, C5\%}$. An efficiency of adsorption for that initial period, $DAE_{C5\%}$, is the ratio of the amount adsorbed up until that time, $m_{ads, C5\%}$, and the total influent mass of adsorbate delivered to the adsorbent bed over that time period (e.g., the ratio of $m_{ads, C5\%}$ over $m_{efl, C5\%}+m_{ads, C5\%}$). By time $t_{C95\%}$, with the passage of the majority of the MTZ into the bed effluent, the cumulative mass adsorbed by the bed is $m_{ads, C95\%}$ (the entire shaded area in FIG. 15). The mass of adsorbate in the effluent during this period of MTZ breakthrough may be divided into two contributions: 1) the effluent mass attributed to continued bleedthrough based on the initial bleedthrough concentration at t=0, $m_{efl, C95\%}$ (which can be significantly measurable for a cycled adsorbent bed), and 2) the remaining effluent mass, $m_{efl, CM95\%}$, that includes the mass attributed to the passage of the MTZ between 5 and 95% breakthrough as defined by the initial bleedthrough as the breakthrough concentration baseline. The total mass of effluent for the period from t=0 through $t_{C95\%}$ is $m_{efl, C95\%}$, equal to the sum of $m_{efl, C5\%}+m_{efl, CB5-95\%}+m_{efl, CM5-95\%}$. An efficiency of adsorption for the period from t=0 through $t_{C95\%}$, $DAE_{C95\%}$, is the ratio of the cumulative amount adsorbed up until that time, $m_{ads, C95\%}$, and the total influent mass of adsorbate delivered to the adsorbent bed over that time period, $m_{del, C95\%}$ (e.g., $DAE_{C95\%}$ is the ratio of $m_{ads, C95\%}$ over $m_{del, C95\%}$, equal to the ratio of $m_{ads, C95\%}$ over $m_{ads, C95\%}+m_{efl, C95\%}$). Given the significantly measurable concentrations for the cycled PPAV part, bleedthrough may be compared between examples in terms of absolute mass values ($m_{efl, C5\%}$), and, as a measure of its contribution to adsorption inefficiency, in terms of mass values relative to total butane delivered ($m_{del, C95\%}$), and relative to the total mass adsorbed ($m_{ads, C95\%}$).

Figure 16:
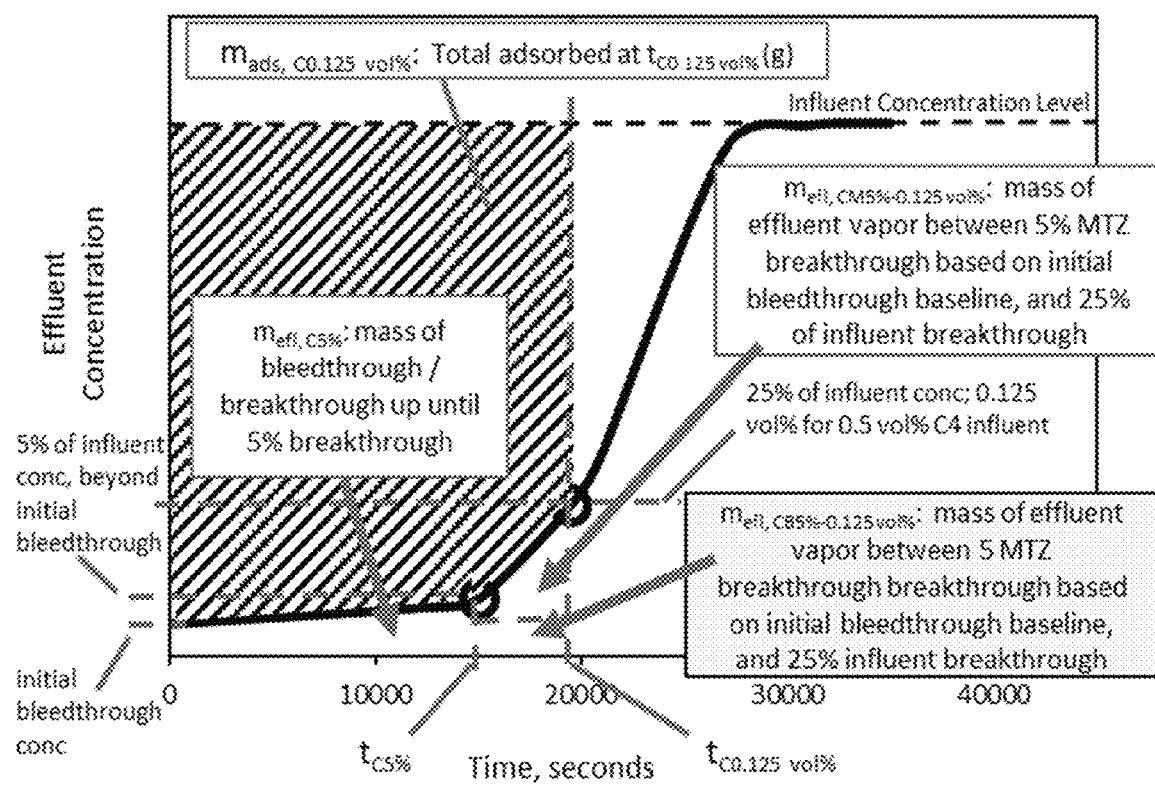
FIG. 16 is an illustration of effluent concentration response features for a cycled PPAV, during the saturation step after the initial saturation and purge steps, according to the dynamic butane adsorption capacity test, for an intermediate breakthrough point of 25% of the 0.5 vol % influent butane concentration.

In addition to analysis of the effluent data at 5% and 95% breakthrough for the cycled PPAV for bleedthrough and efficiencies, analysis of the effluent data was conducted at an intermediate breakthrough point of 25% of the influent 0.5 vol % butane, i.e., 0.125 vol % butane in the effluent (See US 2020/0018265A1). FIG. 16 illustrates the derivation of the effluent mass values from the intermediate breakthrough of 0.125 vol % adsorbate in the effluent.

Determination of Pore Volumes and Surface Areas

Volume of pores (PV) <1.8 nm to 100 nm in size was measured by nitrogen adsorption porosimetry by the nitrogen gas adsorption method ISO 15901-2:2006 using a Micromeritics ASAP 2420 (Norcross, Ga.). The sample preparation procedure for nitrogen adsorption testing was to degas at 250 C for at least two hours, typically to a stable <2 μmHg vacuum with the sample isolated. The determination of pore volumes for pores <1.8 nm to 100 nm in size was from the desorption branch of the 77 K isotherm for a 0.1 g sample. The nitrogen adsorption isotherm data was analyzed by the Kelvin and Halsey equations to determine the distribution of pore volume with pore size of cylindrical pores according to the model of Barrett, Joyner, and Halenda ("BJH"). The non-ideality factor was 0.0000620. The density conversion factor was 0.0015468. The thermal transpiration hard-sphere diameter was 3.860 A. The molecular cross-sectional area was 0.162 nm2. The condensed layer thickness (Å) related to pore diameter (D, Å) used for the calculations was 0.4977 $[\ln(D)]2-0.6981 \ln(D)+2.5074$. Target relative pressures for the isotherm were the following: 0.04, 0.05, 0.085, 0.125, 0.15, 0.18, 0.2, 0.355, 0.5, 0.63, 0.77, 0.9, 0.95, 0.995, 0.95, 0.9, 0.8, 0.7, 0.6, 0.5, 0.45, 0.4, 0.35, 0.3, 0.25, 0.2, 0.15, 0.12, 0.1, 0.07, 0.05, 0.03, 0.01. Actual points were recorded within an absolute or relative pressure tolerance of 5 mmHg or 5%, respectively, whichever was more stringent. Time between successive pressure readings during equilibration was 10 seconds. Pore volumes are reported according to defined pore ranges, e.g., pore volume <1.8 nm (<18 Å) in size as $PV_{<1.8nm}$.

Determination of Incremental Adsorption Capacity

Micromeritics method. As known in the art, adsorption capacities may be equivalently measured by a number of means, including volumetric, gravimetric, and dynamic (flow) methods.

The "Micromeritics method" is a volumetric method based on a gas phase mass balance for the adsorbent sample-containing system of known volume and temperature when exposed to changes in adsorbate gas phase pressure. For examples herein, a Micromeritics model ASAP 2020A expansion unit was used (Micromeritics Instrument Corporation, Norcross, Ga. USA). By this method, as an initial state, adsorbate gas is contained in one vessel of known temperature, pressure, and volume, and adsorbate gas is contained in a second, adsorbent-containing vessel of known volume and temperature, and a known different pressure. The two vessels are then made in fluid contact by the opening of a connecting valve. After equilibration to a final state (i.e., sufficient time for thermal equilibration and equilibrated adsorbate uptake by the adsorbent sample, as evidenced by a stabilized connected system pressure), the mass balance difference in gas phase adsorbate between the initial and final state is the mass change in adsorbed adsorbate by the adsorbent sample. Note in all examples reported herein, the adsorbate is n-butane.

The first step to determine IAC is sample preparation. The representative adsorbent sample is oven-dried for more than 3 hours at 110° C. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the volume.

A quartz sample tube is weighed with a rubber stopper and the weight recorded (WO). About 0.1 g of adsorbent sample is loaded into the tared sample tube and the rubber stopper replaced. The rubber stopper is removed, and the loaded sample tube is placed under a degassing port where the temperature is ramped to 250° C. at a rate of 10° C./min. The sample is degassed at 250° C. for about 2 hours. The sample is allowed to cool and the tube is backfilled with nitrogen. The rubber stopper is replaced and the degassed tube is weighed (W). Dry sample weight is calculated as W-WO. The second step in the procedure is sample analysis. The water bath is set to 25±0.1° C. The instrument sample pressure is evacuated to less than 10 μmHg (usually less than 1 μmHg). The instrument plug and sample rubber stopper are removed, and the degas sed tube is placed into the sample analysis port. The test is started. The instrument collects equilibrium butane isotherm data points around the following absolute pressures (mmHg): 10, 20, 30, 40, 45, 150, 300, 350, 400, 450, 600, 800, 600, 500, 450, 400, 350, 300, 150, 50, 45, 40, 35, 30, 25). The mass adsorbed isotherm data point for 0.5 vol % at 1 atm (3.8 mmHg) reported herein was calculated from a power law regression (mass adsorbed=a Pressure$^b$) derived from a fit of the 10, 20, 30, and 40 mmHg isotherm data points.

The IAC has been defined as the incremental adsorption capacity between 5 and 50% n-butane at 25° C. A 5 vol % n-butane concentration (in volume) at one atmosphere is provided by the equilibrium pressure inside the sample tube of 38 mmHg. A 50 vol % n-butane concentration at one atmosphere is provided by the equilibrium pressure inside the sample tube of 380 mmHg. Because equilibration at precisely 38 mmHg and 380 mmHg may not be readily obtained, the mass of adsorbed n-butane per mass of the adsorbent sample at 5 vol % n-butane concentration and at 50 vol % n-butane concentration is interpolated from a graph using the data points collected about the target 38 and 380 mmHg pressures. In the examples provided herein, this was typically done using linear regression of the pressures between about 300 and about 450 mmHg and the pressures between about 30 and 45 mmHg on the desorption branch of the isotherm. Using the ideal gas law for n-butane and the adsorbent apparent density, the IAC can then be calculated as the capacity in g/g at 50 vol % n-butane minus the capacity at 5 vol % n-butane multiplied by the apparent density in g/L.

The McBain method is a gravimetric method. The adsorbent sample is oven-dried for more than 3 hours at 110° C. before loading onto a sample pan attached to a spring inside a sample tube. Then, the sample tube is installed into an apparatus as described. The adsorbent sample shall include representative amounts of any inert binders, fillers and structural components present in the volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the volume.

A vacuum of less than 1 ton is applied to the sample tube, and the adsorbent sample is heated at 105° C. for 1 hour. The mass of the adsorbent sample is then determined by the extension amount of the spring using a cathetometer. After that, the sample tube is immersed in a temperature-controlled water bath at 25° C. Air was pumped out of the sample tube until the pressure inside the sample tube is $10^{-4}$ torr. n-Butane is introduced into the sample tube until equilibrium was reached at a selected pressure. The tests are performed for two data sets of four selected equilibrium pressures each, taken about 38 torr and taken about 380 torr. The concentration of n-butane is based on the equilibrium pressure inside the sample tube. After each test at the selected equilibrium pressure, the mass of the adsorbent sample is measured based on the extension amount of the spring using cathetometer. The increased mass of the adsorbent sample is the amount of n-butane adsorbed by the adsorbent sample. The mass of n-butane absorbed (in gram) per the mass of the adsorbent sample (in gram) is determined for each test at different n-butane equilibrium pressures and plotted in a graph as a function of the concentration of n-butane (in % volume). A 5 vol % n-butane concentration (in volume) at one atmosphere is provided by the equilibrium pressure inside the sample tube of 38 torr. A 50 vol % n-butane concentration at one atmosphere is provided by the equilibrium pressure inside the sample tube of 380 torr. Because equilibration at precisely 38 torr and 380 torr may not be readily obtained, the mass of adsorbed n-butane per mass of the adsorbent sample at 5 vol % n-butane concentration and at 50 vol % n-butane concentration is interpolated from a graph using the data points collected about the target 38 and 380 torr pressures. The IAC is then calculated as described herein.

Determination of Effective Volumetric Properties

The above methods are applicable for defining the nominal BWC, butane activity, IAC, and density properties of adsorbent. In contrast, the effective volume of adsorbents takes into account the air gaps, voids and other volumes sandwiched between the nominal volumes of adsorbents along the vapor flow path that lack adsorbent. For example, those volumes lacking adsorbent include, but are not limited to, the volumes between adsorbent volume 301 and 302 in FIG. 4, the volume between adsorbent volume 204 and 301 in FIG. 4 that includes the port 108 and the connecting conduit between canisters 101 and 300, and the volume between adsorbent volumes 202 and 203 in FIG. 4 that includes the plenum volume 107. Thus, the effective volumetric properties of adsorbent refer to the volume-averaged properties of the adsorbent volumes that take into account air gaps, voids and other volumes between the nominal volumes of adsorbents that lack adsorbent along the vapor flow path.

The effective volume ($V_{eff}$) for a given length of the vapor flow path is the sum of the nominal volumes of adsorbent ($V_{nom, i}$) present along that vapor path length plus adsorbent-free volumes along that vapor flow path ($V_{gap, j}$).

$$V_{eff} = \Sigma V_{nom, i} + \Sigma V_{gap, j}$$

A volumetric adsorptive properties of an effective volume ($B_{eff}$), such as incremental adsorption capacity (g/L), apparent density (g/mL) and BWC (g/dL), is the sum of each property of the individual nominal volumes to be considered as part of the effective volume ($B_{nom, i}$) multiplied by each individual nominal volume ($V_{nom, i}$), then divided by the total effective volume ($V_{eff}$):

$$B_{eff} = \Sigma (B_{nom, i} \times V_{nom, i}) / V_{eff}.$$

Thus, the term "effective incremental adsorption capacity" is the sum of each nominal incremental adsorption capacity multiplied by each individual nominal volume, and then divided by the total effective volume.

The term "effective butane working capacity (BWC)" is the sum of each BWC value multiplied by each individual nominal volume, and then divided by the total effective volume.

The term "effective apparent density" is the sum of each apparent density multiplied by each individual nominal volume, and then divided by the total effective volume The term "g-total BWC of the effective volume" is the sum of the g-total BWC gram values of the nominal volumes within the effective volume.

In any of the aspects or embodiments, the description provides a PPAV as described herein having an effective BWC (e.g., effective BWC less than about 10 g/dL or a value as described for BWC herein), effective IAC (e.g., effective IAC less than about 50 g/L or a value as described for IAC herein), effective apparent density, g-total BWC of the effective volume or a combination thereof, in an evaporative emission control canister system.

Determination of Honeycomb Dimensions and Cell Structure

Figure 9:
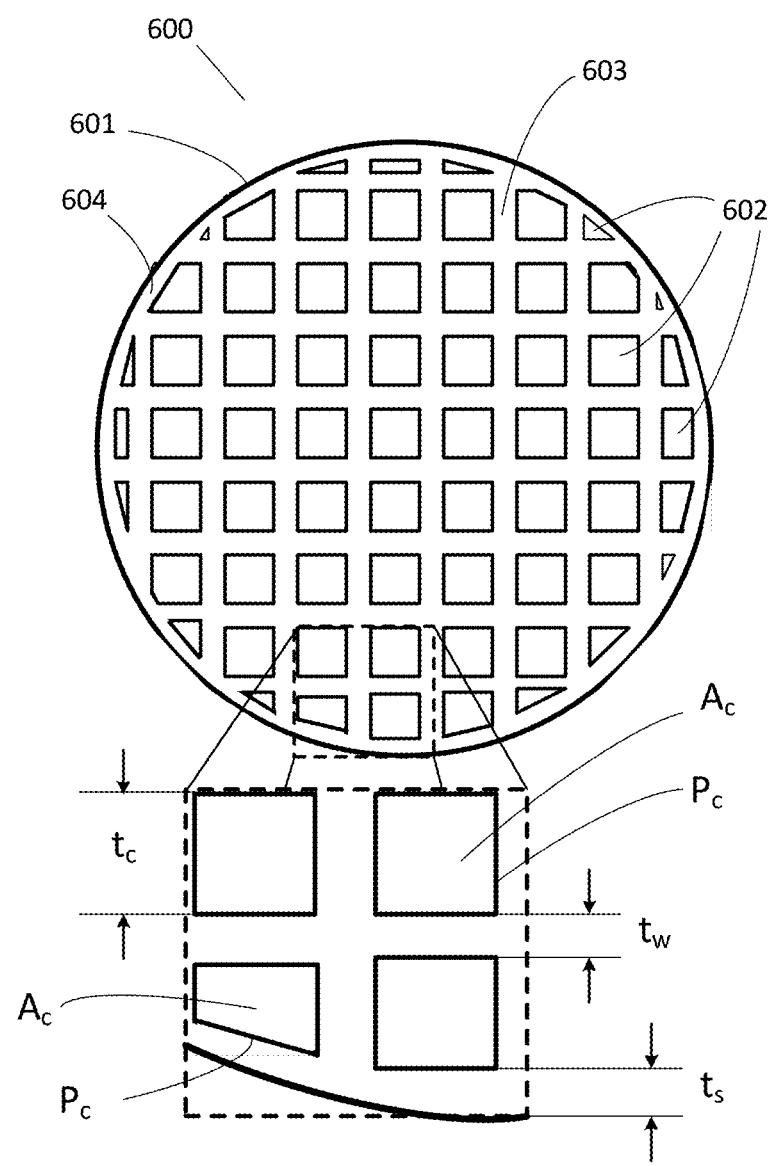
FIG. 9 is a diagram that illustrates the cross-sectional features of a honeycomb-based PPAV as described herein and illustrates the cell wall thickness ($t_w$), channel width ($t_c$), channel area ($A_c$), channel periphery length ($P_c$), and skin thickness ($t_s$) for an exemplary honeycomb-shaped PPAV as described herein.

FIG. 9 is an idealized generic illustration of a honeycomb cross-section 600 for the purpose of showing key structure features, including the external edge or exterior surface 601, the parallel channels (or cells in cross-section) 602, cell walls, 603, and the peripheral edge wall, or "skin", 604. The channels have a width $t_c$, cross sectional area $A_c$ and perimeter length $P_c$. The cells have a wall thickness $t_w$ and the skin has a thickness $t_s$.

For determining dimensions of the cross-section, example honeycomb parts were cut to 1 mm thick slices with a diamond blade saw. The slice was then placed on a sheet of white printer paper with a ruler for scale reference and positioned level with the horizontal and vertical axes within the camera view finder, with the square grid of the cells in the rotational orientation shown in FIG. 9. The sheet of paper and sample slice were placed on a 5000° K. color corrected lamp lightbox, where a DSLR camera (Cannon EOS Rebel T3) was mounted above for photographing. The camera was approximately 7.5 inches above the lightbox and fitted with a with a 50 mm fixed lens (1:1.8) and a 13 mm extension lens tube. With the slice backlit, multiple photographs were taken of the cross-sectional slice with alternative camera positions for obtaining a clear image. The images were analyzed by ImageJ, a public domain, Java-based image processing free software program developed at the National Institutes of Health and the Laboratory for Optical and Computational Instrumentation. The pixels in the digital image were calibrated, and line drawn across the face of the image provided the various measures of diameter, width, and thickness. Channel areas were analyzed by the "Analyze particles" command. Typically, image analysis was measured on slices from one to five sample parts from the same preparation lot as the part tested for DBL emissions, with the averages of those dimensional analysis values reported in Tables 2-6.

Figure 10:
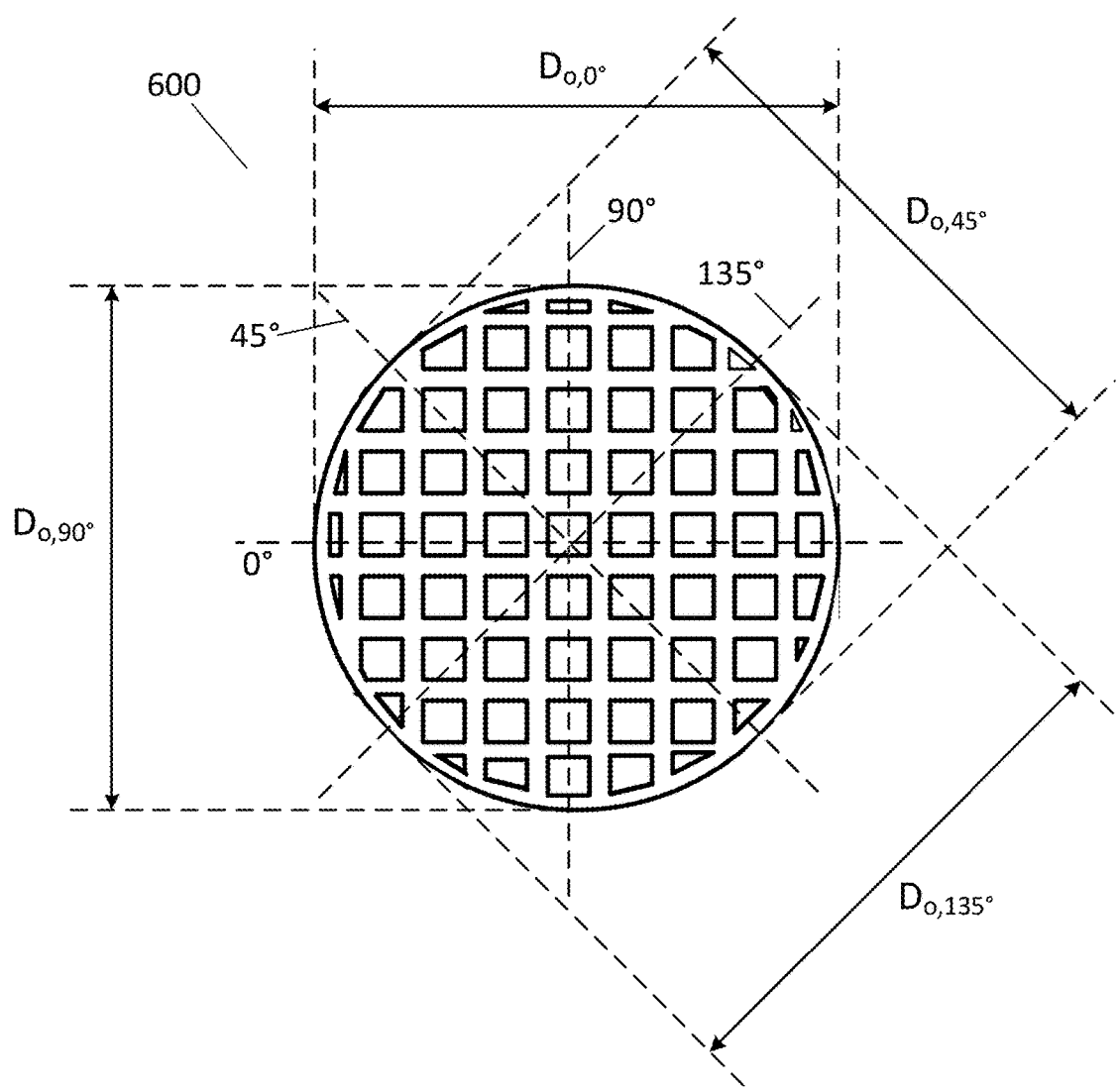
FIG. 10 is a diagram that illustrates the four rotations from which the outer diameters ($D_o$) of the exemplary honeycomb-shaped PPAVs were measured in both caliper and image analysis measurements.
Figure 11:
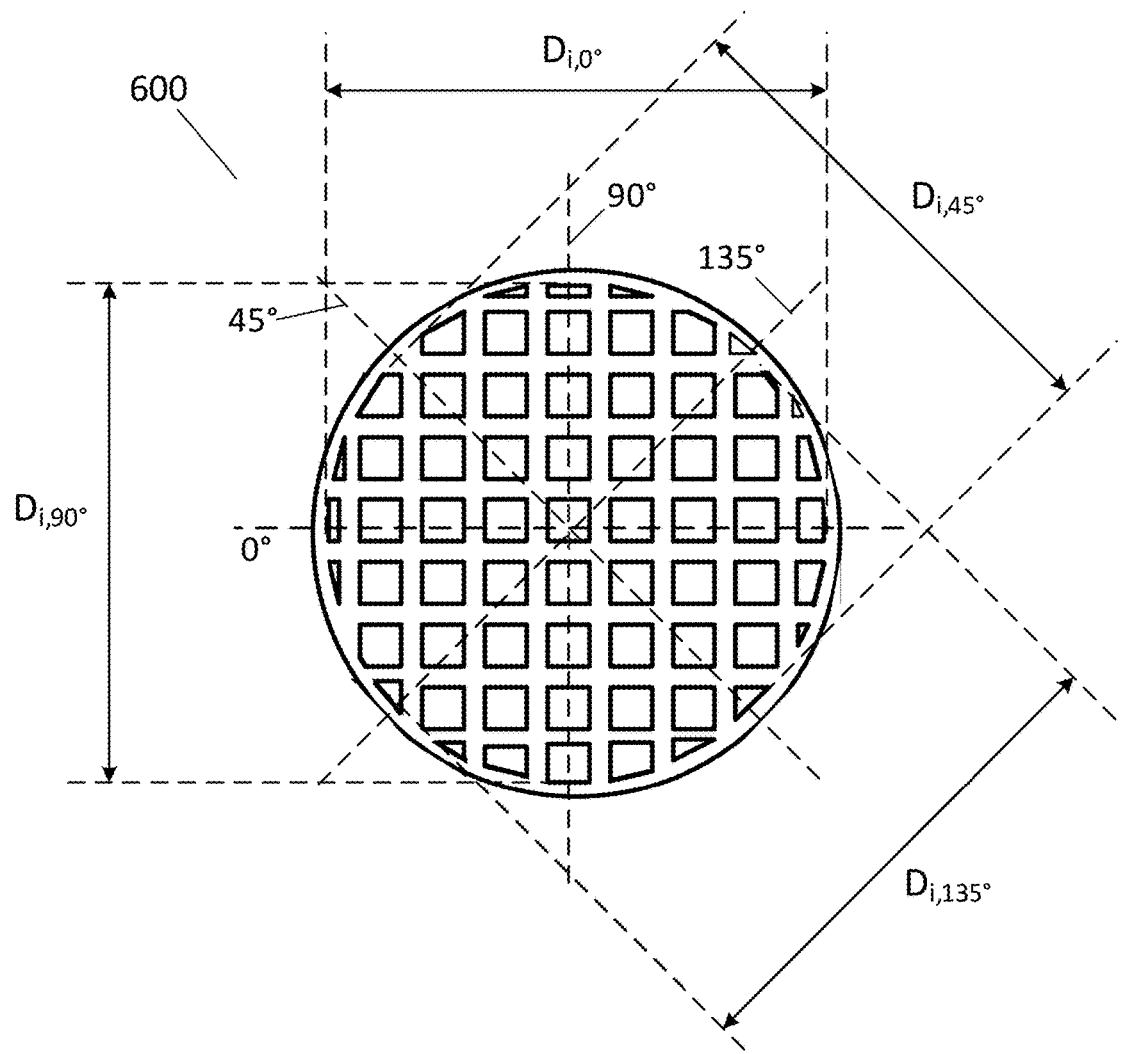
FIG. 11 is a diagram that illustrates the four rotations from which the inner diameters ($D_i$) of the exemplary honeycomb-shaped PPAVs were measured in image analysis measurements.

FIGS. 10 and 11 illustrates the four 0°, 45°, 90°, and 135° rotation orientations applied for measuring outer diameter $D_o$ and the inner diameter $D_i$ of the honeycomb 600. The outer diameters that were used for calculating the part volume, V, and then the g-total BWC from the part volume, were measured by calipers on the same example part tested for DBL emissions ($D_{o, caliper}$). The average value of the four rotation measurements, $D_{o, caliper}$, is provided in Tables 2-6. The part length, L, was also measured by calipers.

Figure 46:
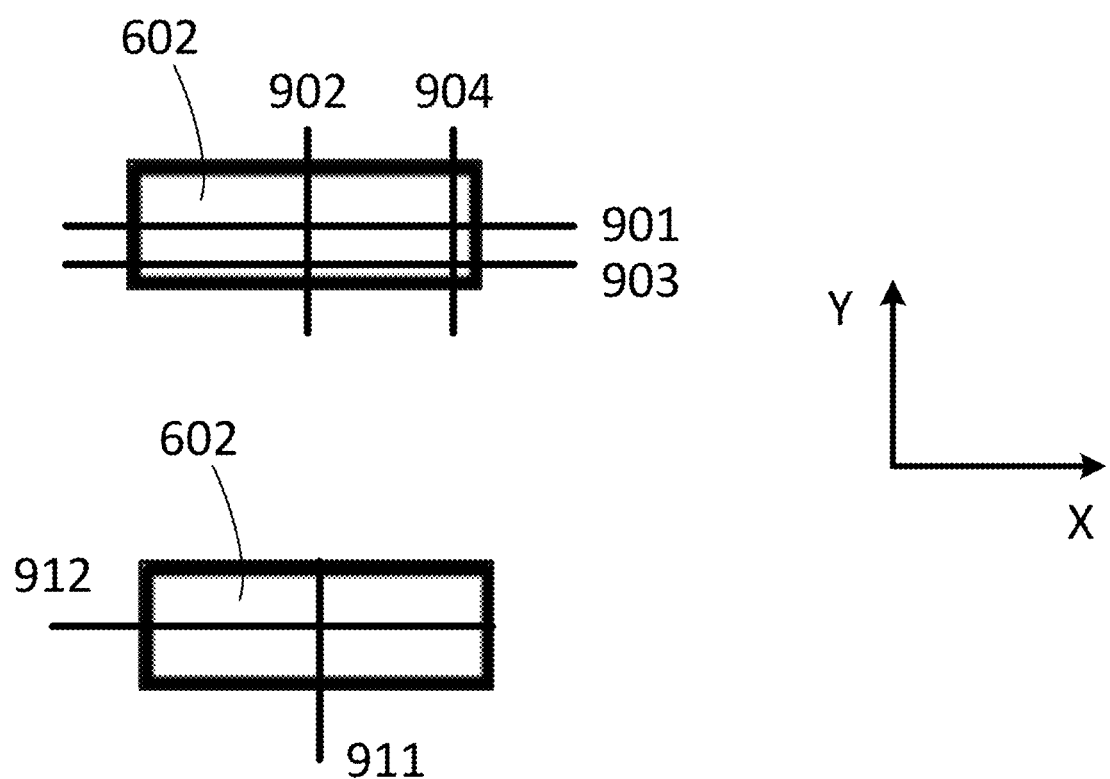
FIG. 46 Illustration of the x- and y-axis orientations applied to image analysis of PPAV parts with slit-shaped cells.

For the examples with high aspect ratio, slit-shaped cells, the PPAV parts were characterized by separate measurements of channel width and wall thickness according to the orientations of their component wide and narrow channel widths. The x-axis refers to measurements made for the wide width directions, as oriented as a wide channel width in the direction of the lines 901 and 903 in FIG. 12 for the crosshair analysis, and the lines 911 and 911 in FIG. 13 for the nxn analysis (See also FIG. 46), with all channels elongated in this same horizontal direction. The y-axis refers to measurements made for the narrow width directions, as oriented as a narrow channel height in the direction of the lines 902 and 904 in FIG. 12 for the crosshair analysis, and the lines 912 and 914 in FIG. 13 for the nxn crop analysis.

The skin thickness from inner and outer diameters, $t_{s,D}$, in Tables 2-6 was the difference between an image analysis outer diameter $D_o$ and inner diameter $D_i$, with both diameters the average values of the four rotational measurements, i.e., the averages of $D_{o,0°}$, $D_{o,45°}$, $D_{o,90°}$, $D_{o,135°}$, and of $D_{i,0°}$, $D_{i,45°}$, $D_{o,90°}$, $D_{o,135°}$.

Using image analysis, the total channel cross sectional areas ($A_c$) and perimeters ($P_c$) was obtained using the "Analyze particles" command. The average channel hydraulic diameter ($t_{c,Dh}$) was calculated as $4\Sigma A_c / \Sigma P_c$.

Figure 12:
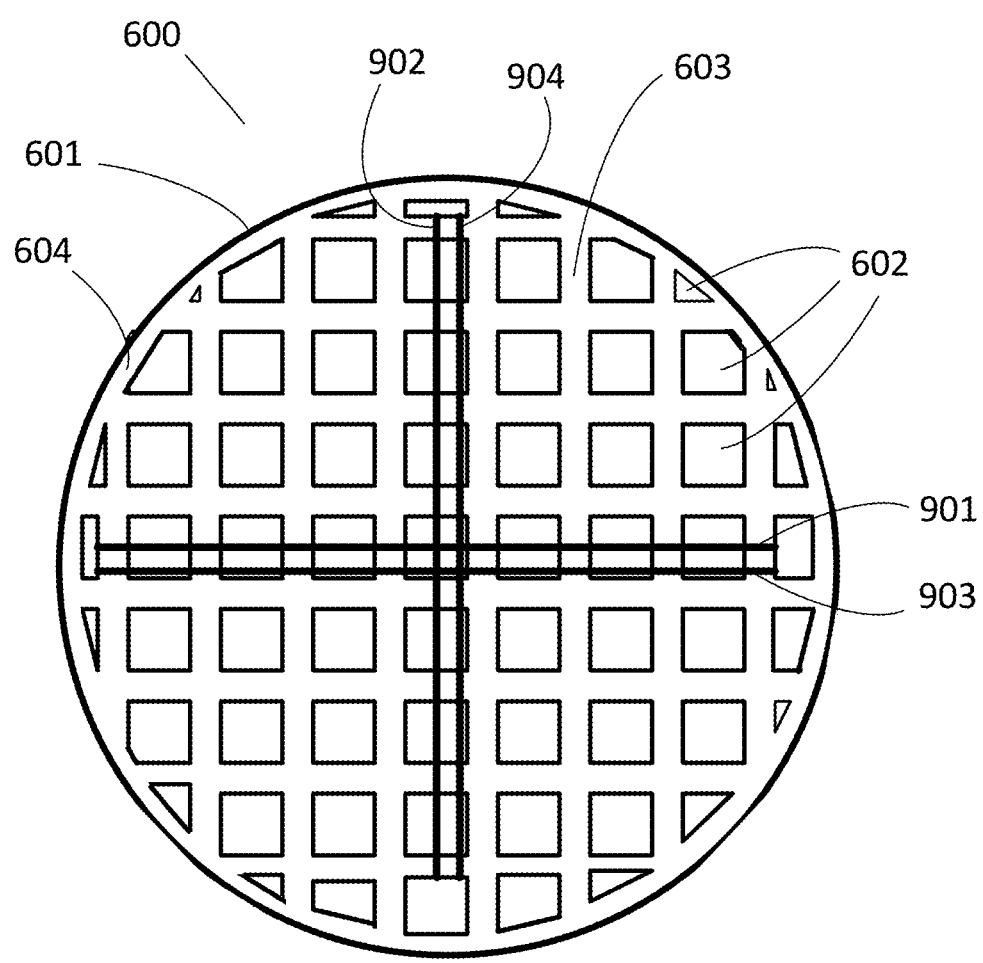
FIG. 12 is a diagram that illustrates the vertical and horizontal crosshairs from which mid-channel widths and wall thickness ($t_{c,m}$ and $t_{w,m}$) and base-channel widths and wall thickness ($t_{c,b}$ and $t_{w,b}$) were obtained via image analysis of exemplary honeycomb-shaped PPAVs.
Figure 13:
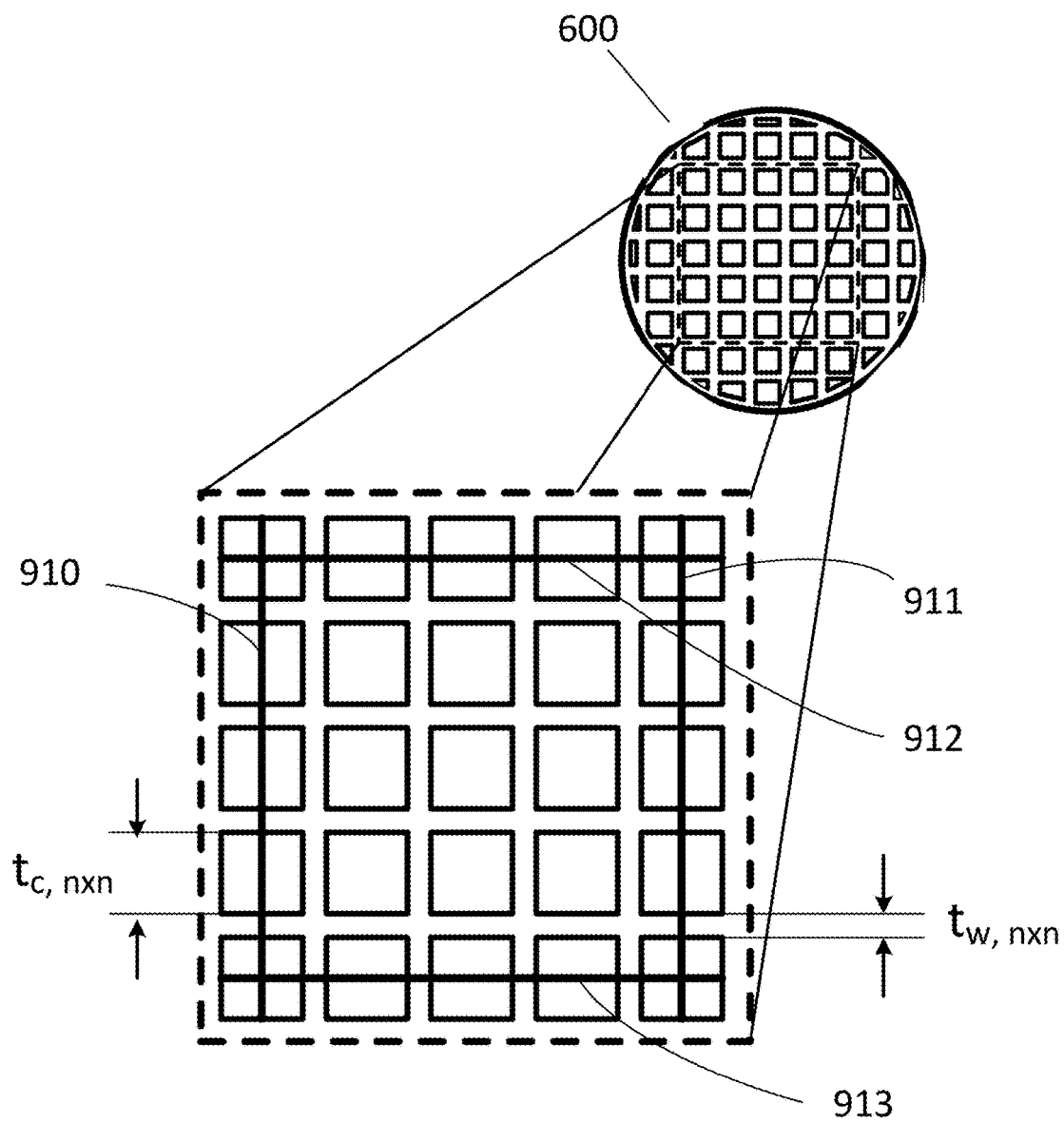
FIG. 13 is a diagram that illustrates the n-by-n ("n×n") square cell grid from which the n×n grid channel width ($t_{c,n \times n}$) and n×n wall thickness ($t_{c,m}$ and were obtained via image analysis of exemplary honeycomb-shaped PPAVs.

FIGS. 12 and 13 illustrate the two constructions used by image analysis for measuring cell wall thicknesses, from which an average wall thickness value, $t_{w, avg}$, was then calculated and then also applied for the average cell pitch calculations. In one construction for measuring wall thickness (FIG. 12), four crosshairs through about the center of the slice cross-section were drawn, two through the middle of cells (lines 901 and 902) and two towards a base of the cells (lines 903 and 904), with the ends of all four lines extending only as far as through the interior walls of the peripheral cells. The mid cell wall thickness, $t_{w,m}$, and base cell wall thickness, $t_{w,b}$, were determined as the average of the wall thickness through which mid-cell lines 901 and 902 and base cell lines 903 and 904 traversed, respectively. For the illustrative example in FIG. 12, each of the lines 901 through 904 traverse seven channels and eight cell walls. In a second construction for measuring wall thickness (FIG. 13), a square "nxn" crop of cells was selected from the face of the cross-section, where the crop does not include any peripheral cells (i.e., those located at the outer skin). Four mid-cell lines were drawn through the middle of the peripheral cells of the crop, shown as lines 910 through 913 in FIG. 13, with the ends of all four lines extending only as far as through the corner channels of the peripheral cells. The wall thickness of the n×n crop, $t_{w,n\times n}$, was the average of the thickness of all walls through which lines 910 through 913 traversed. For the illustrative example in FIG. 13, each of the lines 910 through 913 traverse five channels and four cell walls. For a given cross-sectional slice subject to image analysis, the average wall thickness $t_{w,avg}$ in Tables 2-6 was calculated as the average of $t_{w,m}$, $t_{w,b}$, and, $t_{w,n\times n}$.

A channel width, $t_{c,avg}$, was obtained from a plurality of channels in the honeycomb cross-section that have approximately the same cross-sectional dimensions, which does not include partial cells at the periphery. The channel width $t_{c,avg}$ calculated as the average of the channel widths $t_{c,m}$, $t_{c,b}$, and $t_{c,n\times n}$, as derived from the mid-and base cell and n×n crop image analysis methods illustrated in FIGS. 12 and 13. For example, the channel width $t_{c,m}$, was the average channel width for cells traversed by the mid-cell lines 901 and 902 in FIG. 12. The channel width $t_{c,b}$ was the average channel width for cells traversed by the base-cell lines 903 and 904 in FIG. 12. The channel width $t_{c,n\times n}$ was determined using particle analysis by identifying whole cells in the crop area yielding the area of each cell (void area). The average cell area was calculated and used to determine the channel width using the square root of the area (i.e., $t_{c,n\times n}=(A_{c,average})^{1/2}$).

One value of cell pitch, $CP_{Dh}$, was calculated from the average channel hydraulic diameter of the whole honeycomb cross-sectional area that includes all cells: the sum of $t_{c, Dh}$ plus $t_{w,avg}$. A second cell pitch, $CP_{tc}$, is based on the channel width of a plurality of channels that have approximately the same cross-sectional dimensions, which does not include the partial cells at the periphery. The cell pitch for a plurality of channels, $CP_{tc}$, is the sum of $t_{c,avg}$ plus $t_{w,avg}$.

The values for the ratio of external surface to solid volume, Sv, for the honeycomb PPAV examples were calculated as the ratio of the total channel wall surface area (total channel periphery×caliper length), plus the solid wall area at the two faces, divided by the caliper-determined volume corrected for the void fraction, $\varepsilon$, determined by image analysis, or $[(\Sigma P_c)L+\varepsilon\pi D_{o,c}^2/4]/[(1-\varepsilon)V]$.

Exemplary Embodiments

With reference to the accompanying Tables and Figures, the examples of the parallel passage adsorbent volume (PPAV) were activated carbon honeycombs prepared with ceramic binder system and activated carbon powder, similar to the ingredient types and process steps outlined in U.S. Pat. No. 5,914,294 (incorporated herein by reference in its entirety), i.e., blending of ball clay, flux, organic extrusion aid, activated carbon, calcined kaolin, followed by extrusion, drying, and high temperature calcination. Comparative examples 1 and 12a were commercially available NUCHAR® HCA honeycomb parts. Comparative example 12b was commercially available NUCHAR® HCA-LBE honeycomb part (Ingevity®, North Charleston, S.C., USA). Examples 2 through 9 were made with NUCHAR® RGC-PC acid-activated wood-based carbon powder (Ingevity®, North Charleston, S.C., USA), and had the following properties: Mean particle size of 21.4 microns, $d_{10\%}$ of 3.8 microns, $d_{50\%}$ of 15.5 microns, $d_{90\%}$ of 34.1 microns, powder butane activity (pBACT) of 44.8 g/100 g, $PV_{<1.8nm}$ of 0.185 cc/g, $PV_{1.8-5nm}$ of 0.678 cc/g, and $PV_{5-50nm}$ of 0.285 cc/g, and BET area of 1607 m$^2$/g. Examples 10 and 11 were made with Sabre Series® thermal-activated coconut-based carbon powder (Carbon Resources, Oceanside, Calif., USA) and had the following properties: Mean particle size of 18.0 microns, $d_{10\%}$ of 3.6 microns, $d_{50\%}$ of 16.3 microns, $d_{90\%}$ of 39.4 microns, a powder butane activity (pBACT) of 29.4 g/100 g, $PV_{<1.8nm}$ of 0.470 cc/g, $PV_{1.8-5nm}$ of 0.114 cc/g, and $PV_{5-50nm}$ of 0.025 cc/g, and a BET area of 1226 m$^2$/g.

In preparing example PPAV honeycombs, channel width, wall thickness, and cell pitch were varied by the size and spacing of the slots and pins machined into the extrusion die (e.g., see U.S. Pat. No. 6,080,348, incorporated herein by reference in its entirety). The majority of the examples were extruded with dies that formed channels of square cross-sectional shape, with two noted comparative examples with channels of rectangular or "slit" cross-sectional shape. Proportions of blending ingredients were adjusted, especially the proportion of activated carbon, so that a similar range of BWC and IAC in the finished PPAV honeycombs between inventive and comparative examples could be achieved in light of the varied void fractions in the finished parts resulting from the die selection. In some cases, an additional glass microsphere powder ingredient was added as a diluent for further tuning volumetric adsorptive capacity.

Table 2 provides the structural properties of the comparative and inventive examples of exemplary parallel passage adsorbent volumes in the form of activated carbon honeycombs of about 35 mm in diameter and 150 mm in length within a BWC range of 4.1-4.7 g/dL and IAC range of 17-20 g/L. The Tables provide adsorptive property data for the examples, plus the worst day (day 2) diurnal breathing loss emission performance when these examples were configured as an adsorbent volume on the vent-side of a Type A evaporative emission control system. These example PPAV honeycombs were cylindrically shaped with circular external cross section of measured diameters equivalent to their hydraulic diameters (equal to area/periphery), though embodiments include PPAV honeycombs of alternative external cross-sectional shapes of a cross-sectional dimension to be characterized by a hydraulic diameter.

TABLE 2

Image Analysis, BWC, DBL (35 × 150 mm; 4.1-4.7 BWC).

| | Example | | | | | | | |
|---|---|---|---|---|---|---|---|---|
| | 15 | 16 | 17 | 1 | 2 | 3 | 4 | 7 |
| | Comparative (C)/Inventive (I) | | | | | | | |
| | C | C | C | C | I | I | I | I |
| Caliper length (mm); L | 150.2 | 151.3 | 150.6 | 150.2 | 151.2 | 150.9 | 150.5 | 151.2 |
| Caliper diameter (mm); $D_{o,c}$ | 35.0 | 35.3 | 35.3 | 34.7 | 34.9 | 34.4 | 34.8 | 35.0 |
| $L/D_{o,c}$ | 4.29 | 4.29 | 4.27 | 4.33 | 4.33 | 4.39 | 4.32 | 4.32 |
| Volume (mL); $V = \pi D_{o,c}^2 L/4000$ | 144.8 | 147.9 | 147.2 | 142.1 | 144.7 | 139.9 | 143.3 | 145.5 |
| Total channel area (mm$^2$); $\Sigma A_c$ | 598 | 572 | 419 | 566 | 529 | 538 | 432 | 218 |
| Total channel periphery (mm); $\Sigma P_c$ | 648 | 1276 | 1316 | 1765 | 2314 | 2432 | 2584 | 2097 |
| Outer diameter (mm); $D_o$ | 34.93 | 34.93 | 35.09 | 34.75 | 35.07 | 34.32 | 34.84 | 37.67 |
| Skin thickness (mm) avg; $t_{s, avg}$ | 0.984 | 0.821 | 0.722 | 0.757 | 0.673 | 0.797 | 0.958 | 0.984 |

TABLE 2-continued

Image Analysis, BWC, DBL (35 × 150 mm; 4.1-4.7 BWC).

| | Example | | | | | | | |
|---|---|---|---|---|---|---|---|---|
| | 15 | 16 | 17 | 1 | 2 | 3 | 4 | 7 |
| | Comparative (C)/Inventive (I) | | | | | | | |
| | C | C | C | C | I | I | I | I |
| Wall thickness (mm) mid cell; $t_{w, m}$ | 0.836 | 0.386 | 0.615 | 0.299 | 0.280 | 0.233 | 0.267 | 0.437 |
| Wall thickness (mm) cell base; $t_{w, b}$ | 0.849 | 0.436 | 0.636 | 0.313 | 0.283 | 0.234 | 0.270 | 0.442 |
| Wall thickness (mm) nxn crop; $t_{w, nxn}$ | 0.860 | 0.405 | 0.632 | 0.316 | 0.265 | 0.231 | 0.264 | 0.384 |
| Wall thickness (mm) avg; $t_{w, avg}$ | 0.848 | 0.409 | 0.628 | 0.309 | 0.276 | 0.233 | 0.267 | 0.421 |
| Plurality channel width (mm) avg; $t_{c, avg}$ | 4.195 | 1.876 | 1.364 | 1.326 | 0.940 | 0.917 | 0.675 | 0.454 |
| Average hydraulic diameter (mm); $4\Sigma A_c/\Sigma P_c$ | 3.689 | 1.792 | 1.275 | 1.283 | 0.914 | 0.885 | 0.669 | 0.415 |
| Plurality width cell pitch (mm); $CP_{tc} = t_{c, avg} + t_{w, avg}$ | 5.043 | 2.285 | 1.992 | 1.635 | 1.216 | 1.150 | 0.942 | 0.876 |
| Hydraulic diameter cell pitch (mm); $CP_{Dh}$ | 4.537 | 2.201 | 1.902 | 1.592 | 1.190 | 1.118 | 0.936 | 0.836 |
| Void (%); $\varepsilon = \Sigma A_c/(\pi D_o^2/4)$ | 62.4 | 59.6 | 43.4 | 59.7 | 54.8 | 58.2 | 45.3 | 19.5 |
| No. of cells; $n_c$ | 45 | 182 | 252 | 352 | 627 | 666 | 986 | 1329 |
| Cell density (cpsi); $n_c/(\pi D_o^2/4)$ | 30 | 123 | 168 | 239 | 419 | 465 | 667 | 770 |
| % whole cells ($A_c$ > 0.85 avg $A_c$) | 62.2 | 81.3 | 84.4 | 86.1 | 90.6 | 88.8 | 95.8 | 71.5 |
| Surface/volume ratio, $m^2/m^3$; Sv | 1.8 | 3.2 | 2.4 | 4.6 | 5.4 | 6.3 | 5.0 | 2.7 |
| AD, g/ml | 0.406 | 0.397 | 0.648 | 0.416 | 0.416 | 0.406 | 0.619 | 0.560 |
| BACT, g/100 g | 12.80 | 12.84 | 8.47 | 11.69 | 12.61 | 12.47 | 8.44 | 9.40 |
| BWC, g/dL | 4.31 | 4.29 | 4.70 | 4.13 | 4.54 | 4.18 | 4.45 | 4.45 |
| Retentivity, g/dL | 0.89 | 0.81 | 0.79 | 0.73 | 0.70 | 0.88 | 0.78 | 0.82 |
| BPR, % | 82.9% | 84.2% | 85.6% | 85.0% | 86.6% | 82.6% | 85.1% | 84.4% |
| g-Total BWC (g butane); PPAV BWC × V | 6.24 | 6.35 | 6.92 | 5.87 | 6.57 | 5.85 | 6.38 | 6.48 |
| Canister System Type | A | A | A | A | A | A | A | A |
| GWC, g | 144.9 | 143.5 | 147.5 | 143.8 | 143.3 | 142.3 | 144.8 | 142.2 |
| Purge, L | 210 | 210 | 210.0 | 210 | 210 | 210 | 210 | 210 |
| BV purge | 93.5 | 93.4 | 93.4 | 93.7 | 93.6 | 93.8 | 93.6 | 93.5 |
| Day 2 Emissions, mg | 107.0 | 38.6 | 47.1 | 46.0 | 29.2 | 29.2 | 23.1 | 22.4 |

TABLE 3

Image Analysis, BWC, DBL - High dP Examples.

| | Example | | | |
|---|---|---|---|---|
| | 13 | 14 | 18 | 19 |
| | Comparative (C)/Inventive (I) | | | |
| | C | C | C | C |
| Caliper length (mm); L | 151.0 | 152.0 | 150.2 | 150.2 |
| Caliper diameter (mm); $D_{o, c}$ | 35.0 | 35.4 | 34.7 | 34.7 |
| $L/D_{o, c}$ | 4.31 | 4.29 | 4.33 | 4.33 |
| Volume (mL); $V = \pi D_{o, c}^2 L/4000$ | 145.6 | 150.0 | 142.1 | 142.1 |
| Total channel area ($mm^2$); $\Sigma A_c$ | 148 | 189 | 566 | 566 |
| Total channel periphery (mm); $\Sigma P_c$ | 886 | 1042 | 1765 | 1765 |
| Outer diameter (mm); $D_o$ | 35.26 | 35.64 | 34.75 | 34.75 |
| Skin thickness (mm) avg; $t_{s, avg}$ | 0.894 | 0.705 | 0.757 | 0.757 |
| Wall thickness (mm) mid cell; $t_{w, m}$ | 0.972 | 0.903 | 0.299 | 0.299 |
| Wall thickness (mm) cell base; $t_{w, b}$ | 0.956 | 0.866 | 0.313 | 0.313 |
| Wall thickness (mm) nxn crop; $t_{w, nxn}$ | 0.970 | 0.965 | 0.316 | 0.316 |
| Wall thickness (mm) avg; $t_{w, avg}$ | 0.966 | 0.911 | 0.309 | 0.309 |
| Plurality channel width (mm); $t_{c, avg}$ | 0.673 | 0.728 | 1.326 | 1.326 |
| Average channel hydraulic diameter (mm); $4\Sigma A_c/\Sigma P_c$ | 0.670 | 0.725 | 1.283 | 1.283 |
| Plurality width cell pitch (mm); $CP_{tc} = t_{c, avg} + t_{w, avg}$ | 1.639 | 1.640 | 1.635 | 1.635 |
| Hydraulic diameter cell pitch (mm); $CP_{Dh}$ | 1.636 | 1.637 | 1.592 | 1.592 |
| Void (%); $\varepsilon = \Sigma A_c/(\pi D_o^2/4)$ | 15.2 | 18.9 | 59.7 | 59.7 |
| No. of cells; $n_c$ | 345 | 364 | 352 | 352 |
| Cell density (cpsi); $n_c/(\pi D_o^2/4)$ | 228 | 235 | 239 | 239 |
| % whole cells ($A_c$ > 0.85 avg Ac) | 70.7 | 89.3 | 86.1 | 86.1 |
| Surface/volume ratio, $m^2/m^3$; $S_v$ | 1.1 | 1.3 | 4.6 | 4.6 |
| AD, g/ml | 0.777 | 0.668 | 0.416 | 0.416 |
| BACT, g/100 g | 3.99 | 7.81 | 11.69 | 11.69 |
| BWC, g/dL | 2.78 | 4.43 | 4.13 | 4.13 |
| Retentivity, g/dL | 0.32 | 0.78 | 0.73 | 0.73 |
| BPR, % | 89.7% | 85.0% | 85.0% | 85.0% |
| g-Total BWC (g butane); PPAV BWC × V | 4.05 | 6.64 | 5.87 | 5.87 |

TABLE 3-continued

Image Analysis, BWC, DBL - High dP Examples.

| | Example | | | |
|---|---|---|---|---|
| | 13 | 14 | 18 | 19 |
| | Comparative (C)/Inventive (I) | | | |
| | C | C | C | C |
| Canister System Type | A | A | A | A |
| GWC, g | 140.8 | 143.7 | 140.8 | 143.3 |
| Purge, L | 210 | 210 | 210 | 210 |
| BV purge | 93.5 | 93.3 | 93.7 | 93.7 |
| Day 2 Emissions, mg | 35.6 | 33.6 | 40.9 | 35.9 |

TABLE 4

Image Analysis, BWC, DBL, including slit-shaped cell examples.

| Example | 24 | | 25 | | 22 | 23 |
|---|---|---|---|---|---|---|
| Comparative (C)/Inventive (I) | C-slit | | C-slit | | C | I |
| Caliper length (mm); L | 151.5 | | 151.4 | | 150.5 | 150.7 |
| Caliper diameter (mm); $D_{o,c}$ | 29.3 | | 29.4 | | 29.7 | 28.8 |
| $L/D_{o,c}$ | 5.16 | | 5.15 | | 5.07 | 5.23 |
| Volume (mL); $V = \pi D_{o,c}^2 L/4000$ | 102.4 | | 102.6 | | 104.1 | 98.2 |
| Total channel area (mm$^2$); $\Sigma A_c$ | 390 | | 380 | | 405 | 362 |
| Total channel periphery (mm); $\Sigma P_c$ | 1213 | | 1247 | | 1272 | 1619 |
| Outer diameter (mm); $D_o$ | 29.31 | | 29.34 | | 29.59 | 28.77 |
| Skin thickness (mm) avg; $t_{s,avg}$ | 0.734 | | 0.792 | | 0.691 | 0.515 |
| Wall thickness (mm) mid cell; $t_{w,m}$ | x-axis | y-axis | x-axis | y-axis | 0.301 | 0.259 |
| | 0.268 | 0.378 | 0.342 | 0.398 | | |
| Wall thickness (mm) cell base; $t_{w,b}$ | 0.268 | 0.373 | 0.370 | 0.383 | 0.309 | 0.271 |
| Wall thickness (mm) nxn crop; $t_{w,nxn}$ | 0.226 | 0.256 | 0.206 | 0.294 | 0.303 | 0.262 |
| Wall thickness (mm) avg; $t_{w,avg}$ | 0.254 | 0.336 | 0.306 | 0.358 | 0.304 | 0.264 |
| Plurality channel width (mm) avg; $t_{c,avg}$ | 3.893 | 0.918 | 2.722 | 0.922 | 1.353 | 0.916 |
| Plurality width cell pitch (mm); $CP_{tc} = t_{c,avg} + t_{w,avg}$ | 4.147 | 1.254 | 3.080 | 1.228 | 1.658 | 1.180 |
| Average channel hydraulic diameter (mm); $4\Sigma A_c/\Sigma P_c$ | 1.288 | | 1.218 | | 1.275 | 0.894 |
| Hydraulic diameter cell pitch (mm); $CP_{Dh}$ | 1.583 | | 1.550 | | 1.580 | 1.158 |
| Void (%); $\varepsilon = \Sigma A_c/(\pi D_o^2/4)$ | 57.9 | | 56.2 | | 59.0 | 55.7 |
| No. of cells; $n_c$ | 161 | | 183 | | 249 | 444 |
| Cell density (cpsi); $n_c/(\pi D_o^2/4)$ | 151 | | 174 | | 234 | 441 |
| % whole cells ($A_c > 0.85$ avg $A_c$) | 55.8 | | 66.7 | | 85.0 | 88.5 |
| Surface/volume ratio, m$^2$/m$^3$; $S_v$ | 4.3 | | 4.2 | | 4.5 | 5.6 |
| AD, g/ml | 0.265 | | 0.265 | | 0.366 | 0.439 |
| BACT, g/100 g | 19.64 | | 20.06 | | 12.72 | 11.67 |
| BWC, g/dL | 4.30 | | 4.30 | | 4.04 | 4.28 |
| Retentivity, g/dL | 0.90 | | 1.02 | | 0.61 | 0.85 |
| BPR, % | 82.7% | | 80.8% | | 86.9% | 83.6% |
| g-Total BWC (g butane); PPAV BWC x V | 4.40 | | 4.41 | | 4.21 | 4.20 |
| Canister System Type | A | | A | | A | A |
| GWC, g | 141.4 | | 138.2 | | 142.2 | 142.5 |
| Purge, L | 210 | | 210 | | 210 | 210 |
| BV purge | 95.4 | | 95.3 | | 95.3 | 95.5 |
| Day 2 Emissions, mg | 178.1 | | 78.1 | | 80.0 | 43.2 |

TABLE 5

Image Analysis for additional examples.

| | Example | | | | | |
|---|---|---|---|---|---|---|
| | 6 | 5 | 8 | 9 | 10 | 11 |
| | Comparative (C)/Inventive (I) | | | | | |
| | C | I | C | I | C | I |
| Caliper length (mm); L | 150.0 | 151.5 | 142.5 | 142.6 | 150.7 | 150.6 |
| Caliper diameter (mm); $D_{o,c}$ | 35.0 | 35.0 | 42.2 | 42.3 | 36.0 | 34.4 |
| $L/D_{o,c}$ | 4.29 | 4.33 | 3.38 | 3.37 | 4.19 | 4.37 |
| Volume (mL); $V = \pi D_{o,c}^2 L/4000$ | 144.3 | 145.5 | 199.4 | 200.2 | 153.4 | 140.2 |
| Total channel area (mm²); $\Sigma A_c$ | 402 | 411 | 862 | 662 | 613 | 413 |
| Total channel periphery (mm); $\Sigma P_c$ | 1220 | 2527 | 2657 | 3939 | 1899 | 2620 |
| Outer diameter (mm); $D_o$ | 35.27 | 35.20 | 42.01 | 42.40 | 35.80 | 34.03 |
| Skin thickness (mm) avg; $t_{s,avg}$ | 1.013 | 0.984 | 0.611 | 0.511 | 0.612 | 0.740 |
| Wall thickness (mm) mid cell; $t_{w,m}$ | 0.672 | 0.293 | 0.322 | 0.295 | 0.402 | 0.266 |
| Wall thickness (mm) cell base; $t_{w,b}$ | 0.682 | 0.298 | 0.319 | 0.299 | 0.333 | 0.270 |
| Wall thickness (mm) nxn crop; $t_{w,nxn}$ | 0.670 | 0.289 | 0.294 | 0.277 | 0.309 | 0.256 |
| Wall thickness (mm) avg; $t_{w,avg}$ | 0.675 | 0.293 | 0.312 | 0.291 | 0.348 | 0.264 |
| Plurality channel width (mm) avg; $t_{c,avg}$ | 1.381 | 0.667 | 1.365 | 0.688 | 1.367 | 0.647 |
| Average channel hydraulic diameter (mm); $4\Sigma A_c/\Sigma P_c$ | 1.320 | 0.650 | 1.298 | 0.673 | 1.292 | 0.630 |
| Plurality width cell pitch (mm); $CP_{tc} = t_{c,avg} + t_{w,avg}$ | 2.056 | 0.960 | 1.676 | 0.978 | 1.715 | 0.911 |
| Hydraulic diameter cell pitch (mm); $CP_{Dh}$ | 1.995 | 0.943 | 1.610 | 0.963 | 1.640 | 0.894 |
| Void (%); $\varepsilon = \Sigma A_c/(\pi D_o^2/4)$ | 41.2 | 42.2 | 62.2 | 46.9 | 61.0 | 45.4 |
| No. of cells; $n_c$ | 228 | 995 | 494 | 1465 | 354 | 1033 |
| Cell density (cpsi); $n_c/(\pi D_o^2/4)$ | 150 | 660 | 230 | 669 | 227 | 733 |
| % whole cells ($A_c > 0.85$ avg $A_c$) | 90.4 | 90.0 | 87.7 | 92.4 | 84.9 | 93.4 |
| Surface/volume ratio, m²/m³; $S_v$ | 2.2 | 4.6 | 5.0 | 5.3 | 4.8 | 5.2 |
| AD, g/ml | 0.564 | 0.525 | 0.251 | 0.411 | 0.329 | 0.661 |
| BACT, g/100 g | 13.16 | 12.66 | 12.81 | 7.86 | 14.74 | 7.07 |
| BWC, g/dL | 5.92 | 5.47 | 2.95 | 2.98 | 3.01 | 2.86 |
| Retentivity, g/dL | 1.50 | 1.18 | 0.26 | 0.25 | 1.83 | 1.81 |
| PPAV part BPR, % | 79.8% | 82.2% | 91.8% | 92.2% | 62.2% | 61.3% |
| g-Total BWC (g butane); PPAV BWC × V | 8.54 | 7.95 | 5.88 | 5.97 | 4.62 | 4.01 |
| Canister System Type | A | A | A | A | A | A |
| GWC, g | 149.5 | 145.1 | 140.7 | 142.8 | 142.3 | 144.1 |
| Purge, L | 210 | 210 | 210 | 210 | 210 | 210 |
| BV purge | 93.6 | 93.5 | 91.3 | 91.3 | 93.2 | 93.7 |
| Day 2 Emissions, mg | 47.9 | 22.5 | 28.9 | 7.8 | 33.9 | 17.3 |

TABLE 6

Image Analysis, BWC, DBL - PPAV In-Series Examples.

| | Example | | | | | | |
|---|---|---|---|---|---|---|---|
| | 9 | 12a | 12b | 20a | 20b | 21a | 21b |
| | Comparative (C)/Inventive (I) | | | | | | |
| | I | C | C | I | I | C | C |
| Caliper length (mm); L | 142.6 | 100.1 | 99.4 | 99.0 | 101.0 | 100.0 | 99.9 |
| Caliper diameter (mm); $D_{o,c}$ | 42.3 | 29.5 | 29.6 | 27.8 | 29.2 | 30.0 | 29.8 |
| $L/D_{o,c}$ | 3.37 | 3.40 | 3.35 | 3.56 | 3.46 | 3.34 | 3.35 |
| Volume (mL); $V = \pi D_{o,c}^2 L/4000$ | 200.2 | 68.3 | 68.6 | 60.2 | 67.6 | 70.5 | 69.8 |
| Total channel area (mm²); $\Sigma A_c$ | 662 | 389 | 404 | 287 | 319 | 406 | 404 |
| Total channel periphery (mm); $\Sigma P_c$ | 3939 | 1226 | 1236 | 1817 | 1930 | 1291 | 1252 |
| Outer diameter (mm); $D_o$ | 42.40 | 30.26 | 30.53 | 28.13 | 28.84 | 29.65 | 29.52 |
| Skin thickness (mm) avg; $t_{s,avg}$ | 0.511 | 0.897 | 1.028 | 0.479 | 0.408 | 0.728 | 0.654 |
| Wall thickness (mm) mid cell; $t_{w,m}$ | 0.295 | 0.346 | 0.329 | 0.277 | 0.284 | 0.298 | 0.304 |
| Wall thickness (mm) cell base; $t_{w,b}$ | 0.299 | 0.356 | 0.334 | 0.279 | 0.285 | 0.301 | 0.318 |
| Wall thickness (mm) nxn crop; $t_{w,nxn}$ | 0.277 | 0.345 | 0.293 | 0.261 | 0.270 | 0.294 | 0.311 |
| Wall thickness (mm) avg; $t_{w,avg}$ | 0.291 | 0.349 | 0.319 | 0.272 | 0.280 | 0.297 | 0.311 |
| Plurality channel width (mm) avg; $t_{c,avg}$ | 0.688 | 1.342 | 1.358 | 0.646 | 0.678 | 1.338 | 1.369 |
| Average channel hydraulic diameter (mm); $4\Sigma A_c/\Sigma P_c$ | 0.673 | 1.269 | 1.306 | 0.632 | 0.662 | 1.259 | 1.292 |
| Plurality width cell pitch (mm); $CP_{tc} = t_{c,avg} + t_{w,avg}$ | 0.978 | 1.690 | 1.677 | 0.918 | 0.957 | 1.635 | 1.680 |
| Hydraulic diameter cell pitch (mm); $CP_{Dh}$ | 0.963 | 1.618 | 1.625 | 0.904 | 0.941 | 1.557 | 1.603 |
| Void (%); $\varepsilon = \Sigma A_c/(\pi D_o^2/4)$ | 46.9 | 54.2 | 55.1 | 46.2 | 48.9 | 58.9 | 59.1 |
| No. of cells; $n_c$ | 1465 | 244 | 232 | 728 | 725 | 255 | 243 |
| Cell density (cpsi); $n_c/(\pi D_o^2/4)$ | 669 | 219 | 204 | 756 | 716 | 238 | 229 |
| % whole cells ($A_c > 0.85$ avg $A_c$) | 92.4 | 83.9 | 86.2 | 87.0 | 90.0 | 84.3 | 85.6 |
| Surface/volume ratio, m²/m³; $S_v$ | 5.3 | 3.9 | 4.0 | 5.9 | 5.7 | 4.7 | 4.6 |

TABLE 6-continued

Image Analysis, BWC, DBL - PPAV In-Series Examples.

| | Example | | | | | | |
|---|---|---|---|---|---|---|---|
| | 9 | 12a | 12b | 20a | 20b | 21a | 21b |
| | \multicolumn{7}{c}{Comparative (C)/Inventive (I)} | | | | | | |
| | I | C | C | I | I | C | C |
| AD, g/ml | 0.411 | 0.445 | 0.492 | 0.6537 | 0.4324 | 0.4068 | 0.5363 |
| BACT, g/100 g | 7.86 | 11.94 | 4.87 | 8.89 | 6.90 | 12.68 | 4.34 |
| BWC, g/dL | 2.98 | 4.34 | 2.26 | 4.71 | 2.77 | 4.34 | 2.18 |
| part retentivity, g/dL | 0.25 | 0.98 | 0.14 | 1.10 | 0.21 | 0.82 | 0.15 |
| BPR, % | 92.2% | 81.6% | 94.4% | 81.0% | 93.0% | 84.2% | 93.8% |
| g-Total BWC (g butane); PPAV BWC × V | 5.97 | 2.96 | 1.55 | 2.84 | 1.87 | 3.06 | 1.52 |
| Canister System Type | B | B | | C | | C | |
| Load dP of system at 40 lpm, kPa | 1.19 | 1.59 | | 1.43 | | 1.00 | |
| Purge dP of system at 40 lpm, kPa | 1.90 | 2.45 | | 1.66 | | 1.27 | |
| GWC, g | 122.2 | 121.8 | | 143.7 | | 144.9 | |
| Purge, L | 210 | 210 | | 210.8 | | 210.8 | |
| BV purge | 91.3 | 93.9 | | 80.8 | | 80.4 | |
| Day 2 Emissions, mg | 9.4 | 12.4 | | 4.4 | | 9.4 | |

Figure 17:
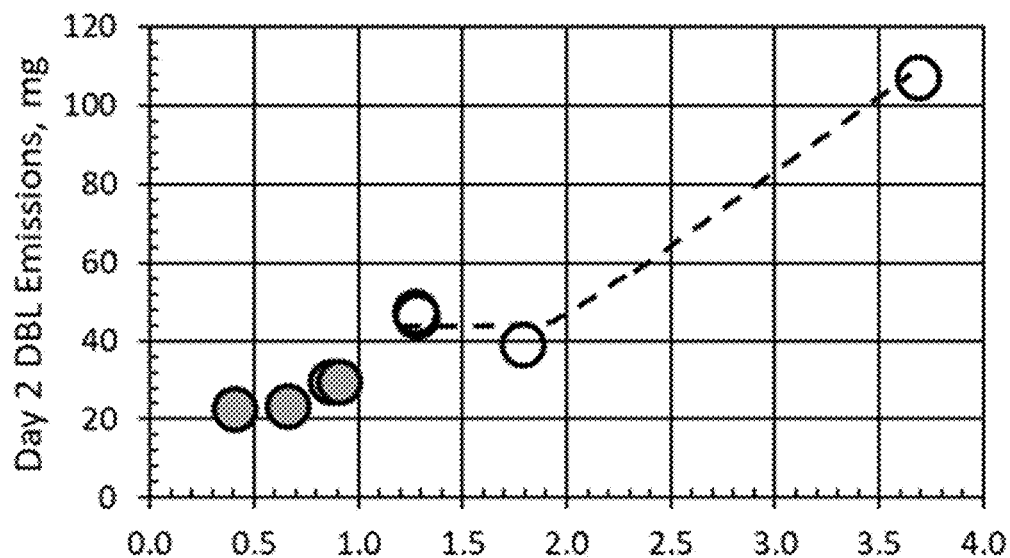
FIG. 17 is test data for 35 mm diameter×150 mm long comparative (open circles) and inventive examples (filled circles) for day 2 DBL emissions as a function of PPAV average channel hydraulic diameter ($t_{c,Dh}$).
Figure 18:
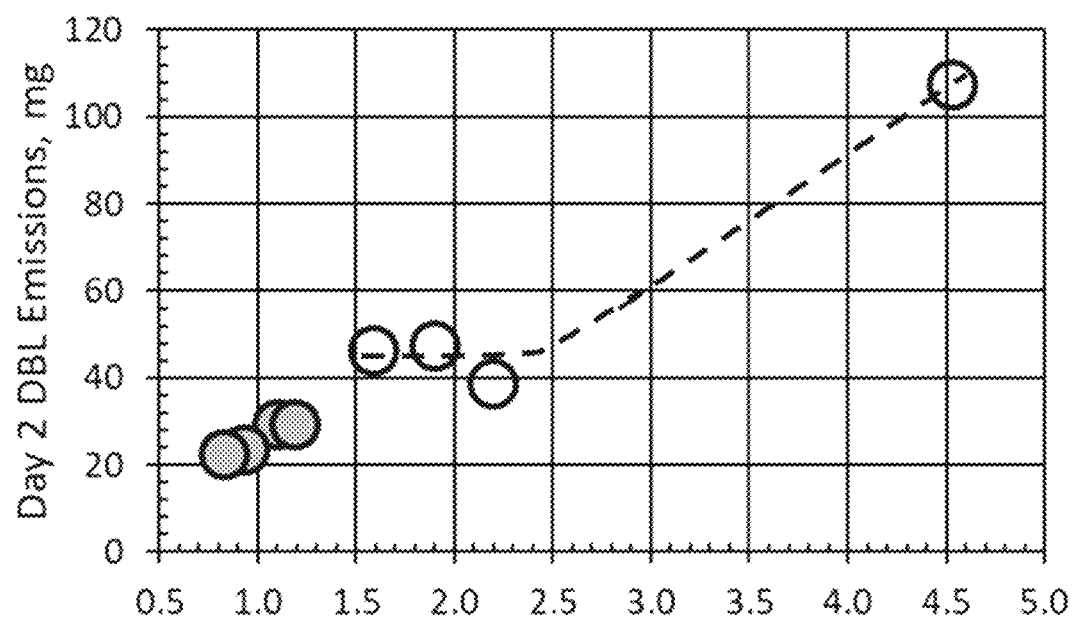
FIG. 18 are test data for 35 mm diameter×150 mm long comparative (open circles) and inventive examples (filled circles) for day 2 DBL emissions as a function of PPAV channel hydraulic diameter cell pitch ($CP_{Dh}$).

As can be seen in the data in Tables 2-6, the evaporative emission control systems of the present disclosure have substantially reduced DBL emissions with use of the inventive examples of parallel passage adsorbent in a vent-side volume versus the use of the comparative examples. The examples in Table 2, in the form of activated carbon PPAV honeycombs of approximately 35 mm diameter and 150 mm length, were tested in the vent-side auxiliary canister 300 in a type A canister system, as described above and in Table 1. FIG. 17 shows comparative example carbon honeycombs with average channel hydraulic diameters of 1.25 mm or greater having day 2 DBL emissions of greater than 39 mg (open symbols, ○), and appearing to level off between 1.8 and 1.25 mm hydraulic diameter. In contrast, the inventive examples with narrower channels of 0.4-0.9 mm channel hydraulic diameter have substantially lower emissions, at less than 30 mg day 2 emissions (closed symbols, ●). FIG. 18 shows that the lower emissions for the inventive examples correlate with lower cell pitch of 0.8-1.2 mm based on the hydraulic diameter, especially compared with 1.6-2.2 mm cell pitch for the comparative examples where the high emissions appeared to have leveled off as a function of pitch.

Figure 19:
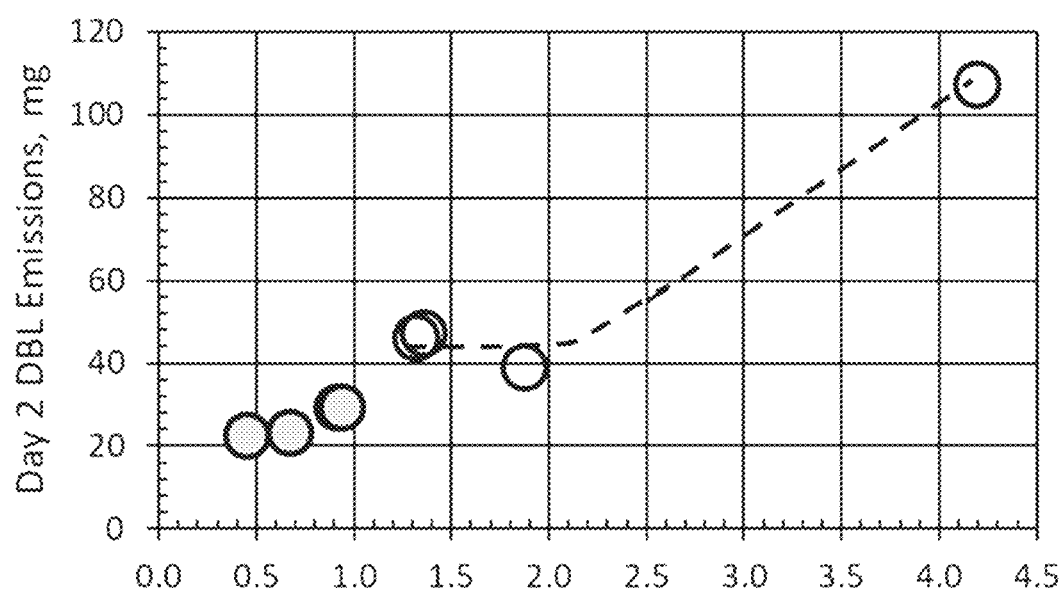
FIG. 19 are test data for 35 mm diameter×150 mm long comparative (open circles) and inventive examples (filled circles) for day 2 DBL emissions as a function of PPAV channel width plurality ($t_{c,avg}$).
Figure 20:
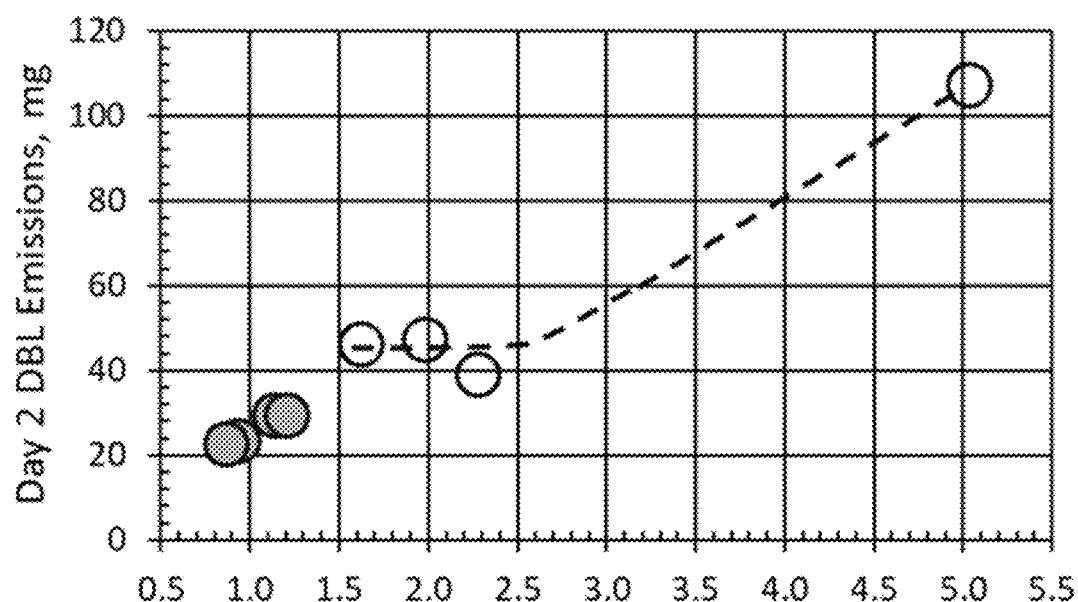
FIG. 20 are test data for 35 mm diameter×150 mm long comparative (open circles) and inventive examples (filled circles) for day 2 DBL emissions as a function of PPAV cell pitch based on channel width plurality ($CP_{tc,avg}$; i.e., "plurality width cell pitch").
Figure 21:
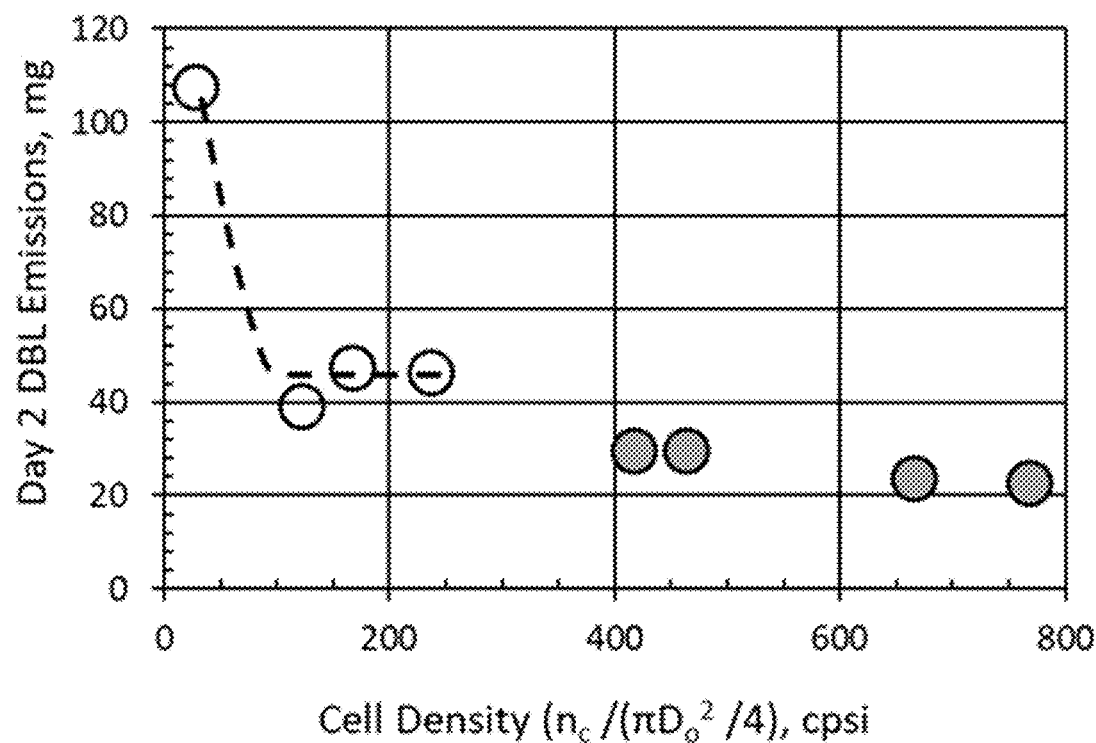
FIG. 21 are test data for 35 mm diameter×150 mm long comparative (open circles) and inventive examples (filled circles) for day 2 DBL emissions as a function of PPAV cell density (cells per square inch; cpsi).

Likewise, as shown in FIG. 19, the lower emissions of the inventive examples also correlate with the plurality of their channel widths of about 0.4-0.9 mm being much smaller than those of the comparative examples at greater than 1.3 mm width, and for their cell pitch based on the plurality of channel widths also smaller at 0.9-1.2 mm, compared with about 1.6-2 mm for the comparative examples where the higher emissions appeared to have leveled off as a function of pitch (FIG. 20). An alternative way to show the effect is according to cell density, where emissions appeared to level off between about 125 and 240 cpsi for the comparative examples, but were substantially lower for the higher cell density, inventive examples (FIG. 21).

Figure 22:
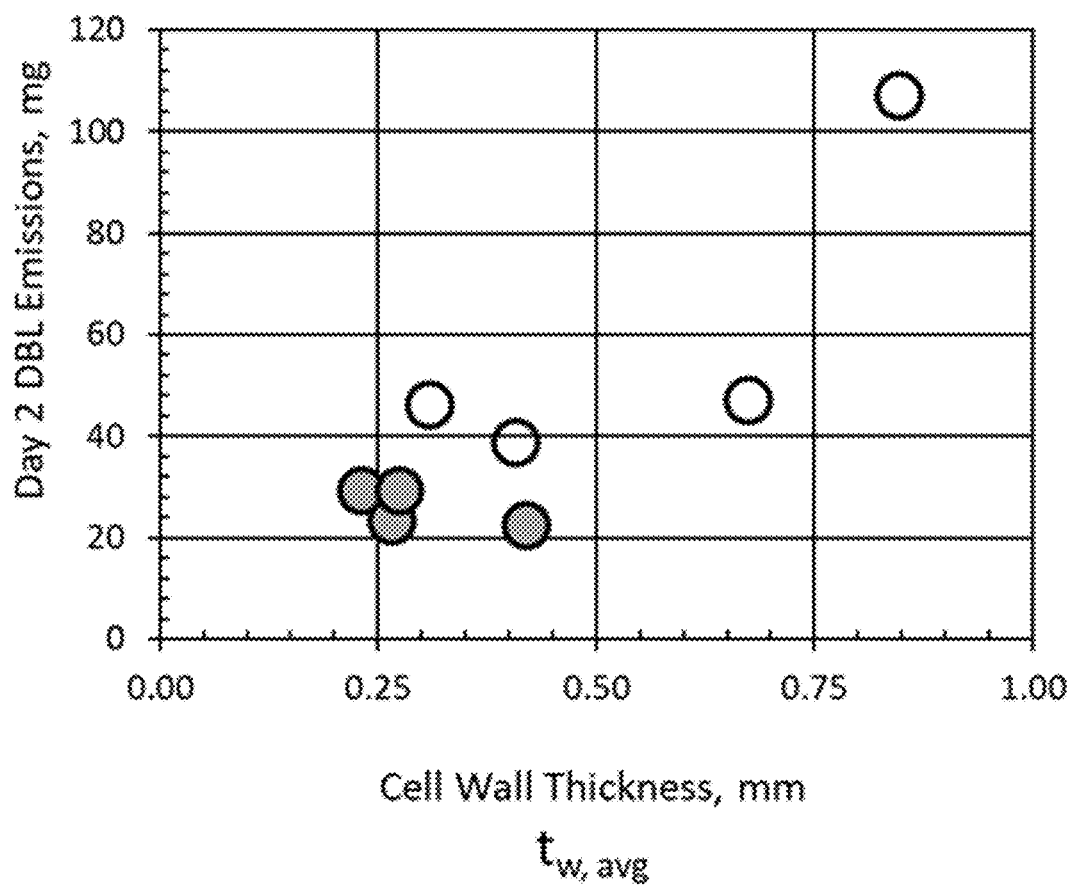
FIG. 22 are test data for 35 mm diameter×150 mm long comparative (open circles) and inventive examples (filled circles) for day 2 DBL emissions as a function of PPAV cell wall thickness ($t_{w,avg}$).

Surprisingly, as shown in FIG. 22, the benefit to canister system emissions by the use of the inventive examples over the comparative examples was not a result of lower wall thickness. For example, comparative examples 1 and 17 had the same 46-47 mg emissions despite more than a twofold difference in cell wall thickness. Likewise, despite falling within the same 0.27-0.42 mm range of wall thickness, comparative examples 1 and 16 had substantially higher emissions than inventive examples 2, 4 and 7.

Figure 23:
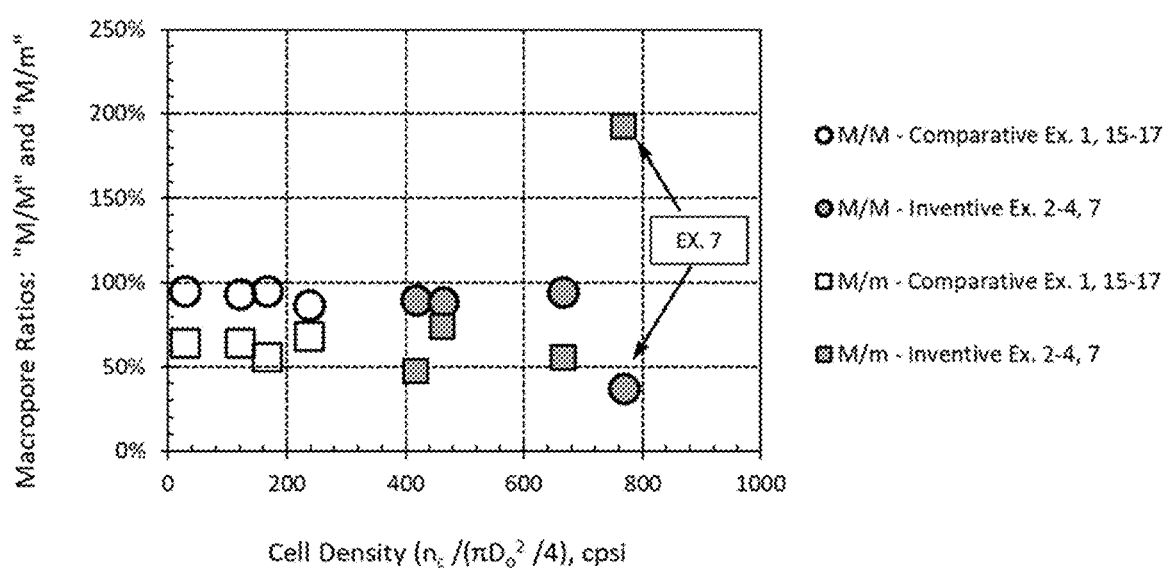
FIG. 23 are test data for 35 mm diameter×150 mm long comparative (open circles and open squares) and inventive examples (filled circles and filled squares) for macropore ratios (M/M and M/m) as a function of cell density (cells per square inch; cpsi).
Figure 24:
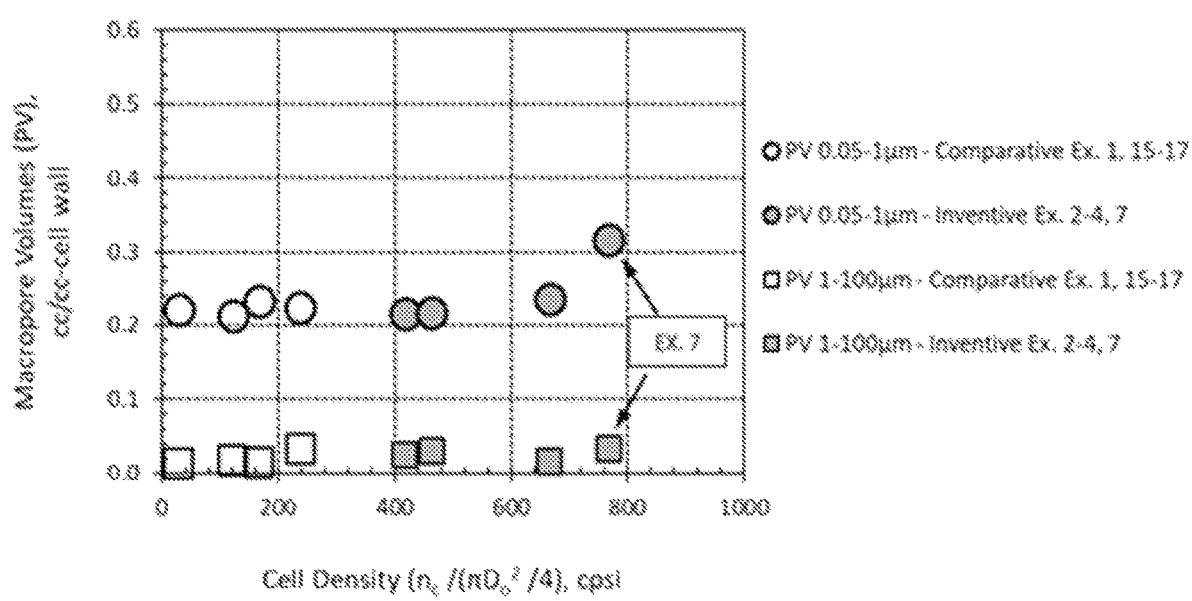
FIG. 24 are test data for 35 mm diameter×150 mm long comparative (open circles and open squares) and inventive examples (filled circles and filled squares) for macropore volumes (PV) as a function of cell density (cells per square inch; cpsi).

It should be stressed that there was no trend or correlation of the DBL emissions of the inventive examples with macropore distribution and macropore volume properties. With reference to Tables 7-11, the macropore distribution values of M/M and M/m, as well as PV pore volumes for pores 0.05-100 micron size and particle density were determined in accordance with ISO 15901-1 (2016) as described in U.S. Pat. No. 9,322,368 and in U.S. Pat. No. 9,174,195, respectively, which are incorporated herein by reference in their entirety. The '368 patent and '195 patent teach that emission control performance is optimal when in the ranges of 30-70% M/M and 65-150% M/m. For example, as shown in FIG. 23, the values of the variety of PPAV parts in Tables 7-11 for both comparative and inventive parts were in the same ranges, therefore, not a factor in the differentiated performance of the inventive examples, akin to the similarities in ingredients, BWC, external dimensions, and IAC. In fact, the M/M and M/m values were often outside of the taught optimal ranges for both example groups. In terms of pore volumes on a volume of cell wall basis (multiplying the cc/g pore volume by the measured particle density (g/cc of the example parts so as to normalize for differences potentially resulting from differences in extrusion formulations), FIG. 24 shows no differences between the comparative and inventive example groups for the volumes of macropores of both small size (0.05-1 μm) and of large size (1-100 μm). About 20% of the wall volume (0.2 cc/cc-wall) is small size macropores, and less than 5% of the wall volume (<0.05 cc/cc-wall) is large size macropores. (Note that Example 7 is an outlier with a high volume of macropores, particularly of smaller size, due to the ingredient formulation used in its preparation for tuning its volumetric adsorptive properties into the comparable range as the other example groupings in Table 7).

TABLE 7 dP, IAC, PV (35 × 150 mm; 4.1-4.7 BWC).

| | Example | | | | | | | |
|---|---|---|---|---|---|---|---|---|
| | 15 | 16 | 17 | 1 | 2 | 3 | 4 | 7 |
| | Comparative (C)/Inventive (I) | | | | | | | |
| | C | C | C | C | I | I | I | I |
| Caliper length (mm); L | 150.2 | 151.3 | 150.6 | 150.2 | 151.2 | 150.9 | 150.5 | 151.2 |
| Caliper diameter (mm); $D_{o,\,c}$ | 35.0 | 35.3 | 35.3 | 34.7 | 34.9 | 34.4 | 34.8 | 35.0 |
| Wall thickness (mm) avg; $t_{w,\,avg}$ | 0.848 | 0.409 | 0.628 | 0.309 | 0.276 | 0.233 | 0.267 | 0.421 |
| Average channel hydraulic diameter (mm); $4\Sigma A_c/\Sigma P_c$ | 3.689 | 1.792 | 1.275 | 1.283 | 0.914 | 0.885 | 0.669 | 0.415 |
| Hydraulic diameter cell pitch (mm); $CP_{Dh}$ | 4.537 | 2.201 | 1.902 | 1.592 | 1.190 | 1.118 | 0.936 | 0.836 |
| Plurality width cell pitch (mm); $CP_{tc} = t_{c,\,avg} + t_{w,\,avg}$ | 5.043 | 2.285 | 1.992 | 1.635 | 1.216 | 1.150 | 0.942 | 0.876 |
| Cell density (cpsi); $n_c/(\pi D_o^2/4)$ | 30 | 123 | 168 | 239 | 419 | 465 | 667 | 770 |
| dP o at 40 lpm, kPa | 0.034 | 0.050 | 0.000 | 0.062 | 0.110 | 0.151 | 0.295 | 0.829 |
| dP at 46 cm/s, kPa | 0.027 | 0.036 | 0.000 | 0.058 | 0.105 | 0.127 | 0.291 | 0.805 |
| IAC, g/L | 18.5 | 18.9 | 20.3 | 17.1 | 19.5 | 16.7 | 19.4 | 17.8 |
| 5% butane capacity (g/g); $m_{5\%}$ | 0.065 | 0.066 | 0.044 | 0.067 | 0.068 | 0.067 | 0.044 | 0.050 |
| 50% butane capacity (g/g); $m_{50\%}$ | 0.111 | 0.114 | 0.076 | 0.108 | 0.115 | 0.108 | 0.075 | 0.081 |
| Ratio $m_{0.5\%}/m_{50\%}$ | 0.324 | 0.331 | 0.325 | 0.348 | 0.331 | 0.357 | 0.326 | 0.348 |
| Ratio $m_{5\%}/m_{50\%}$ | 0.588 | 0.583 | 0.586 | 0.620 | 0.590 | 0.619 | 0.585 | 0.611 |
| Particle density <100 μm, g/cc | 0.982 | 0.968 | 1.167 | 1.008 | 0.987 | 1.016 | 1.186 | 0.752 |
| BET Area, $m^2/g$ | 406 | 415 | 288 | 412 | 443 | 410 | 288 | 307 |
| $PV_{<1.8\,nm}$, cc/g | 0.046 | 0.047 | 0.037 | 0.054 | 0.062 | 0.059 | 0.041 | 0.041 |
| $PV_{1.8-5\,nm}$, cc/g | 0.182 | 0.186 | 0.113 | 0.154 | 0.168 | 0.160 | 0.108 | 0.129 |
| $PV_{5-50\,nm}$, cc/g | 0.090 | 0.089 | 0.081 | 0.118 | 0.118 | 0.071 | 0.072 | 0.057 |
| $PV_{<0.1\,\mu m}$, cc/g | 0.327 | 0.328 | 0.245 | 0.335 | 0.362 | 0.293 | 0.230 | 0.230 |
| $PV_{0.1-100\,\mu m}$, cc/g | 0.208 | 0.209 | 0.136 | 0.226 | 0.169 | 0.216 | 0.127 | 0.443 |
| $PV_{0.05-1\,\mu m}$, cc/g | 0.224 | 0.219 | 0.198 | 0.221 | 0.217 | 0.212 | 0.198 | 0.419 |
| $PV_{1-100\,\mu m}$, cc/g | 0.012 | 0.016 | 0.011 | 0.031 | 0.024 | 0.028 | 0.012 | 0.042 |
| $PV_{0.05-0.5\,\mu m}$, cc/g | 0.223 | 0.218 | 0.198 | 0.217 | 0.215 | 0.212 | 0.197 | 0.168 |
| $PV_{0.05-100\,\mu m}$, cc/g | 0.236 | 0.235 | 0.209 | 0.252 | 0.241 | 0.240 | 0.210 | 0.461 |
| $PV_{0.05-1\,\mu m}/PV_{0.05-100\,\mu m}$, % | 94.9% | 93.2% | 94.8% | 87.6% | 90.0% | 88.4% | 94.2% | 90.8% |
| $PV_{0.05-0.5\,\mu m}/PV_{0.05-100\,\mu m}$, "M/M" | 94.5% | 92.6% | 94.6% | 86.3% | 89.0% | 88.4% | 93.9% | 36.5% |
| $PV_{0.1-100\,\mu m}/PV_{<0.1\,\mu m}$, "M/m" | 63.5% | 63.7% | 55.4% | 67.5% | 46.7% | 73.6% | 55.3% | 192% |
| $PV_{0.05-1\,\mu m}$, cc/cc-Wall | 0.220 | 0.212 | 0.231 | 0.223 | 0.214 | 0.216 | 0.234 | 0.315 |
| $PV_{1-100\,\mu m}$, cc/cc-wall | 0.012 | 0.015 | 0.013 | 0.031 | 0.024 | 0.028 | 0.014 | 0.032 |

TABLE 8 dP, IAC, PV - High dP Examples.

| | Example | | | |
|---|---|---|---|---|
| | 13 | 14 | 18 | 19 |
| | Comparative (C)/Inventive (I) | | | |
| | C | C | C | C |
| Caliper length (mm); L | 151.0 | 152.0 | 150.2 | 150.2 |
| Caliper diameter (mm); $D_{o,\,c}$ | 35.0 | 35.4 | 34.7 | 34.7 |
| Wall thickness (mm) avg; $t_{w,\,avg}$ | 0.966 | 0.911 | 0.309 | 0.309 |
| Average channel hydraulic diameter (mm); $4\Sigma A_c/\Sigma P_c$ | 0.670 | 0.725 | 1.283 | 1.283 |
| Hydraulic diameter cell pitch (mm); $CP_{Dh}$ | 1.636 | 1.637 | 1.592 | 1.592 |
| Plurality width cell pitch(mm); $CP_{tc} = t_{c,\,avg} + t_{w,\,avg}$ | 1.639 | 1.640 | 1.635 | 1.635 |
| Cell density (cpsi); $nc/(\pi Do^2/4)$ | 228 | 235 | 239 | 239 |
| dP only at 40 lpm, kPa | 0.563 | 0.599 | 0.421 | 0.406 |
| dP at 46 cm/s, kPa | 0.541 | 0.556 | 0.287 | 0.287 |
| IAC, g/L | 12.4 | 20.4 | 17.1 | 17.1 |
| 5% butane capacity (g/g); m5% | 0.021 | 0.041 | 0.067 | 0.067 |
| 50% butane capacity (g/g); m50% | 0.037 | 0.072 | 0.108 | 0.108 |
| Ratio m0.5%/m50% | 0.303 | 0.308 | 0.348 | 0.348 |
| Ratio m5%/m50% | 0.574 | 0.574 | 0.620 | 0.620 |
| Particle density <100 μm, g/cc | 0.897 | 0.805 | 1.008 | 1.008 |
| BET Area, $m^2/g$ | 138 | 326 | 412 | 412 |
| $PV_{<1.8\,nm}$, cc/g | 0.013 | 0.039 | 0.054 | 0.054 |
| $PV_{1.8-5\,nm}$, cc/g | 0.064 | 0.141 | 0.154 | 0.154 |
| $PV_{5-50\,nm}$, cc/g | 0.037 | 0.078 | 0.118 | 0.118 |
| $PV_{<0.1\,\mu m}$, cc/g | 0.117 | 0.262 | 0.335 | 0.335 |
| $PV_{0.1-100\,\mu m}$, cc/g | 0.356 | 0.390 | 0.226 | 0.226 |
| $PV_{0.05-1\,\mu m}$, cc/g | 0.376 | 0.410 | 0.221 | 0.221 |
| $PV_{1-100\,\mu m}$, cc/g | 0.026 | 0.020 | 0.031 | 0.031 |

TABLE 8-continued dP, IAC, PV - High dP Examples.

| | Example | | | |
|---|---|---|---|---|
| | 13 | 14 | 18 | 19 |
| | Comparative (C)/Inventive (I) | | | |
| | C | C | C | C |
| $PV_{0.05-0.5 \, \mu m}$, cc/g | 0.260 | 0.245 | 0.217 | 0.217 |
| $PV_{0.05-100 \, \mu m}$, cc/g | 0.402 | 0.431 | 0.252 | 0.252 |
| $PV_{0.05-1 \, \mu m}/PV_{0.05-100 \, \mu m}$, % | 93.5% | 95.3% | 87.6% | 87.6% |
| $PV_{0.05-0.5 \, \mu m}/PV_{0.05-100 \, \mu m}$, "M/M" | 64.6% | 56.8% | 86.3% | 86.3% |
| $PV_{0.1-100 \, \mu m}/PV_{<0.1 \, \mu m}$, "M/m" | 304% | 149% | 67.5% | 67.5% |
| $PV_{0.05-1 \, \mu m}$, cc/cc-wall | 0.337 | 0.330 | 0.223 | 0.223 |
| $PV_{1-100 \, \mu m}$, cc/cc-wall | 0.032 | 0.016 | 0.031 | 0.031 |

TABLE 9 dP, IAC, PV, including slit-shaped cell examples.

| Example | 24 | | 25 | | 22 | 23 |
|---|---|---|---|---|---|---|
| Comparative (C)/Inventive (I) | C-slit | | C-slit | | C | I |
| Caliper length (mm); L | 151.5 | | 151.4 | | 150.5 | 150.7 |
| Caliper diameter (mm); $D_{o,c}$ | 29.3 | | 29.4 | | 29.7 | 28.8 |
| Wall thickness (mm) avg; $t_{w,avg}$ | x-axis | y-axis | x-axis | y-axis | 0.304 | 0.264 |
| | 0.254 | 0.336 | 0.306 | 0.358 | | |
| Average channel hydraulic diameter (mm); $4\Sigma A_c/\Sigma P_c$ | 1.288 | | 1.218 | | 1.275 | 0.894 |
| Hydraulic diameter cell pitch (mm); $CP_{Dh}$ | 1.5583 | | 1.550 | | 1.580 | 1.158 |
| Plurality width cell pitch (mm); $CP_{tc} = t_{c,avg} + t_{w,avg}$ | 4.147 | 1.254 | 3.080 | 1.228 | 1.658 | 1.180 |
| Cell density (cpsi); $n_c/(\pi D_o^2/4)$ | 151 | | 174 | | 234 | 441 |
| dP only at 40 lpm, kPa | 0.087 | | 0.189 | | 0.308 | 0.147 |
| dP at 46 cm/s, kPa | 0.077 | | 0.176 | | 0.219 | 0.120 |
| IAC, g/L | 18.3 | | 17.0 | | 17.3 | 17.3 |
| 5% butane capacity (g/g); m5% | 0.106 | | 0.103 | | 0.068 | 0.061 |
| 50% butane capacity (g/g); m50% | 0.175 | | 0.167 | | 0.115 | 0.100 |
| Ratio m0.5%/m50% | 0.349 | | 0.346 | | 0.334 | 0.343 |
| Ratio m5%/m50% | 0.606 | | 0.615 | | 0.590 | 0.606 |
| Particle density <100 μm, g/cc | 0.841 | | 0.800 | | 0.948 | 1.002 |
| BET Area, $m^2/g$ | 701 | | 622 | | 418 | 363 |
| $PV_{<1.8 \, nm}$, cc/g | 0.095 | | 0.080 | | 0.057 | 0.045 |
| $PV_{1.8-5 \, nm}$, cc/g | 0.290 | | 0.264 | | 0.160 | 0.155 |
| $PV_{5-50 \, nm}$, cc/g | 0.172 | | 0.158 | | 0.120 | 0.101 |
| $PV_{<0.1 \, \mu m}$, cc/g | 0.570 | | 0.513 | | 0.348 | 0.311 |
| $PV_{0.1-100 \, \mu m}$, cc/g | 0.373 | | 0.352 | | 0.204 | 0.215 |
| $PV_{0.05-1 \, \mu m}$, cc/g | 0.323 | | 0.320 | | 0.207 | 0.214 |
| $PV_{1-100 \, \mu m}$, cc/g | 0.072 | | 0.050 | | 0.033 | 0.032 |
| $PV_{0.05-0.5 \, \mu m}$, cc/g | 0.312 | | 0.312 | | 0.205 | 0.212 |
| $PV_{0.05-100 \, \mu m}$, cc/g | 0.395 | | 0.370 | | 0.240 | 0.246 |
| $PV_{0.05-1 \, \mu m}/PV_{0.05-100 \, \mu m}$, % | 81.8% | | 86.6% | | 86.4% | 87.1% |
| $PV_{0.05-0.5 \, \mu m}/PV_{0.05-100 \, \mu m}$, "M/M" | 79.1% | | 84.3% | | 85.4% | 86.2% |
| $PV_{0.01-100 \, \mu m}/PV_{<0.1 \, \mu m}$, "M/m" | 65.4% | | 68.6% | | 58.5% | 69.2% |
| $PV_{0.05-1 \, \mu m}$, cc/cc-wall | 0.272 | | 0.256 | | 0.196 | 0.214 |
| $PV_{1-100 \, \mu m}$, cc/cc-wall | 0.061 | | 0.040 | | 0.031 | 0.032 |

TABLE 10 dP, IAC, PV - alternative BWC, carbon and dimension examples.

| | Example | | | | | |
|---|---|---|---|---|---|---|
| | 6 | 5 | 8 | 9 | 10 | 11 |
| | Comparative (C)/Inventive (I) | | | | | |
| | C | I | C | I | C | I |
| Caliper length (mm); L | 150.0 | 151.5 | 142.5 | 142.6 | 150.7 | 150.6 |
| Caliper diameter (mm); $D_{o,c}$ | 35.0 | 35.0 | 42.2 | 42.3 | 36.0 | 34.4 |
| Wall thickness (mm) avg; $t_{w,avg}$ | 0.675 | 0.293 | 0.312 | 0.291 | 0.348 | 0.264 |
| Average channel hydraulic diameter (mm); $4\Sigma A_c/\Sigma P_c$ | 1.320 | 0.650 | 1.298 | 0.673 | 1.292 | 0.630 |

TABLE 10-continued dP, IAC, PV - alternative BWC, carbon and dimension examples.

| | Example | | | | | |
|---|---|---|---|---|---|---|
| | 6 | 5 | 8 | 9 | 10 | 11 |
| | \multicolumn{6}{c}{Comparative (C)/Inventive (I)} | | | | | |
| | C | I | C | I | C | I |
| Hydraulic diameter cell pitch (mm); $CP_{Dh}$ | 1.995 | 0.943 | 1.610 | 0.963 | 1.640 | 0.894 |
| Plurality width cell pitch(mm); $CP_{tc} = t_{c,\,avg} + t_{w,\,avg}$ | 2.056 | 0.960 | 1.676 | 0.978 | 1.715 | 0.911 |
| Cell density (cpsi); $n_c/(\pi D_o^2/4)$ | 150 | 660 | 230 | 669 | 227 | 733 |
| dP at 40 lpm, kPa | 0.074 | 0.281 | 0.035 | 0.249 | 0.054 | 0.264 |
| dP at 46 cm/s, kPa | 0.065 | 0.261 | 0.034 | 0.247 | 0.054 | 0.250 |
| IAC, g/L | 26.3 | 24.6 | 10.4 | 10.4 | 9.9 | 10.0 |
| 5% butane capacity (g/g); m5% | 0.068 | 0.069 | 0.068 | 0.040 | 0.121 | 0.054 |
| 50% butane capacity (g/g); m50% | 0.115 | 0.115 | 0.109 | 0.065 | 0.151 | 0.070 |
| Ratio m0.5%/m50% | 0.331 | 0.332 | 0.359 | 0.338 | 0.577 | 0.559 |
| Ratio m5%/m50% | 0.593 | 0.594 | 0.621 | 0.610 | 0.801 | 0.783 |
| Particle density <100 μm, g/cc | 1.304 | 1.024 | 0.745 | 0.972 | 0.896 | 1.543 |
| BET Area, m²/g | 433 | 444 | 407 | 250 | 588 | 276 |
| $PV_{<1.8\,nm}$, cc/g | 0.059 | 0.058 | 0.056 | 0.031 | 0.225 | 0.099 |
| $PV_{1.8-5\,nm}$, cc/g | 0.167 | 0.173 | 0.169 | 0.108 | 0.053 | 0.035 |
| $PV_{5-50\,nm}$, cc/g | 0.101 | 0.112 | 0.075 | 0.048 | 0.017 | 0.009 |
| $PV_{<0.1\,\mu m}$, cc/g | 0.337 | 0.362 | 0.305 | 0.191 | 0.303 | 0.145 |
| $PV_{0.1-100\,\mu m}$, cc/g | 0.163 | 0.156 | 0.454 | 0.406 | 0.351 | 0.230 |
| $PV_{0.05-1\,\mu m}$, cc/g | 0.220 | 0.206 | 0.427 | 0.407 | 0.331 | 0.215 |
| $PV_{1-100\,\mu m}$, cc/g | 0.012 | 0.021 | 0.049 | 0.032 | 0.032 | 0.022 |
| $PV_{0.05-0.5\,\mu m}$, cc/g | 0.219 | 0.205 | 0.189 | 0.200 | 0.250 | 0.148 |
| $PV_{0.05-100\,\mu m}$, cc/g | 0.233 | 0.227 | 0.476 | 0.438 | 0.363 | 0.237 |
| $PV_{0.05-1\,\mu m}/PV_{0.05-100\,\mu m}$, % | 94.6% | 90.9% | 89.7% | 92.8% | 91.2% | 90.6% |
| $PV_{0.05-0.5\,\mu m}/PV_{0.05-100\,\mu m}$, "M/M" | 94.0% | 90.3% | 39.7% | 45.7% | 68.9% | 62.5% |
| $PV_{0.1-100\,\mu m}/PV_{<0.1\,\mu m}$, "M/m" | 48.3% | 42.9% | 149% | 212% | 116% | 158% |
| $PV_{0.05-1\,\mu m}$, cc/cc-wall | 0.287 | 0.211 | 0.318 | 0.396 | 0.297 | 0.332 |
| $PV_{1-100\,\mu m}$, cc/cc-wall | 0.016 | 0.022 | 0.037 | 0.031 | 0.029 | 0.034 |

TABLE 11 dP, IAC, PV - PPAV In-Series Examples.

| | Example | | | | | | |
|---|---|---|---|---|---|---|---|
| | 9 | 12a | 12b | 20a | 20b | 21a | 21b |
| | \multicolumn{7}{c}{Comparative (C)/Inventive (I)} | | | | | | |
| | I | C | C | I | I | C | C |
| Caliper length (mm); L | 142.6 | 100.1 | 99.4 | 99.0 | 101.0 | 100.0 | 99.9 |
| Caliper diameter (mm); $D_{o,\,c}$ | 42.3 | 29.5 | 29.6 | 27.8 | 29.2 | 30.0 | 29.8 |
| Wall thickness (mm) avg; $t_{w,\,avg}$ | 0.291 | 0.349 | 0.319 | 0.272 | 0.280 | 0.297 | 0.311 |
| Average channel hydraulic diameter (mm); $4\Sigma A_c/\Sigma P_c$ | 0.673 | 1.269 | 1.306 | 0.632 | 0.662 | 1.259 | 1.292 |
| Hydraulic diameter cell pitch (mm); $CP_{Dh}$ | 0.963 | 1.618 | 1.625 | 0.904 | 0.941 | 1.557 | 1.603 |
| Plurality width cell pitch(mm); $CP_{tc} = t_{c,\,avg} + t_{w,\,avg}$ | 0.978 | 1.690 | 1.677 | 0.918 | 0.957 | 1.635 | 1.680 |
| Cell density (cpsi); $n_c/(\pi D_o^2/4)$ | 669 | 219 | 204 | 756 | 716 | 238 | 229 |
| dP at 40 lpm, kPa | 0.249 | 0.140 | 0.000 | 0.000 | 0.000 | 0.000 | 0.000 |
| dP at 46 cm/s, kPa | 0.247 | 0.112 | 0.000 | 0.000 | 0.000 | 0.000 | 0.000 |
| IAC, g/L | 10.4 | 20.8 | 7.8 | 10.4 | 10.4 | 19.0 | 9.4 |
| 5% butane capacity (g/g); m5% | 0.040 | 0.069 | 0.023 | 0.048 | 0.036 | 0.064 | 0.022 |
| 50% butane capacity (g/g); m50% | 0.065 | 0.115 | 0.038 | 0.079 | 0.060 | 0.111 | 0.040 |
| Ratio m0.5%/m50% | 0.338 | 0.336 | 0.312 | 0.358 | 0.329 | 0.317 | 0.278 |
| Ratio m5%/m50% | 0.610 | 0.595 | 0.586 | 0.605 | 0.599 | 0.578 | 0.561 |
| Particle density <100 μm, g/cc | 0.972 | 1.051 | 1.317 | 1.259 | 0.831 | 0.961 | 1.290 |
| BET Area, m²/g | 250 | 415 | 153 | 295 | 220 | 409 | 136 |
| $PV_{<1.8\,nm}$, cc/g | 0.031 | 0.057 | 0.016 | 0.043 | 0.027 | 0.043 | 0.010 |
| $PV_{1.8-5\,nm}$, cc/g | 0.108 | 0.159 | 0.063 | 0.119 | 0.095 | 0.183 | 0.060 |
| $PV_{5-50\,nm}$, cc/g | 0.048 | 0.121 | 0.069 | 0.054 | 0.044 | 0.100 | 0.070 |
| $PV_{<0.1\,\mu m}$, cc/g | 0.191 | 0.347 | 0.168 | 0.220 | 0.170 | 0.334 | 0.157 |
| $PV_{0.1-100\,\mu m}$, cc/g | 0.406 | 0.194 | 0.128 | 0.177 | 0.431 | 0.224 | 0.145 |
| $PV_{0.05-1\,\mu m}$, cc/g | 0.407 | 0.210 | 0.197 | 0.177 | 0.421 | 0.223 | 0.201 |
| $PV_{1-100\,\mu m}$, cc/g | 0.032 | 0.015 | 0.011 | 0.011 | 0.044 | 0.027 | 0.017 |
| $PV_{0.05-0.5\,\mu m}$, cc/g | 0.200 | 0.208 | 0.197 | 0.175 | 0.211 | 0.219 | 0.200 |

TABLE 11-continued dP, IAC, PV - PPAV In-Series Examples.

|  | Example | | | | | | |
|---|---|---|---|---|---|---|---|
|  | 9 | 12a | 12b | 20a | 20b | 21a | 21b |
|  | | | Comparative (C)/Inventive (I) | | | | |
|  | I | C | C | I | I | C | C |
| $PV_{0.05-100\ \mu m}$, cc/g | 0.438 | 0.225 | 0.208 | 0.188 | 0.465 | 0.250 | 0.219 |
| $PV\%_{0.05-1\ \mu m/0.05-100\ \mu m}$ | 92.8% | 93.2% | 94.8% | 94.2% | 90.6% | 89.2% | 92.1% |
| $PV\%_{0.05-0.5\ \mu m/0.05-100\ \mu m}$, "M/M" | 45.7% | 92.7% | 94.9% | 92.8% | 45.4% | 87.8% | 91.4% |
| $PV\%_{0.1-100\ \mu m/<0.1\ \mu m}$, "M/m" | 212% | 55.8% | 76.3% | 80.5% | 254% | 67.0% | 92.1% |
| $PV_{0.05-1\ \mu m}$, cc/cc-wall | 0.396 | 0.221 | 0.259 | 0.223 | 0.350 | 0.214 | 0.259 |
| $PV_{1-100\ \mu m}$, cc/cc-wall | 0.031 | 0.016 | 0.014 | 0.014 | 0.037 | 0.026 | 0.022 |

Figure 25:
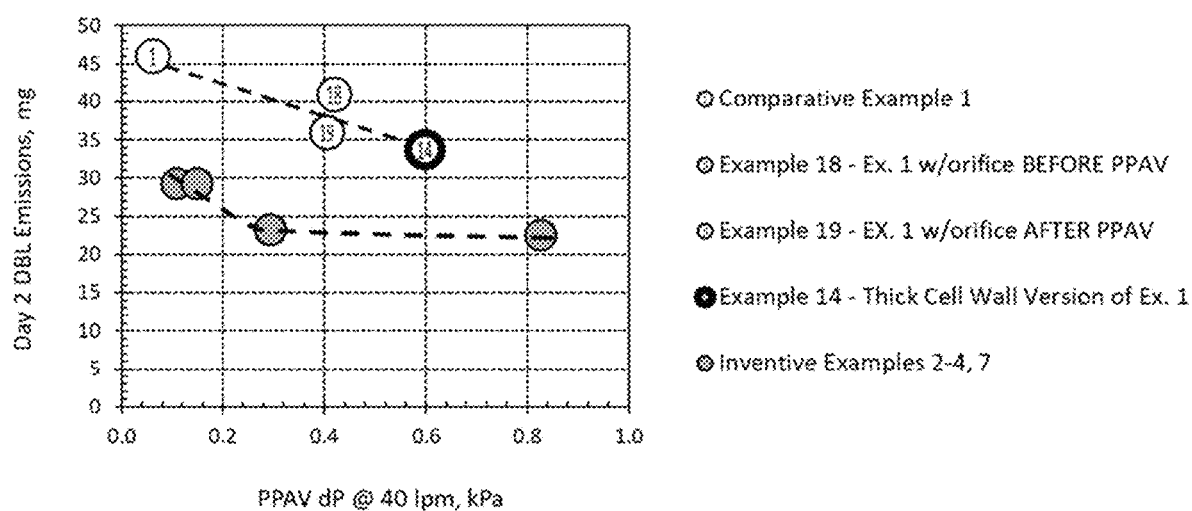
FIG. 25 are test data for 35 mm diameter×150 mm long comparative (open circles) and inventive examples (filled circles) for day 2 DBL emissions as a function of the PPAV flow restriction at 40 lpm (kPa).
Figure 26:
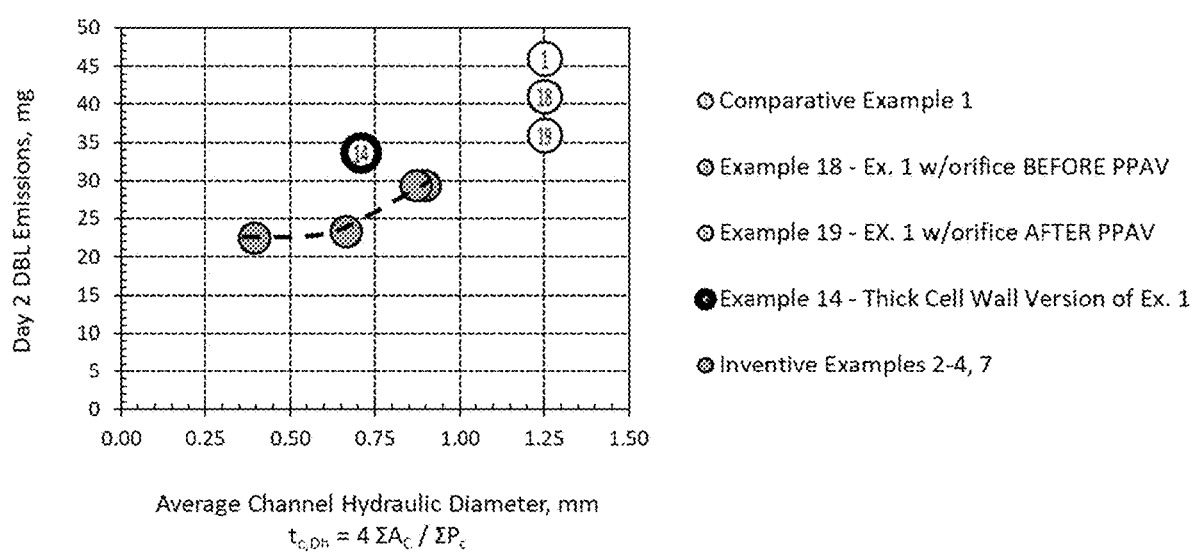
FIG. 26 are test data for 35 mm diameter×150 mm long comparative (open circles) and inventive examples (filled circles) for day 2 DBL emissions as a function of the PPAV average channel hydraulic diameter ($t_{c,Dh}$).

In seeking a cause for the lower emissions by the inventive examples, the effect of flow restriction by the PPAV part in the auxiliary canister was considered and was found to only partially account for the full improvement. In one set of experiments, flow restriction of Example 1 was increased by placing an orifice plate "before" the Example 1 PPAV part (location "B" in FIG. 5) as comparative Example 18, or by placing an orifice plate "after" the Example 1 PPAV part (location "A" in FIG. 5) as comparative Example 19. Examples 18 and 19 were tested in the same way as Example 1 in Table 7 and the DBL emissions were measured. As shown in FIG. 25, there was some benefit of the added flow restriction for the orifice plates present in Examples 18 and 19 compared with the orifice plate-free Example 1, but the high cell density, low cell pitch inventive Examples 2-4 and 7 of otherwise equivalent size and adsorptive properties as Example 1 exhibited consistently lower emissions, meaning their benefit exceeds any small benefit that might be attributable to flow restriction effects. In another experiment of the flow restriction effect, a PPAV of similar 1.6 mm cell pitch size as Example 1 was prepared (Example 14), but with smaller parallel passage channels and thicker cell walls by use of an alternative extrusion die and with modifications in the formulation so that the net volumetric adsorptive properties would be about the same as Example 1 and the other examples of Table 2. The result of the thick wall extrusion was an example with high flow restriction at the 1.6 mm cell pitch of the comparative examples, but with the channel width of the size of inventive examples. As shown in FIG. 25, the bleed emissions of the thick cell wall Example 14 follow the trend of somewhat lower emissions from Examples 18 and 19, thereby allowing attribution of the lower emissions to its higher flow restriction properties (and notably with the lower emissions of Example 14 over Example 1 despite its near fourfold greater cell wall thickness). In addition, the bleed emissions of Example 14, despite its narrow channel width, did not have as low emissions as the inventive examples of similar channel width but of low pitch, reinforcing the special significance of low cell pitch and high cell density on emissions performance by the inventive examples (see FIG. 26).

Figure 27:
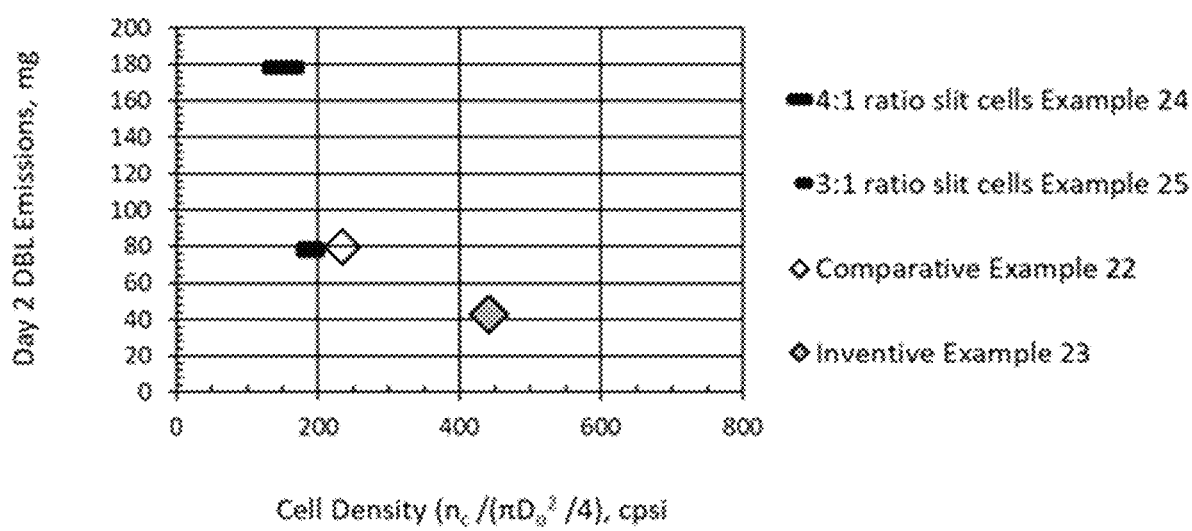
FIG. 27 are test data for 29 mm diameter×150 mm long comparative (open diamond) and inventive examples (filled diamond), and PPAV with slit-shaped cells (filled rectangles) for day 2 DBL emissions as a function of the PPAV cell density (cells per square inch; cpsi).
Figure 28:
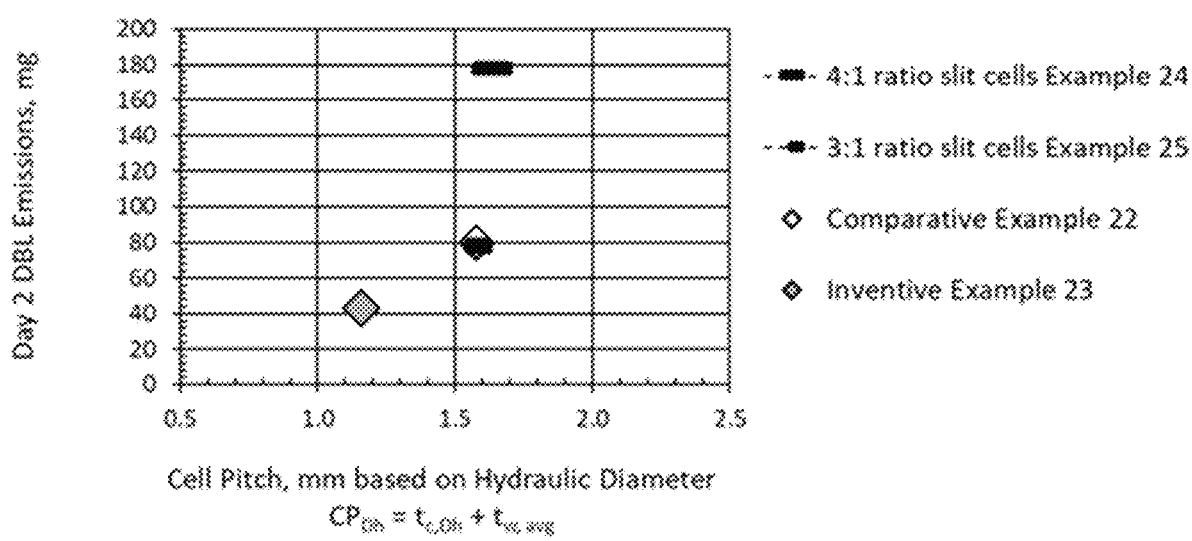
FIG. 28 are test data for 29 mm diameter×150 mm long comparative (open diamond) and inventive examples (filled diamond), and PPAV with slit-shaped cells (filled rectangles) for day 2 DBL emissions as a function of the PPAV cell pitch based on hydraulic diameter ($CP_{Dh}$).
Figure 29:
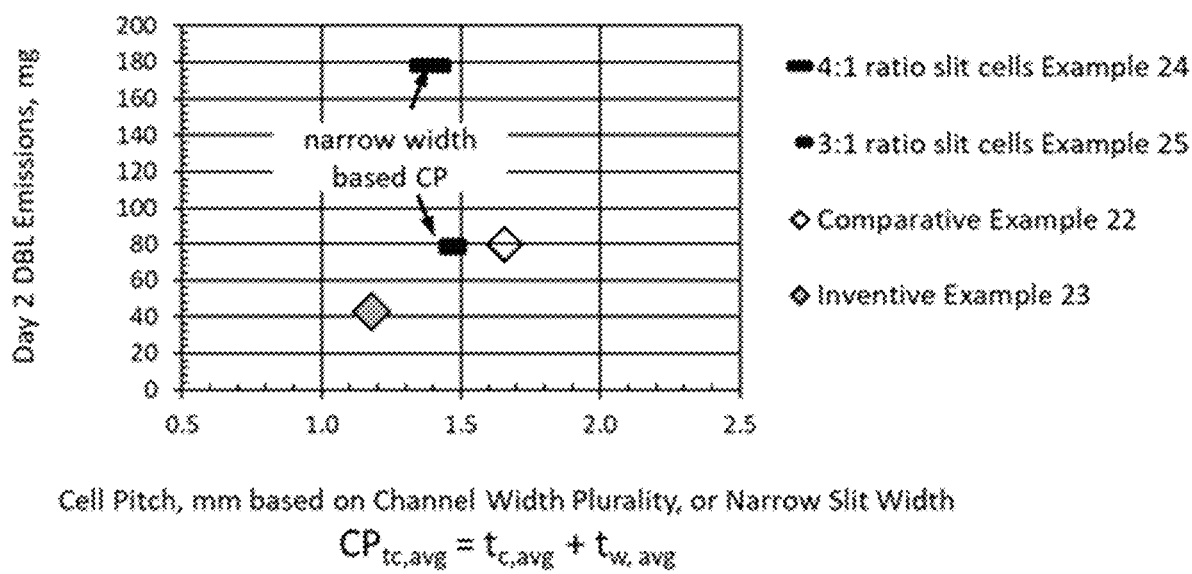
FIG. 29 are test data for 29 mm diameter×150 mm long comparative (open diamond) and inventive examples (filled diamond), and PPAV with slit-shaped cells (filled rectangles) for day 2 DBL emissions as a function of the PPAV cell pitch based on channel width plurality ($CP_{tc,avg}$), or based on narrow channel width-based cell pitch for slit-shaped cell examples.

Additional tests revealed the unexpected significance of low pitch and small hydraulic diameter of the channels for low emissions over PPAV parts of only a partial plurality of low cell pitch and only a partial plurality of narrow channel width as provided by channels of high aspect ratio shape, e.g., slit-shaped channels. A special die was used for preparing Examples 24 and 25 with 4:1 and 3:1 ratio slit-shaped channels, respectively (rectangular shaped cells with long sides four times or three times the length of short sides), where the short channel sides were of about 1 mm length (see Tables 4 and 9). These slit-shaped channel parts were in the form of 29 mm diameter by 150 mm length monoliths with a BWC of about 4.3 g/dL. (Note: the wall thickness value used to determine hydraulic diameter cell pitch was the average of the x and y wall thickness.) While the overall cell densities of 166-179 cpsi and hydraulic diameter-based cell pitch and channel width properties were similar to other comparative examples, the cell pitch perpendicular to the short direction, at 1.2-1.5 mm, was much shorter than comparative examples. Similar size and BWC parts with square shaped channel of 234 and 441 cpsi cell densities (Examples 22 and 23, respectively) were also prepared and tested in canister systems (FIG. 27). The canister system data show unexpectedly high emissions by the slit-shaped channel Examples 24 and 25 compared with both the square-shaped channel Examples 22 and 23, with the emissions trends for the slit-shaped Examples 24 and 25 following their average width-based cell pitch or hydraulic diameter cell pitch properties as opposed to, and despite, their narrow channel properties (see FIGS. 28 and 29).

Figure 30:
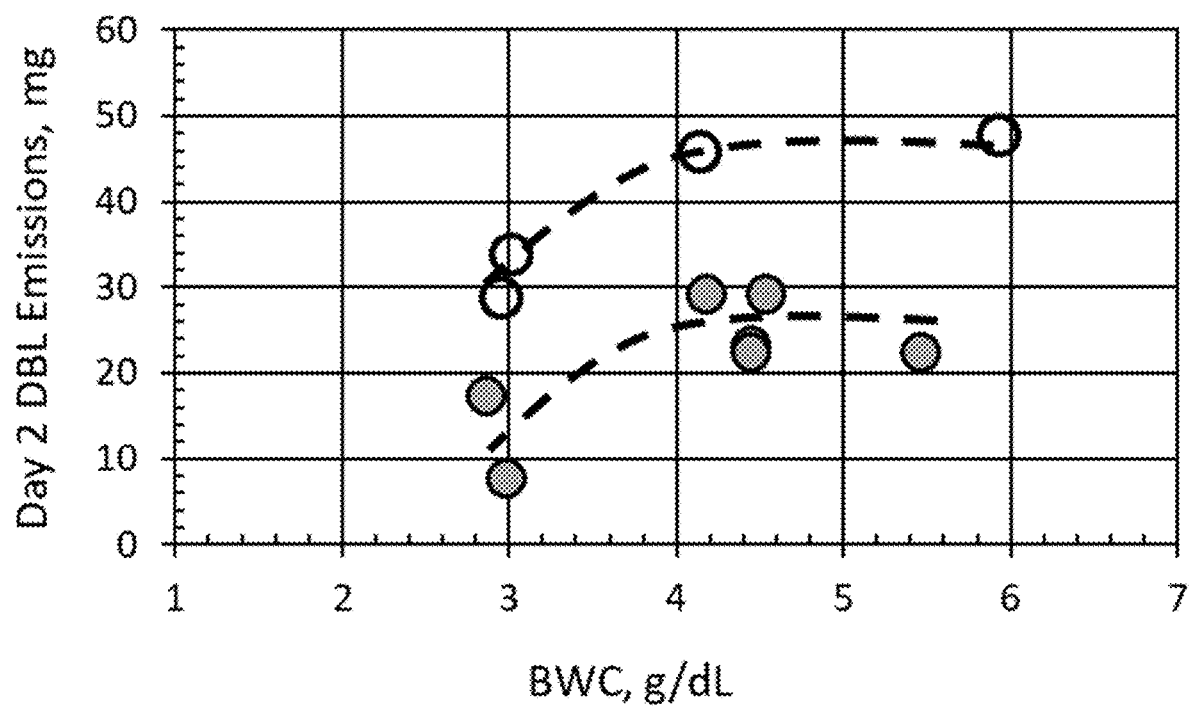
FIG. 30 are test data for comparative (open circles) and inventive examples (filled circles) for day 2 DBL emissions as a function of PPAV BWC (g/dL).
Figure 31:
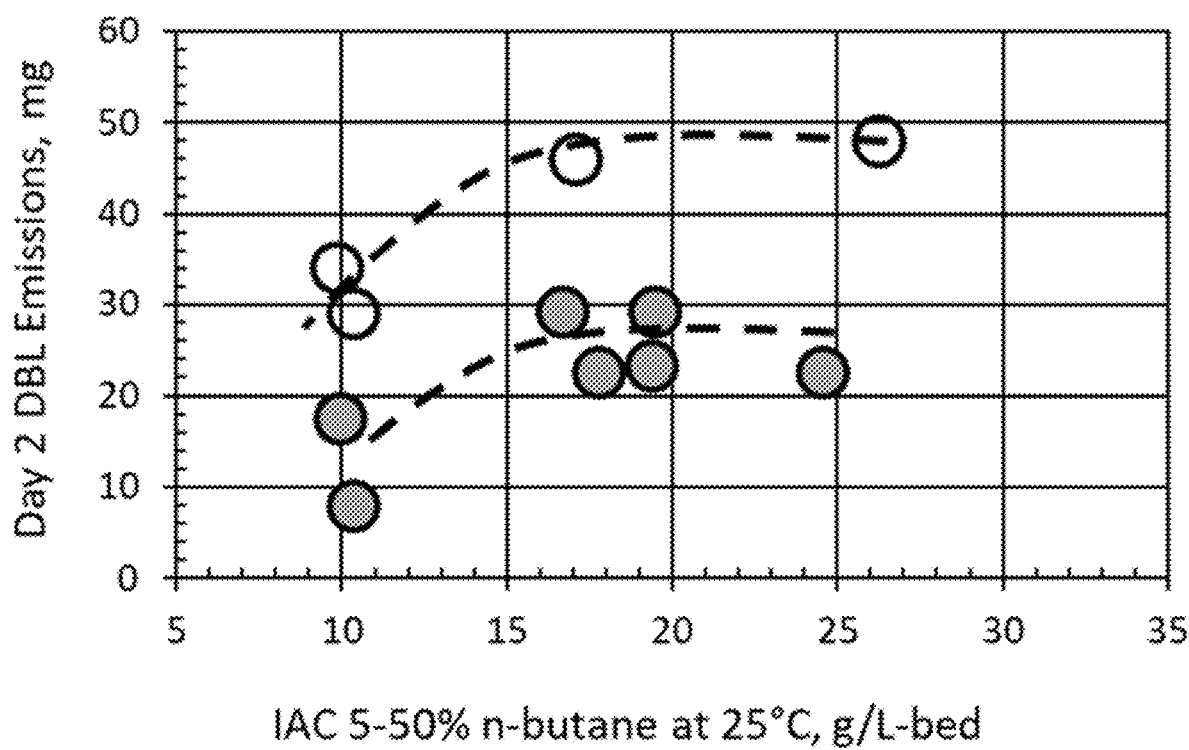
FIG. 31 are test data for comparative (open circles) and inventive examples (filled circles) for day 2 DBL emissions as a function of PPAV IAC (g/L-bed).

For examples with conventional 1.6 mm cell pitch compared with examples of lower cell pitch but with otherwise equivalent external size and adsorptive properties (BWC, IAC), there is a consistent trend of lower emissions in the same Type A canister system by the low pitch examples across a wide range of adsorptive properties. FIGS. 30 and 31 show the lower emissions across a wide range of BWC and IAC, respectively. The comparative example data point at 1.6 mm cell in these two figures have otherwise equivalent examples at lower cell pitch, include the following (Examples of Tables 2 and 3). Comparative Example 8 and inventive Example 9 were prepared with similar dimensions of about 42 mm diameter and 142 mm length, similar cell wall thickness of about 0.3 mm, similar BWC of about 3 g/dL, and similar IAC of about 10 g/L; however, owing to the lower cell pitch (about 1 mm based on plurality channel width or average channel hydraulic diameter, compared with about 1.6-1.7 mm) and smaller channel opening (about 0.7 mm based on plurality channel width or average channel hydraulic diameter, compared with about 1.3-1.4 mm), Example 9 as the adsorbent volume fill in the auxiliary canister in a type A canister had 8 mg DBL day 2 emissions, which was 73% lower emissions compared with the emission of about 29 mg with Example 8 as the auxiliary canister adsorbent volume fill. Comparative Example 10 and inventive Example 11 were prepared with highly microporous coconut-based carbon powder instead of mesoporous wood-based carbon powder, with the resulting PPAV honeycomb having similar dimensions of about 35 mm diameter and 150 mm length, similar BWC of about 3 g/dL, and similar IAC of about 10 g/L; however, owing to the lower pitch (about 0.9 mm for plurality channel width or average channel hydraulic diameter, compared with about 1.6-1.7 mm) and smaller channel pitch (about 0.6 mm based on plurality channel width or average channel hydraulic diameter, compared with about 1.3-1.4 mm), Example 11 as the adsorbent volume fill in the auxiliary canister in a type A canister system had about 17 mg DBL day 2 emissions, which was about half the 34 mg emissions produced with Example 10 as the auxiliary canister adsorbent volume fill. Comparative Examples 1 and 6 versus inventive Examples 2-5 and 7 were of 35 mm x 150 mm length, with 4.2-5.9 g/dL BWC and 17-26 g/L IAC (Tables 2 and 3) and have similar cell pitch, channel width, and emissions comparisons and contrasts as the Examples 8-11, above.

The embodiments of lower cell pitch and smaller channel width were leveraged in examples. Unexpectedly, the PPAVs as described herein demonstrated greater canister simplicity, lower flow restriction, and lower DBL emissions. For example, comparative examples 12a and 12b were obtained as commercially available PPAV honeycomb NUCHAR® HCA and HCA-LBE parts of approximately 29 mm diameter and 100 mm length with conventional 1.6-1.7 mm cell pitch and 1.2-1.3 mm channel width, and were tested in combination as in-series pair within a type B canister system (example 12a+bB) in order to attain <20 mg DBL day 2 emissions (12.4 mg). Canister systems are configured in some vehicle platforms with multiple PPAV honeycombs in-series in this way for meeting emissions requirements, with a one part having a BWC of about 4-4.5 g/dL in-series with another part having a BWC of <3 g/dL located closest to the system vent, as especially needed when only low volumes of purge are available with advanced engine technologies, e.g., hybrid vehicles, GDI engines, start/stop and turbo-assisted engines. By comparison, in the auxiliary canister of the type B canister system, inventive Example 9B with a single PPAV honeycomb, of much smaller pitch of about 1 mm and smaller channel width and hydraulic diameter of less than 0.7 mm than either Example 12a or 12b, had 9 mg emissions, 24% lower than the paired conventional PPAV honeycomb Example 12a+bB. Significantly, while both examples 9B and 12a+bB had DBL day 2 emissions of <20 mg, the example 9B enabled a canister system B to have substantially lower emissions with a single PPAV honeycomb in place for added simplicity of design, and to additionally have a system load flow restriction at 40 slpm (1.18 kPa) that was 25% less than that of example 12a+bB and a system purge flow restriction at 40 slpm (1.90 kPa) that was 22% less than that of example 12a+bB, allowing more flexibility in the canister system design choices that affect flow restriction (e.g., screens, filters, valves, conduits, etc).

Embodiments were also tested in canister systems challenged with a wide range of purge volumes, demonstrating the consistent benefit over comparative examples from low cell pitch and low channel width as the amount of purge was reduced. FIGS. 32 and 33 show the consistently lower day 2 DBL emissions by inventive Example 4 over comparative Example 1 when placed in the 2.1 L LEV II Type A canister system as the PPAV part and tested over a range of 210-310 L and 94-138 BV (also, see Table 12).

TABLE 12

Effect of Purge - LEV II System.

| | Example: | | | |
|---|---|---|---|---|
| | 1 | | 4 | |
| | Comparative (C)/Inventive (I): | | | |
| | Comparative | | Inventive | |
| | Canister System Type: | | | |
| | A | | A | |
| Purge, Liters | BV | Day 2 Emissions, mg | BV | Day 2 Emissions, mg |
| 310 | 138.3 | 13.9 | 138.2 | 7.8 |
| 256 | 114.2 | 20.5 | 114.1 | 10.2 |
| 210 | 93.7 | 46.0 | 93.6 | 23.1 |

Figure 34:
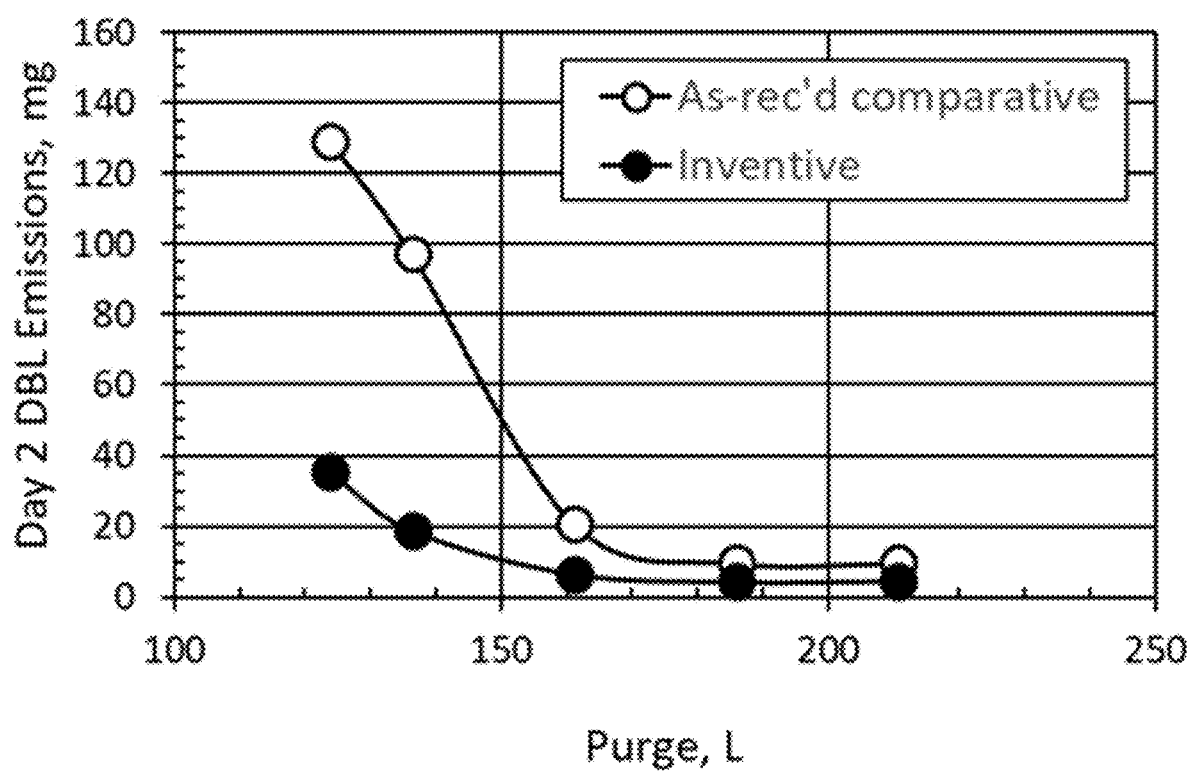
FIG. 34 are test data for comparative (open circles) and inventive examples (filled circles) for day 2 DBL emissions as a function of liters of purge volume (L).
Figure 35:
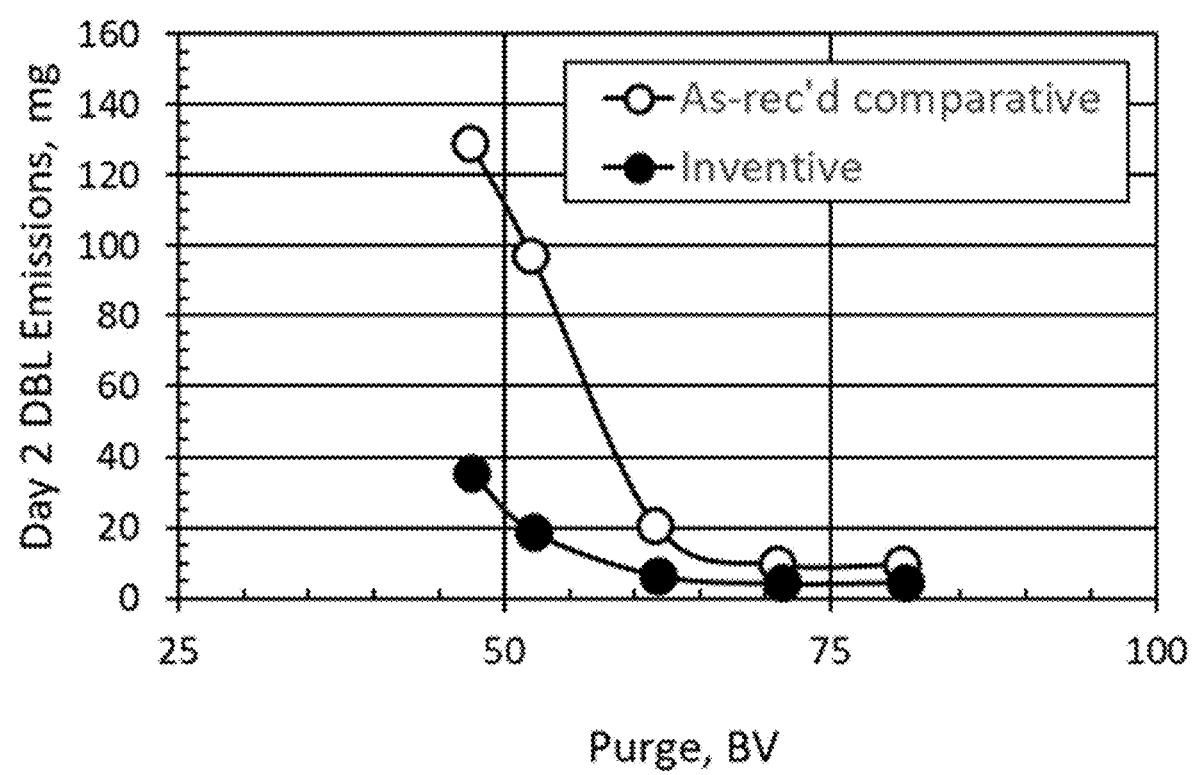
FIG. 35 are test data for comparative (open circles) and inventive examples (filled circles) for day 2 DBL emissions as a function of bed volumes of purge (BV).

Another set of experiments on the effects of purge volume on DBL emissions performance were conducted with a commercial LEV III canister system with the adsorbent volumes configured as shown in FIG. 8 as the Type C canister system where there are two PPAV honeycomb parts in-series on the vent-side (volumes 502 and 504 containing comparative Examples 21a and 21b). In these tests, the canister system was tested as-received, and then retested with the volumes 502 and 504 exchanged with inventive example PPAV honeycombs (Examples 20a and 20b) of equivalent external dimensions and adsorptive properties (BWC and IAC) as each of the two original as-received parts. As shown in FIGS. 34 and 35 and Table 13, the results were dramatic for this canister system. For example, there were only small differences between the as-received comparative example emissions at higher purge levels of 186-211L and 71-81B V, with the few mg lower emissions by the inventive Example 20a+bC being 44-47% of the comparative Example 21a+bC results. However, the differences were progressively larger at lower purge, to as low as 19% of the comparative results at 52 BV purge, with about 18 mg of emissions for inventive Example 20a+bC vs. 97 mg for comparative Example2 1 a+bC. That low level of emissions is significant, as the BETP emissions target for LEV III is <20 mg for the canister system and prior art has noted the extreme difficulties in meeting LEV III evaporative emissions targets when less than only 50-80 BV of purge, and especially towards <50 BV purge, is available (see US 2011/0168025 A1, U.S. Pat. No. 9,657,691, JSAE 20077051/SAE 2007-01-1929, and Tank tech 2015, Trends for Fuel Subsystems (Part 1), "Low Bleed Solutions Meeting LEV III/Tier 3 Evaporative Emission Standards"), which are incorporated herein by reference in their entirety). In those cases of extremely low purge, the common wisdom has been that it would be necessary to resort to more extreme means for meeting emissions, including the addition of a heating or heat exchanger function to the canister system, or even employing a sealed fuel tank system to prevent diurnal losses. However, it is apparent from these test data that the use of PPAV adsorbent volumes with low cell pitch and small channel widths as described herein surprisingly and unexpectedly can meet low emissions targets without the need of heaters or sealed tanks.

TABLE 13

Effect of Purge - LEV III System - CR-V.

| | Example: | | | |
|---|---|---|---|---|
| | 21a + bC | | 20a + bC | |
| | Comparative (C)/Inventive (I): | | | |
| | Comparative | | Inventive | |
| | Canister System Type: | | | |
| | C | | C | |
| Purge, Liters | BV | Day 2 Emissions, mg | BV | Day 2 Emissions, mg |
| 210.8 | 80.4 | 9.4 | 80.8 | 4.4 |
| 186.0 | 71.0 | 9.4 | 71.3 | 4.1 |
| 161.2 | 61.5 | 20.4 | 61.8 | 6.3 |
| 136.4 | 52.1 | 97.2 | 52.3 | 18.5 |
| 124.0 | 47.3 | 129.2 | 47.5 | 35.1 |

While it was taught in the art that a higher cell density (higher number cells per unit of cross-sectional area, or lower distances of cell pitch) of a PPAV monolith will lead to a sharpened mass transfer zone (MTZ) and to a more efficiently saturating adsorbent volume under dynamic flow adsorption, there was observed a surprising lack of any such MTZ or efficiency advantage for the tested cell densities, or cell pitch when applying published methods for measuring mass transfer zones, for either saturation of virgin parts or saturation of parts after an adsorption-purge pretreatment protocol. Surprisingly, it was observed that the described range of cell densities and cell pitch provided a benefit to DBL emissions for inventive examples, including a lack of any such MTZ or efficiency effect for the PPAV tested with cell densities, or cell pitches, outside and into the inventive range described herein.

Figure 36:
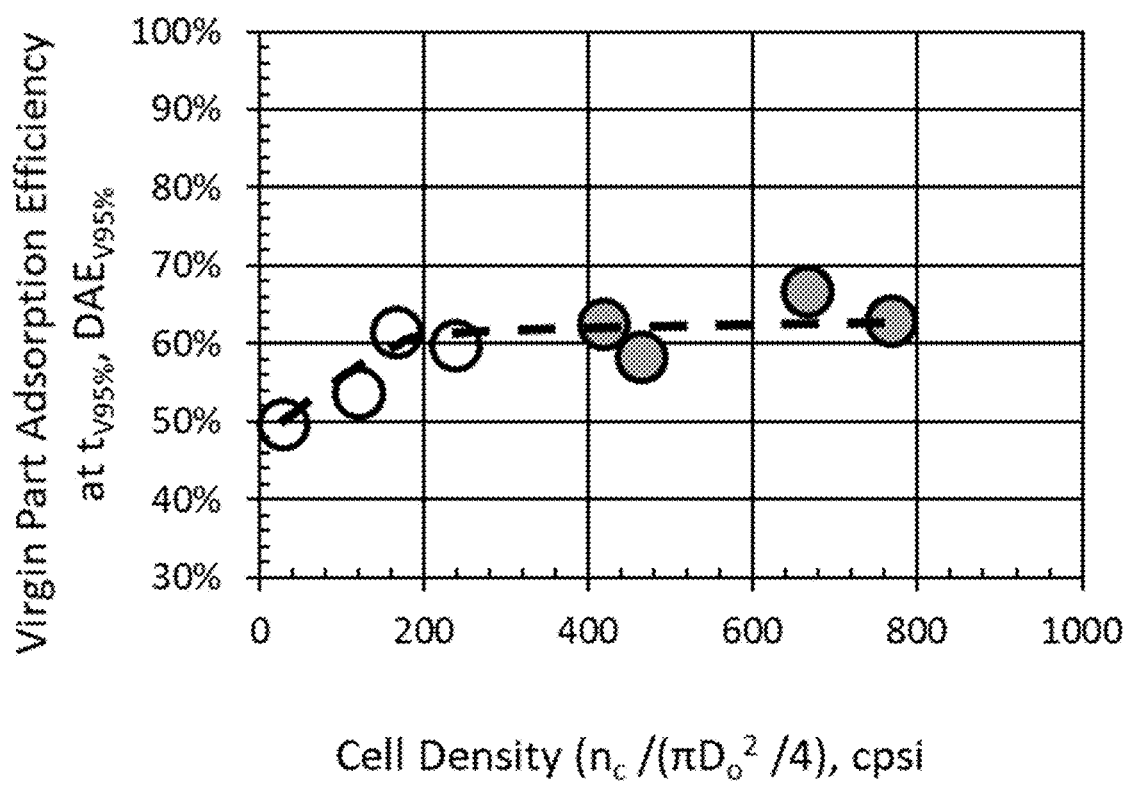
FIG. 36 are test data for comparative (open circles) and inventive examples (filled circles) for virgin part adsorption efficiency ($DAE_{V95\%}$) as a function of cell density (cells per square inch; cpsi).
Figure 37:
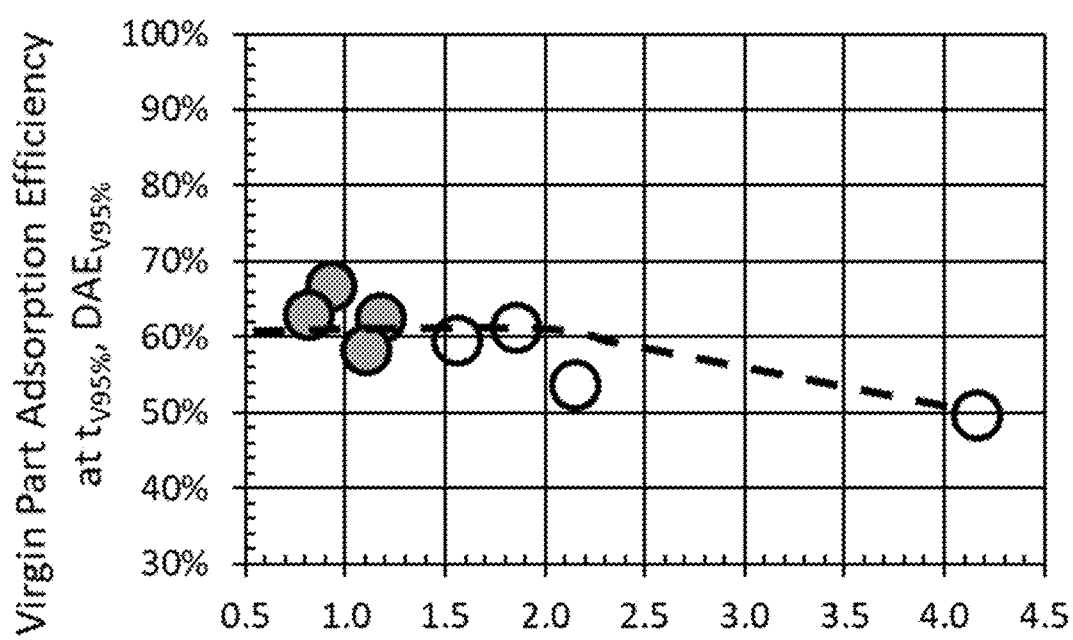
FIG. 37 are test data for comparative (open circles) and inventive examples (filled circles) for virgin part adsorption efficiency ($DAE_{V95\%}$) as a function of cell pitch based on hydraulic diameter ($CP_{Dh}$).

As shown by Rezaei and Webley (2009) for carbon dioxide adsorption with virgin monolith parts, the expected effect is a symmetrical pivoted sharpening of the breakthrough curve of the adsorbate with increased cell density, with less mass of adsorbate in the effluent stream before saturation. However, for n-butane adsorption, the cell density effect appears to vanish at about 200 cpsi. Valdes-Solis, et al. (2004) showed similar widths of the 5%-95% breakthrough profiles in comparing 200 and 400 cpsi cell densities for equivalent 150 mm total lengths of sectioned monoliths. Dynamic adsorption tests with comparative Examples 1 and 15-17 and inventive Examples 2-4 and 7 in a virgin state display a sharpening of the MTZ breakthrough as cell density was increased from 30 cpsi, a hydraulic diameter-based cell pitch of about 4 mm, (Example 15), however, the MTZ sharpening progressively diminished with increased cell density and decreased cell pitch. A significant aspect of these examples from this comparison is that the examples are of about the same external dimensions, BWC, and carbon ingredient properties and differ only the cell structure, i.e., channel size and pitch. The dynamic adsorption efficiency to 95% saturation ($DAE_{V95\%}$) was about 50% for Example 15, and then reached an efficiency plateau of about 60-70% by a cell density of about 200 cpsi (FIG. 36), and a cell pitch of about 2 mm (FIG. 37). Therefore, any benefit of the examples in canister system emissions performance by the inventive examples was not predictable from the dynamic adsorption MTZ and efficiency behavior of the virgin parts (See Tables 14-17).

TABLE 14

Dynamic Adsorption Test - 35 × 150 4.1-4.7 BWC.

| | Example | | | | | | | |
|---|---|---|---|---|---|---|---|---|
| | 15 | 16 | 17 | 1 | 2 | 3 | 4 | 7 |
| | Comparative (C)/Inventive (I) | | | | | | | |
| | C | C | C | C | I | I | I | I |
| Caliper length (mm); L | 150.2 | 151.3 | 150.6 | 150.2 | 151.2 | 150.9 | 150.5 | 151.2 |
| Caliper diameter (mm); $D_{o,c}$ | 35.0 | 35.3 | 35.3 | 34.7 | 34.9 | 34.4 | 34.8 | 35.0 |
| Wall thickness (mm) avg; $t_{w,avg}$ | 0.848 | 0.409 | 0.628 | 0.309 | 0.276 | 0.233 | 0.267 | 0.421 |
| Hydraulic diameter Cell pitch (mm); $CP_{Dh}$ | 4.537 | 2.201 | 1.902 | 1.592 | 1.190 | 1.118 | 0.936 | 0.836 |
| Cell density (cpsi); $n_c/(\pi D_o^2/4)$ | 30 | 123 | 168 | 239 | 419 | 465 | 667 | 770 |
| BWC, g/dL | 4.31 | 4.29 | 4.70 | 4.13 | 4.54 | 4.18 | 4.45 | 4.45 |
| IAC, g/L | 18.5 | 18.9 | 20.3 | 17.1 | 19.5 | 16.7 | 19.4 | 17.8 |
| Virgin Part - Initial saturation adsorption step: | | | | | | | | |
| Time at 5% BT (min); $t_{V5\%}$ | 9.0 | 19.5 | 25.2 | 19.7 | 24.8 | 23.9 | 29.7 | 27.4 |
| Total C4 adsorbed at $t_{V5\%}$ (g); $m_{ads, V5\%}$ | 1.41 | 3.08 | 3.98 | 3.08 | 3.89 | 3.76 | 4.68 | 4.33 |
| Total effluent C4 at $t_{V5\%}$ (g); $m_{efl, V5\%}$ | 0.005 | 0.010 | 0.011 | 0.039 | 0.033 | 0.032 | 0.033 | 0.012 |
| Efficiency at $t_{V5\%}$; $DAE_{V5\%}$ | 99.6% | 99.7% | 99.7% | 98.7% | 99.2% | 99.2% | 99.3% | 99.7% |
| Bleedthrough contribution between $t_{V5\%}$ & $t_{V95\%}$ (g); $m_{efl, VB5-95\%}$ | 0.003 | 0.003 | 0.002 | 0.002 | 0.002 | 0.002 | 0.001 | 0.002 |
| Time for 95% BT beyond initial bleedthrough (min); $t_{V95\%}$ | 71.4 | 72.5 | 64.2 | 61.3 | 62.6 | 62.4 | 57.4 | 66.2 |
| MTZ effluent between $t_{V5\%}$ & $t_{V95\%}$ (g); $m_{efl, VM5-95\%}$ | 5.52 | 5.33 | 3.92 | 3.89 | 3.70 | 4.11 | 2.99 | 3.89 |
| Total effluent at $t_{V95\%}$ (g); $m_{efl, V95\%}$ | 5.53 | 5.34 | 3.94 | 3.93 | 3.73 | 4.14 | 3.03 | 3.90 |
| Total adsorbed at $t_{V95\%}$ (g); $m_{ads, V95\%}$ | 5.77 | 6.14 | 6.22 | 5.78 | 6.19 | 5.74 | 6.07 | 6.58 |
| Total butane delivered at $t_{V95\%}$ (g); $m_{del, V95\%}$ | 11.30 | 11.49 | 10.16 | 9.71 | 9.92 | 9.89 | 9.09 | 10.48 |
| Efficiency at $t_{V95\%}$; $DAE_{V95\%}$ | 51% | 53% | 61% | 60% | 62% | 58% | 67% | 63% |
| Cycled Part - After initial saturation adsorption and purge steps: | | | | | | | | |
| Time for 5% BT beyond bleedthrough (min); $t_{C5\%}$ | 47 | 191 | 145 | 229 | 333 | 264 | 256 | 277 |
| Total butane adsorbed at $t_{C5\%}$ (g); $m_{ads, C5\%}$ | 0.064 | 0.284 | 0.215 | 0.341 | 0.514 | 0.412 | 0.390 | 0.432 |
| Bleedthrough at $t_{C5\%}$ (g); $m_{efl, C5\%}$ | 0.014 | 0.035 | 0.027 | 0.041 | 0.040 | 0.028 | 0.037 | 0.030 |

TABLE 14-continued

Dynamic Adsorption Test - 35 × 150 4.1-4.7 BWC.

| | Example | | | | | | | |
|---|---|---|---|---|---|---|---|---|
| | 15 | 16 | 17 | 1 | 2 | 3 | 4 | 7 |
| | \multicolumn{8}{c}{Comparative (C)/Inventive (I)} |
| | C | C | C | C | I | I | I | I |
| Efficiency at $t_{C5\%}$; $DAE_{C5\%}$ | 82% | 89% | 89% | 89% | 93% | 94% | 91% | 94% |
| Bleedthrough contribution between $t_{C5\%}$ & $t_{C95\%}$ (g); $m_{efl, CB5-95\%}$ | 0.037 | 0.037 | 0.029 | 0.029 | 0.015 | 0.029 | 0.015 | 0.028 |
| MTZ effluent between $t_{C5\%}$ & $t_{C95\%}$ (g); $m_{efl, CM5-95\%}$ | 0.285 | 0.547 | 0.322 | 0.341 | 0.318 | 0.415 | 0.283 | 0.427 |
| Total effluent at $t_{C95\%}$ (g); $m_{efl, C95\%}$ | 0.337 | 0.621 | 0.378 | 0.411 | 0.373 | 0.473 | 0.335 | 0.484 |
| Time for 95% BT beyond bleedthrough (min); $t_{C95\%}$ | 375 | 734 | 553 | 630 | 676 | 674 | 608 | 666 |
| Total butane adsorbed at $t_{C95\%}$; (g); $m_{ads, C95\%}$ | 0.289 | 0.603 | 0.544 | 0.639 | 0.753 | 0.651 | 0.679 | 0.626 |
| Total butane delivered at $t_{C95\%}$ (g) | 0.626 | 1.223 | 0.922 | 1.050 | 1.126 | 1.124 | 1.013 | 1.110 |
| Efficiency at $t_{C95\%}$; $DAE_{C95\%}$ | 46% | 49% | 59% | 61% | 67% | 58% | 67% | 56% |
| Time for 25% influent in effluent (min); $t_{C0.125\,vol\,\%}$ | 68 | 283 | 282 | 330 | 422 | 337 | 382 | 336 |
| Bleedthrough contribution between $t_{C5\%}$ & $t_{C0.125\,vol\,\%}$ (g); $m_{efl, CB5\%-0.125\,vol\,\%}$ | 0.002 | 0.007 | 0.010 | 0.007 | 0.004 | 0.007 | 0.005 | 0.006 |
| MTZ effluent between $t_{C5\%}$ & $t_{C0.125\,vol\,\%}$ (g); $m_{efl, CM5\%-0.125\,vol\,\%}$ | 0.006 | 0.021 | 0.030 | 0.023 | 0.018 | 0.032 | 0.025 | 0.029 |
| Total effluent at $t_{C0.125\,vol\,\%}$ (g); $m_{efl, C0.125\,vol\,\%}$ | 0.022 | 0.063 | 0.067 | 0.071 | 0.063 | 0.067 | 0.067 | 0.065 |
| Total butane adsorbed at $t_{C0.125\,vol\,\%}$; (g); $m_{ads, C0.125\,vol\,\%}$ | 0.092 | 0.409 | 0.403 | 0.479 | 0.641 | 0.494 | 0.570 | 0.495 |
| Total butane delivered at $t_{C0.125\,vol\,\%}$ (g) | 0.11 | 0.47 | 0.47 | 0.55 | 0.70 | 0.56 | 0.64 | 0.56 |
| Efficiency at $t_{C0.0125\,vol\,\%}$; $DAE_{C0.125\,vol\,\%}$ | 81% | 87% | 86% | 87% | 91% | 88% | 89% | 88% |

TABLE 15

Dynamic Adsorption Test - High dP Examples.

| | Example | |
|---|---|---|
| | 13 | 14 |
| | \multicolumn{2}{c}{Comparative (C)/Inventive (I)} |
| | C | C |
| Caliper length (mm); L | 151.0 | 152.0 |
| Caliper diameter (mm); $D_{o,c}$ | 35.0 | 35.4 |
| Wall thickness (mm) avg; $t_{w,avg}$ | 0.966 | 0.911 |
| Hydraulic diameter Cell pitch (mm); $CP_{Dh}$ | 1.636 | 1.637 |
| Cell density (cpsi); $n_c/(\pi D_o^2/4)$ | 228 | 235 |
| BWC, g/dL | 2.78 | 4.43 |
| IAC, g/L | 12.4 | 20.4 |
| \multicolumn{3}{c}{Virgin Part - Initial saturation adsorption step:} |
| Time at 5% BT (min); $t_{V5\%}$ | 13.8 | 23.2 |
| Total C4 adsorbed at $t_{V5\%}$ (g); $m_{ads, V5\%}$ | 2.16 | 3.64 |
| Total effluent C4 at $t_{V5\%}$ (g); $m_{efl, V5\%}$ | 0.022 | 0.027 |
| Efficiency at $t_{V5\%}$; $DAE_{V5\%}$ | 99.0% | 99.3% |
| Bleedthrough contribution between $t_{V5\%}$ & $t_{V95\%}$ (g); $m_{efl, VB5-95\%}$ | 0.001 | 0.002 |
| Time for 95% BT beyond initial bleedthrough (min); $t_{V95\%}$ | 36.3 | 65.1 |
| MTZ effluent between $t_{V5\%}$ & $t_{V95\%}$ (g); $m_{efl, VM5-95\%}$ | 1.99 | 4.01 |
| Total effluent at $t_{V95\%}$ (g); $m_{efl, V95\%}$ | 2.02 | 4.04 |
| Total adsorbed at $t_{V95\%}$ (g); $m_{ads, V95\%}$ | 3.73 | 6.27 |
| Total butane delivered at $t_{V95\%}$ (g); $m_{del, V95\%}$ | 5.75 | 10.30 |
| Efficiency at $t_{V95\%}$; $DAE_{V95\%}$ | 65% | 61% |
| \multicolumn{3}{c}{Cycled Part - After initial saturation adsorption and purge steps:} |
| Time for 5% BT beyond bleedthrough (min); $t_{C5\%}$ | 123 | 173 |
| Total butane adsorbed at $t_{C5\%}$ (g); $m_{ads, C5\%}$ | 0.183 | 0.258 |
| Bleedthrough at $t_{C5\%}$ (g); $m_{efl, C5\%}$ | 0.022 | 0.030 |
| Efficiency at $t_{C5\%}$; $DAE_{C5\%}$ | 89% | 89% |
| Bleedthrough contribution between $t_{C5\%}$ & $t_{C95\%}$ (g); $m_{efl, CB5-95\%}$ | 0.017 | 0.021 |
| MTZ effluent between $t_{C5\%}$ & $t_{C95\%}$ (g); $m_{efl, CM5-95\%}$ | 0.235 | 0.267 |

TABLE 15-continued

Dynamic Adsorption Test - High dP Examples.

| | Example 13 | Example 14 |
|---|---|---|
| | Comparative (C)/Inventive (I) | |
| | C | C |
| Total effluent at $t_{C95\%}$ (g); $m_{efl,\ C95\%}$ | 0.274 | 0.318 |
| Time for 95% BT beyond bleedthrough (min); $t_{C95\%}$ | 427 | 539 |
| Total butane adsorbed at $t_{C95\%}$; (g); $m_{ads,\ C95\%}$ | 0.438 | 0.581 |
| Total butane delivered at $t_{C95\%}$ (g) | 0.712 | 0.899 |
| Efficiency at $t_{C95\%}$; $DAE_{C95\%}$ | 61% | 65% |
| Time for 25% influent in effluent (min); $t_{C0.125\ vol\ \%}$ | 252 | 322 |
| Bleedthrough contribution between $t_{C5\%}$ & $t_{C0.125\ vol\ \%}$ (g); $m_{efl,\ CB5\%-0.125\ vol\ \%}$ | 0.007 | 0.008 |
| MTZ effluent between $t_{C5\%}$ & $t_{C0.125\ vol\ \%}$ (g); $m_{efl,\ CM5\%-0.125\ vol\ \%}$ | 0.029 | 0.034 |
| Total effluent at $t_{C0.125\ vol\ \%}$ (g); $m_{efl,\ C0.125\ vol\ \%}$ | 0.058 | 0.072 |
| Total butane adsorbed at $t_{C0.125\ vol\ \%}$; (g); $m_{ads,\ C0.125\ vol\ \%}$ | 0.361 | 0.464 |
| Total butane delivered at $t_{C0.125\ vol\ \%}$ (g) | 0.42 | 0.54 |
| Efficiency at $t_{C0.0125\ vol\ \%}$; $DAE_{C0.125\ vol\ \%}$ | 86% | 87% |

TABLE 16

Dynamic Adsorption Test - Alternative BWC, carbon and dimension.

| | Example 6 | Example 5 | Example 8 | Example 9 | Example 10 | Example 11 |
|---|---|---|---|---|---|---|
| | Comparative (C)/Inventive (I) | | | | | |
| | C | I | C | I | C | I |
| Caliper length (mm); L | 150.0 | 151.5 | 142.5 | 142.6 | 150.7 | 150.6 |
| Caliper diameter (mm); $D_{o,\ c}$ | 35.0 | 35.0 | 42.2 | 42.3 | 36.0 | 34.4 |
| Wall thickness (mm) avg; $t_{w,\ avg}$ | 0.675 | 0.293 | 0.312 | 0.291 | 0.348 | 0.264 |
| Hydraulic diameter cell pitch (mm); $CP_{Dh}$ | 1.995 | 0.943 | 1.610 | 0.963 | 1.640 | 0.894 |
| Cell density (cpsi); $n_c/(\pi D_o^2/4)$ | 150 | 660 | 230 | 669 | 227 | 733 |
| BWC, g/dL | 5.92 | 5.47 | 2.95 | 2.98 | 3.01 | 2.86 |
| IAC, g/L | 26.3 | 24.6 | 10.4 | 10.4 | 9.9 | 10.0 |
| Virgin Part - Initial saturation adsorption step: | | | | | | |
| Time at 5% BT (min); $t_{V5\%}$ | 37.2 | 22.9 | 17.9 | 20.1 | 34.3 | 29.0 |
| Total C4 adsorbed at $t_{V5\%}$ (g); $m_{ads,\ V5\%}$ | 5.87 | 3.60 | 2.81 | 3.17 | 5.37 | 4.54 |
| Total effluent C4 at $t_{V5\%}$ (g); $m_{efl,\ V5\%}$ | 0.024 | 0.021 | 0.017 | 0.016 | 0.059 | 0.043 |
| Efficiency at $t_{V5\%}$; $DAE_{V5\%}$ | 99.6% | 99.4% | 99.4% | 99.5% | 98.9% | 99.1% |
| Bleedthrough contribution between $t_{V5\%}$ & $t_{V95\%}$ (g); $m_{efl,\ VB5-95\%}$ | 0.003 | 0.003 | 0.002 | 0.002 | 0.002 | 0.001 |
| Time for 95% BT beyond initial bleedthrough (min); $t_{V95\%}$ | 92.2 | 84.0 | 57.3 | 56.2 | 63.2 | 52.0 |
| MTZ effluent between $t_{V5\%}$ & $t_{V95\%}$ (g); $m_{efl,\ VM5-95\%}$ | 6.00 | 5.17 | 3.67 | 3.27 | 2.49 | 1.79 |
| Total effluent at $t_{V95\%}$ (g); $m_{efl,\ V95\%}$ | 6.03 | 5.19 | 3.69 | 3.29 | 2.55 | 1.83 |
| Total adsorbed at $t_{V95\%}$ (g); $m_{ads,\ V95\%}$ | 8.57 | 8.11 | 5.38 | 5.60 | 7.45 | 6.41 |
| Total butane delivered at $t_{V95\%}$ (g); $m_{del,\ V95\%}$ | 14.60 | 13.31 | 9.07 | 8.89 | 10.00 | 8.24 |
| Efficiency at $t_{V95\%}$; $DAE_{V95\%}$ | 59% | 61% | 59% | 63% | 74% | 78% |
| Cycled Part - After initial saturation adsorption and purge steps: | | | | | | |
| Time for 5% BT beyond bleedthrough (min); $t_{C5\%}$ | 137 | 254 | 363 | 408 | 203 | 333 |
| Total butane adsorbed at $t_{C5\%}$ (g); $m_{ads,\ C5\%}$ | 0.197 | 0.380 | 0.561 | 0.635 | 0.309 | 0.501 |
| Bleedthrough at $t_{C5\%}$ (g); $m_{efl,\ C5\%}$ | 0.031 | 0.043 | 0.044 | 0.044 | 0.030 | 0.054 |
| Efficiency at $t_{C5\%}$; $DAE_{C5\%}$ | 86% | 90% | 93% | 93% | 91% | 90% |
| Bleedthrough contribution between $t_{C5\%}$ & $t_{C95\%}$ (g); $m_{efl,\ CB5-95\%}$ | 0.024 | 0.015 | 0.014 | 0.010 | 0.020 | 0.024 |
| MTZ effluent between $t_{C5\%}$ & $t_{C95\%}$ (g); $m_{efl,\ CM5-95\%}$ | 0.220 | 0.205 | 0.308 | 0.251 | 0.318 | 0.410 |
| Total effluent at $t_{C95\%}$ (g); $m_{efl,\ C95\%}$ | 0.275 | 0.263 | 0.366 | 0.306 | 0.368 | 0.488 |
| Time for 95% BT beyond bleedthrough (min); $t_{C95\%}$ | 419 | 525 | 683 | 649 | 683 | 753 |
| Total butane adsorbed at $t_{C95\%}$; (g); $m_{ads,\ C95\%}$ | 0.424 | 0.612 | 0.773 | 0.776 | 0.769 | 0.767 |
| Total butane delivered at $t_{C95\%}$ (g) | 0.699 | 0.875 | 1.138 | 1.082 | 1.138 | 1.255 |
| Efficiency at $t_{C95\%}$; $DAE_{C95\%}$ | 61% | 70% | 68% | 72% | 68% | 61% |
| Time for 25% influent in effluent (min); $t_{C0.125\ vol\ \%}$ | 213 | 345 | 440 | 449 | 408 | 431 |

TABLE 16-continued

Dynamic Adsorption Test - Alternative BWC, carbon and dimension.

| | Example | | | | | |
|---|---|---|---|---|---|---|
| | 6 | 5 | 8 | 9 | 10 | 11 |
| | \multicolumn{6}{c}{Comparative (C)/Inventive (I)} | | | | | |
| | C | I | C | I | C | I |
| Bleedthrough contribution between $t_{C5\%}$ & $t_{C0.125\ vol\ \%}$ (g); $m_{efl,\ CB5\%-0.125\ vol\ \%}$ | 0.007 | 0.005 | 0.003 | 0.002 | 0.009 | 0.006 |
| MTZ effluent between $t_{C5\%}$ & $t_{C0.125\ vol\ \%}$ (g); $m_{efl,\ CM5\%-0.125\ vol\ \%}$ | 0.019 | 0.020 | 0.016 | 0.009 | 0.042 | 0.022 |
| Total effluent at $t_{C0.125\ vol\ \%}$ (g); $m_{efl,\ C0.125\ vol\ \%}$ | 0.057 | 0.068 | 0.063 | 0.055 | 0.081 | 0.082 |
| Total butane adsorbed at $t_{C0.125\ vol\ \%}$; (g); $m_{ads,\ C0.125\ vol\ \%}$ | 0.298 | 0.507 | 0.671 | 0.694 | 0.599 | 0.637 |
| Total butane delivered at $t_{C0.125\ vol\ \%}$ (g) | 0.35 | 0.58 | 0.73 | 0.75 | 0.68 | 0.72 |
| Efficiency at $t_{C0.0125\ vol\ \%}$; $DAE_{C0.125\ vol\ \%}$ | 84% | 88% | 91% | 93% | 88% | 89% |

Figure 38:
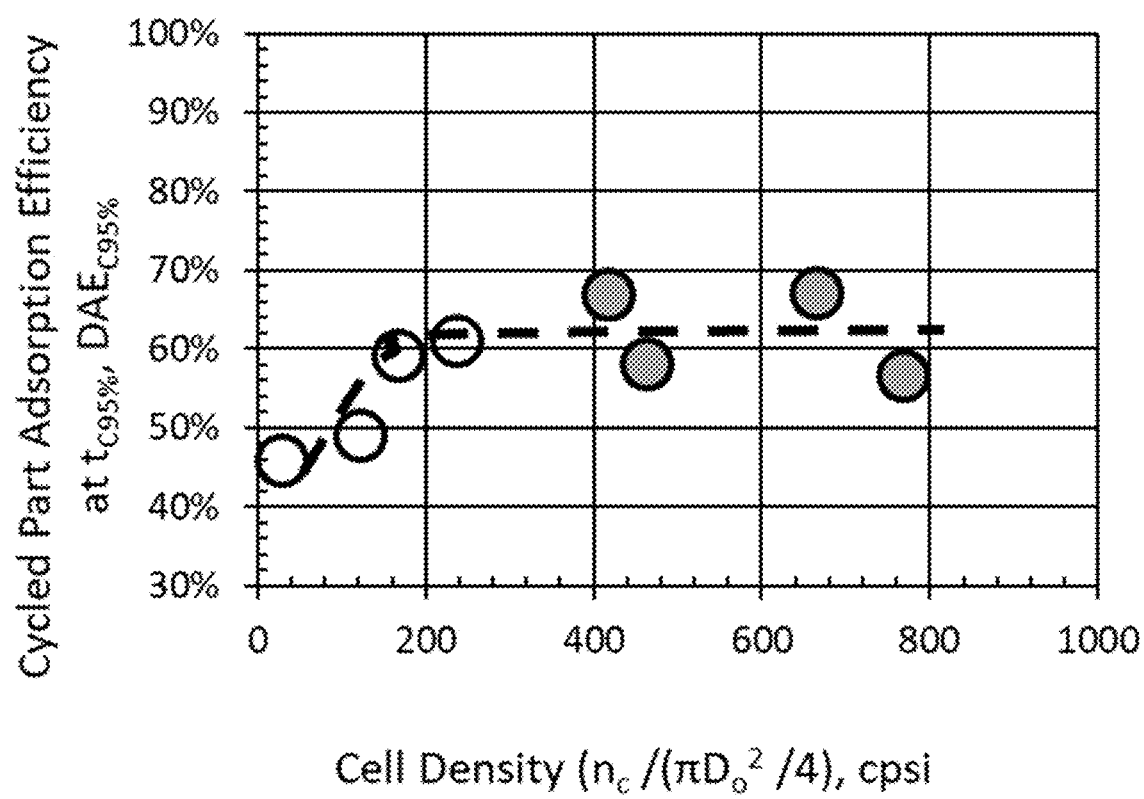
FIG. 38 are test data for comparative (open circles) and inventive examples (filled circles) for cycled part adsorption efficiency ($DAE_{C95\%}$) as a function of cell density (cells per square inch; cpsi).
Figure 39:
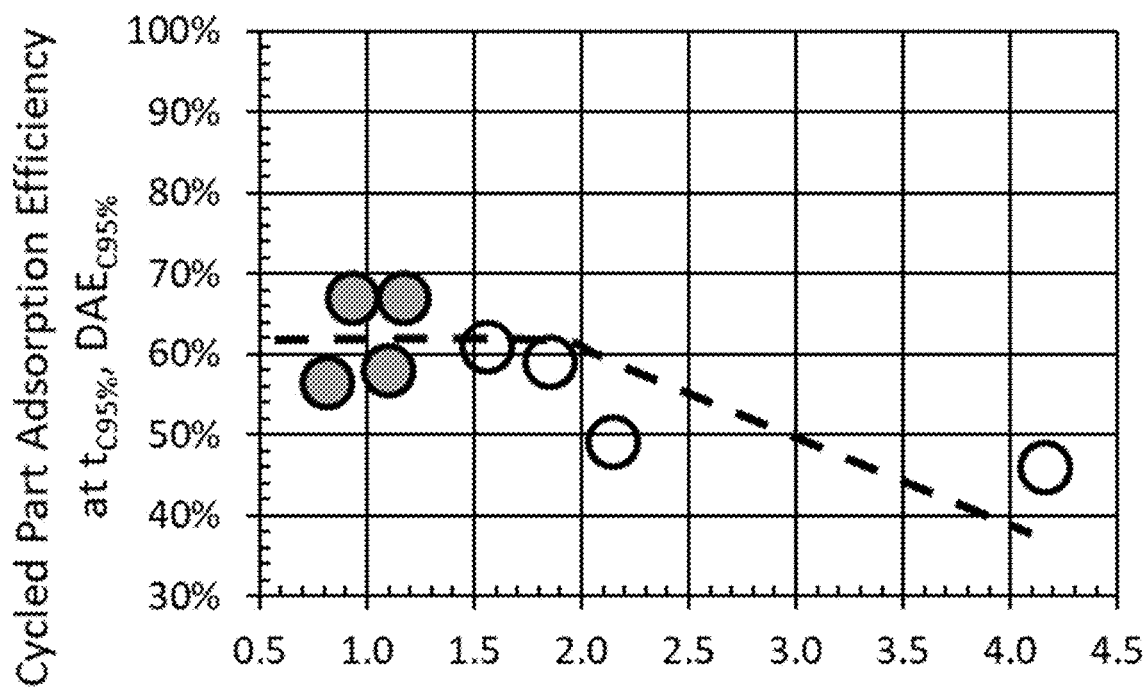
FIG. 39 are test data for comparative (open circles) and inventive examples (filled circles) for cycled part adsorption efficiency ($DAE_{C95\%}$) as a function of cell pitch based on hydraulic diameter ($CP_{Dh}$).
Figure 40:
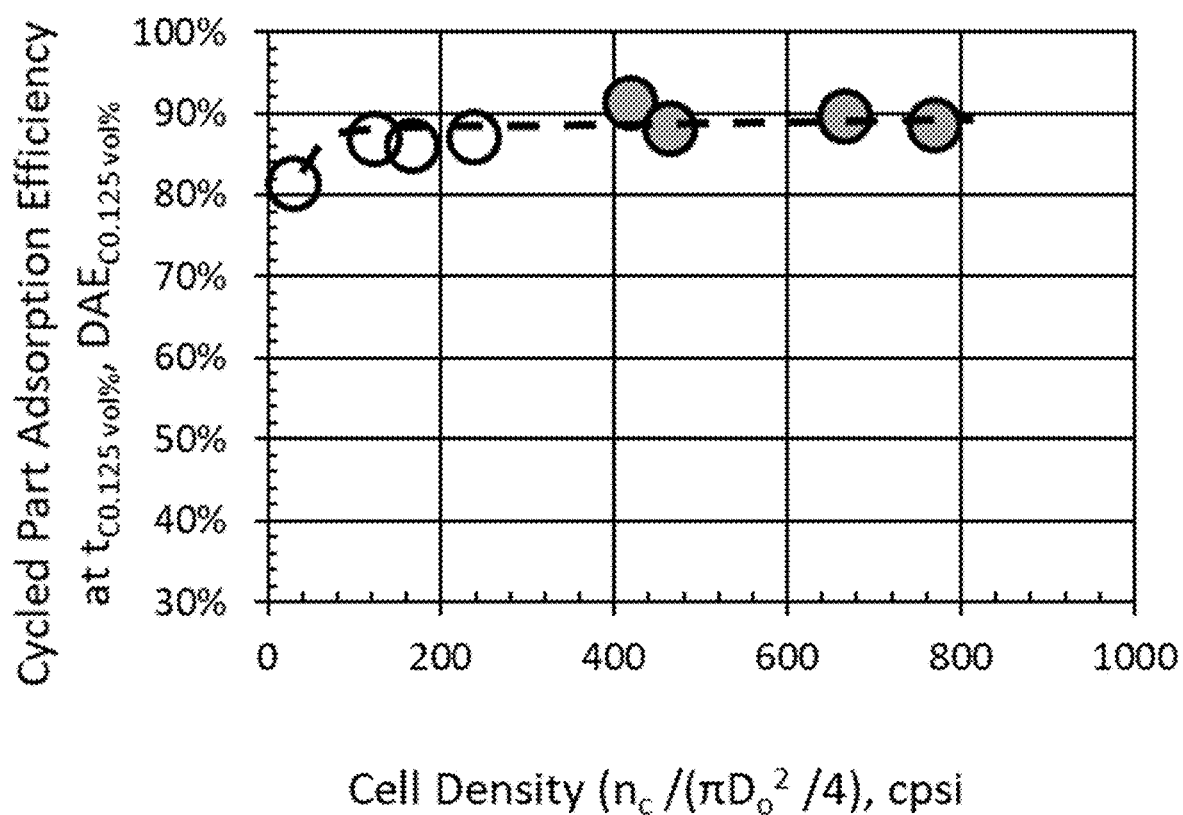
FIG. 40 are test data for comparative (open circles) and inventive examples (filled circles) for cycled part adsorption efficiency ($DAE_{C0.125\ vol\ \%}$) as a function of cell density (cells per square inch; cpsi).
Figure 41:
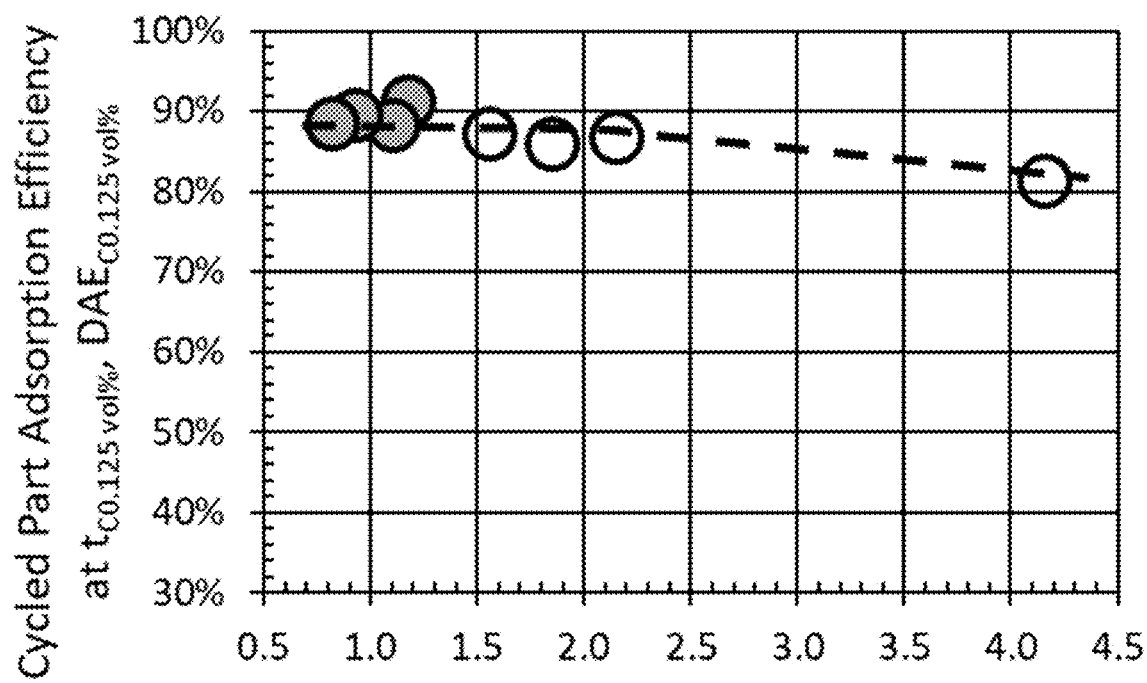
FIG. 41 are test data for comparative (open circles) and inventive examples (filled circles) for cycled part adsorption efficiency ($DAE_{C0.125\ vol\ \%}$) as a function of cell pitch based on hydraulic diameter ($CP_{Dh}$).
Figure 42:
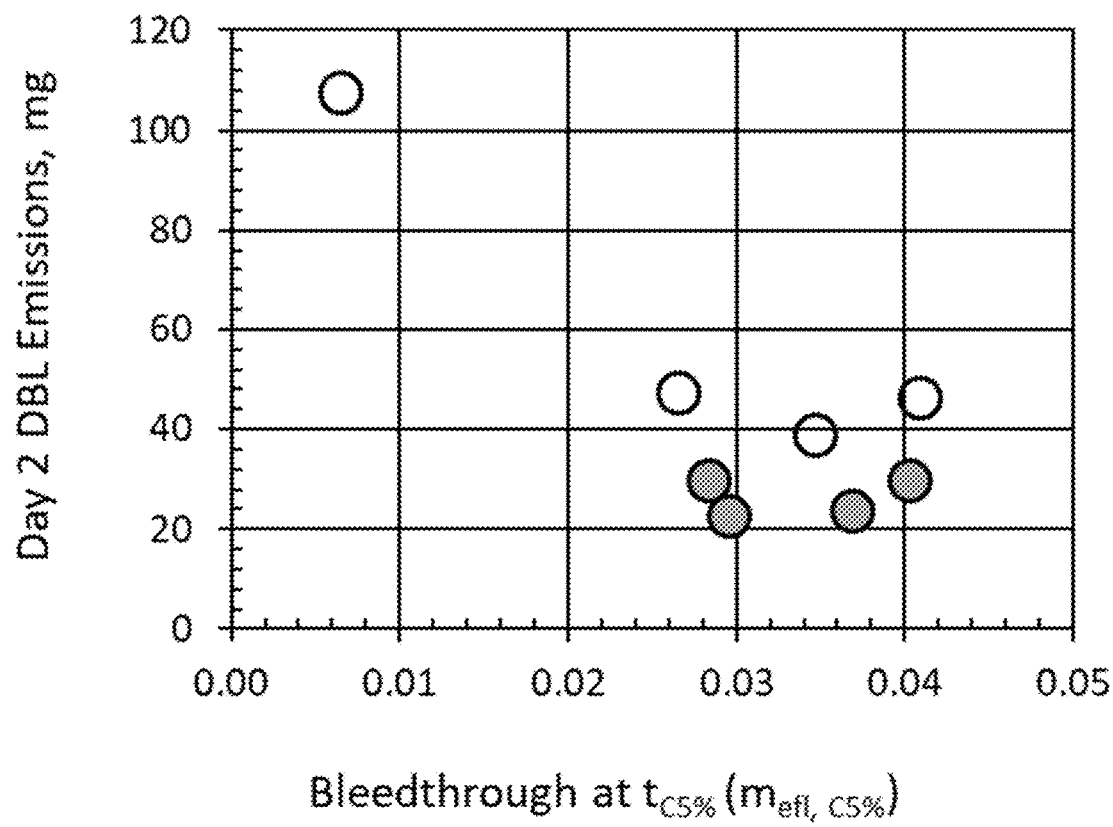
FIG. 42 are test data for 35 mm diameter×150 mm long comparative (open circles) and inventive examples (filled circles) for day 2 DBL emissions as a function of the PPAV mass of bleedthrough (g) before 5% BT.
Figure 43:
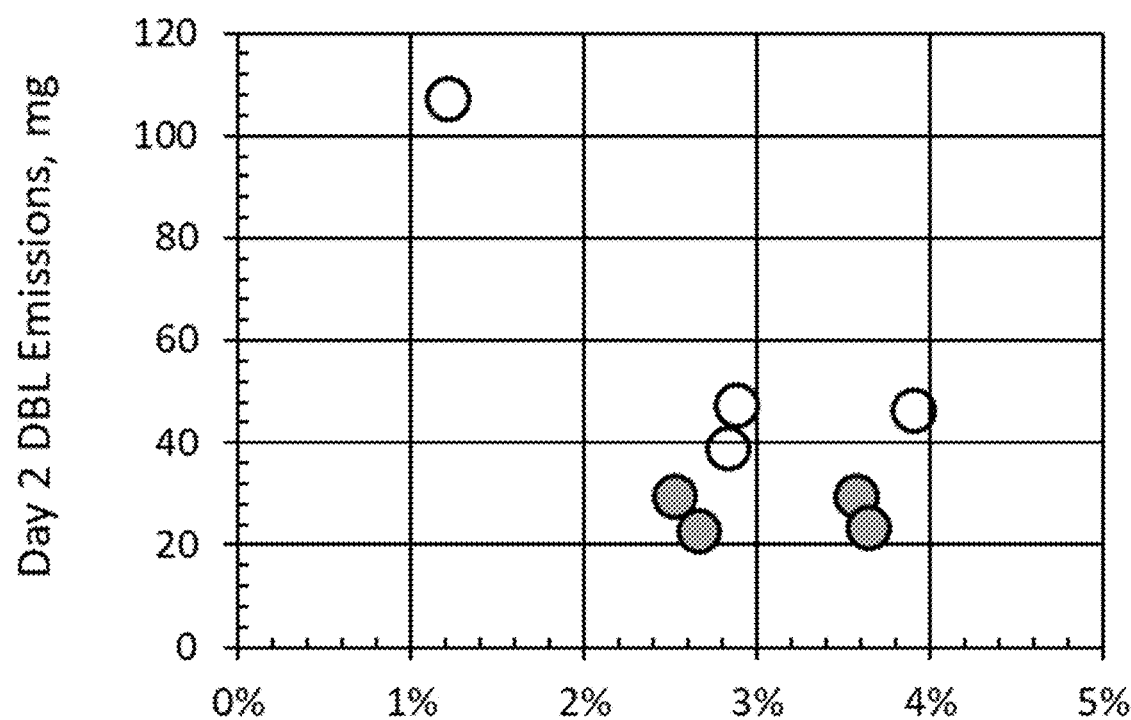
FIG. 43 are test data for 35 mm diameter×150 mm long comparative (open circles) and inventive examples (filled circles) for day 2 DBL emissions as a function of the PPAV percent influent as bleedthrough relative to total butane delivered before 95% BT.
Figure 45:
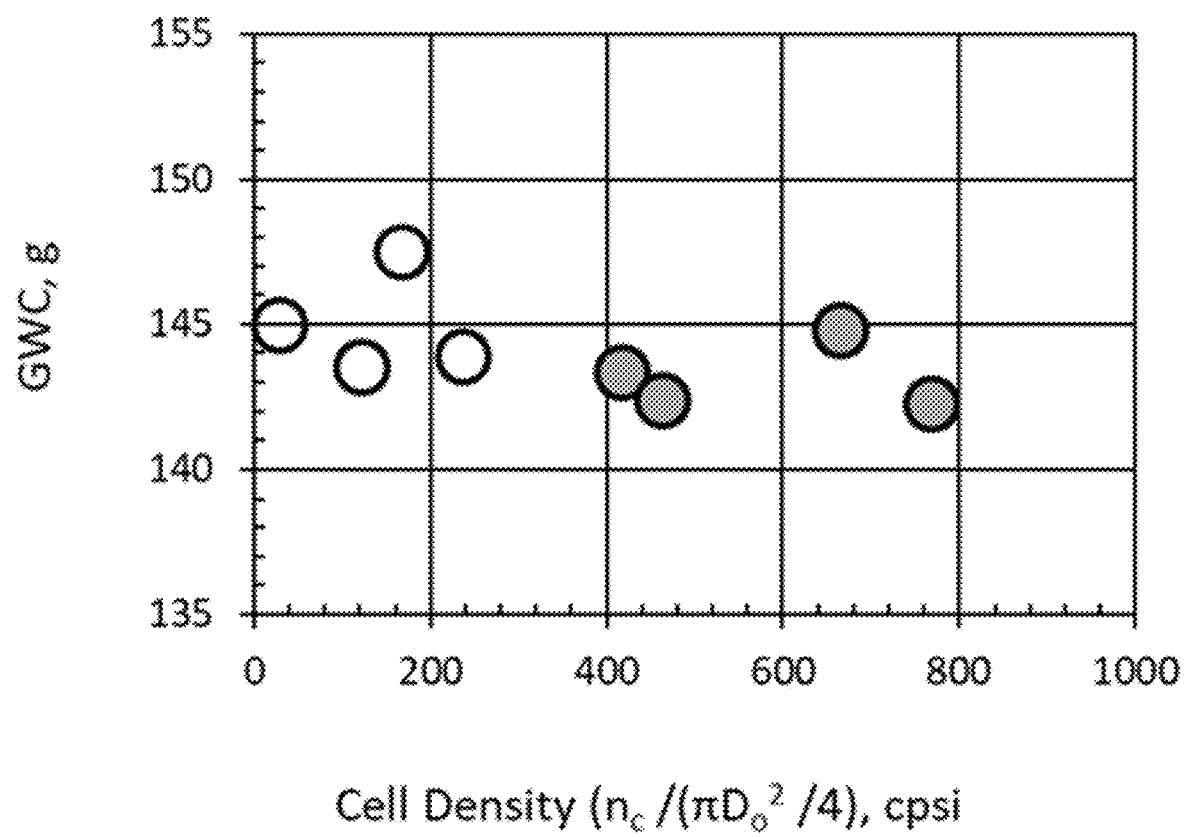
FIG. 45 are test data for 35 mm diameter×150 mm long comparative (open circles) and inventive examples (filled circles) for gasoline working capacity (g) as a function of the PPAV cell density (cells per square inch; cpsi).

Potentially more pertinent performance predictor for a PPAV monolith intended for a cycled application such as evaporative emissions control, could be the dynamic adsorption MTZ properties after the PPAV monolith had been cycled through an adsorption and purge pretreatment, as taught by US 2020/0018265. In applying this test for the Examples 1-4, 7, and 15-17 of about the same external dimensions, BWC, and carbon ingredient properties, there was a convergence of the breakthrough MTZ as cell density was increased from its lowest value, e.g., cell pitch was decreased from its highest value. For example, there was a significantly early breakthrough and early saturation of the lowest cell density PPAV, Example 15, attributed to a lack of effectiveness of the purge pretreatment for rejuvenating its carbon by virtue of its wide channel widths, and giving a low cycled dynamic adsorption efficiency to 95% saturation ($DAE_{C95\%}$) of only about 45%. As cell density and cell pitch were increased across the Examples, the $DAE_{C95\%}$ increased to a plateau of about 55-65% by a cell density of about 200 cpsi and a cell pitch of about 2 mm (see FIGS. 38 and 39, respectively), with no distinguishing dynamic adsorption efficiency behavior by the inventive examples. In considering the abbreviated metric of 25% saturation (0.125 vol % n-butane effluent for the 0.5 vol % influent) described in US 2020/0018265, there was likewise a plateau in dynamic adsorption $DAE_{C\ 25\%}$ sat, according to cell density (FIG. 40) and cell pitch (FIG. 41), and, again, with no distinguishing dynamic adsorption efficiency behavior by the inventive examples. As a measure of system capacity effects, the canister systems containing either the comparative or inventive examples showed no difference in GWC which had its adsorption cycle endpoint triggered by a cumulative breakthrough mass emanating from the vent-side PPAV volume (see FIG. 45). Therefore, in practice within a canister system, the effect of the high cell density, low cell pitch pf the PPAV part on the system's vent-side was strictly on the emissions performance of the system to which it was installed, without any significant benefit, or detriment, to that system's working capacity, consistent with the lack of differentiating dynamic adsorption performance of the standalone PPAV parts.

TABLE 17

Dynamic Adsorption Test, including slit-shaped cells.

| Example | 24 | 25 | 22 | 23 |
|---|---|---|---|---|
| Comparative (C)/Inventive (I) | C-slit | C-slit | C | I |
| Caliper length (mm); L | 151.5 | 151.4 | 150.5 | 150.7 |
| Caliper diameter (mm); $D_{o,c}$ | 29.3 | 29.4 | 29.7 | 28.8 |
| Wall thickness (mm) avg; $t_{w,avg}$ | x-axis 0.254 / y-axis 0.336 | x-axis 0.306 / y-axis 0.358 | 0.304 | 0.264 |
| Plurality channel width (mm) avg; $t_{c,avg}$ | 3.893 / 0.918 | 2.722 / 0.922 | 1.353 | 0.916 |
| Plurality width cell pitch (mm); $CP_{tc} = t_{c,avg} + t_{w,avg}$ | 4.147 / 1.254 | 3.080 / 1.228 | 1.658 | 1.180 |
| Average channel hydraulic diameter (mm); $4\Sigma A_c/\Sigma P_c$ | 1.288 | 1.218 | 1.275 | 0.894 |
| Cell density (cpsi; $n_c/(\pi D_o^2/4)$ | 151 | 174 | 234 | 441 |
| BWC, g/dL | 4.30 | 4.30 | 4.04 | 4.28 |
| IAC, g/L | 18.3 | 17.0 | 17.3 | 17.3 |
| \multicolumn{5}{c}{Virgin Part-Initial saturation adsorption step:} | | | | |
| Time at 5% BT (min); $t_{V5\%}$ | 16.37 | 17.40 | 15.74 | 18.50 |
| Total C4 adsorbed at $t_{V5\%}$ (g); $m_{ads,\ V5\%}$ | 2.58 | 2.74 | 2.48 | 2.91 |
| Total effluent C4 at $t_{V5\%}$ (g); $m_{efl,\ V5\%}$ | 0.014 | 0.013 | 0.014 | 0.025 |
| Efficiency at $t_{V5\%}$; $DAE_{V5\%}$ | 99.5% | 99.5% | 99.4% | 99.2% |
| Bleedthrough contribution between $t_{V5\%}$ & $t_{V95\%}$ (g); $m_{efl,\ VB5-95\%}$ | 0.002 | 0.001 | 0.001 | 0.001 |
| Time for 95% BT beyond initial bleedthrough (min); $t_{V5\%}$ | 46.2 | 44.5 | 42.6 | 45.3 |
| MTZ effluent between $t_{V5\%}$ & $t_{V95\%}$ (g); $m_{efl,\ VM5-95\%}$ | 2.88 | 2.61 | 2.73 | 2.98 |
| Total effluent at $t_{V95\%}$ (g); $m_{efl,\ V95\%}$ | 2.89 | 2.63 | 2.75 | 3.01 |
| Total adsorbed at $t_{V95\%}$ (g); $m_{ads,\ V95\%}$ | 4.43 | 4.42 | 3.99 | 4.17 |

TABLE 17-continued

Dynamic Adsorption Test, including slit-shaped cells.

| Example | 24 | 25 | 22 | 23 |
|---|---|---|---|---|
| Total butane delivered at $t_{V95\%}$ (g); $m_{del,\ V95\%}$ | 7.32 | 7.05 | 6.74 | 7.18 |
| Efficiency at $t_{V95\%}$; $DAE_{V95\%}$ | 60% | 63% | 59% | 58% |
| Cycled Part-After initial saturation adsorption and purge steps: | | | | |
| Time for 5% BT beyond bleedthrough (min); $t_{C5\%}$ | 312 | 320 | 336 | 329 |
| Total butane adsorbed at $t_{C5\%}$ (g); $m_{ads,\ C5\%}$ | 0.479 | 0.493 | 0.519 | 0.507 |
| Bleedthrough at $t_{C5\%}$ (g); $m_{efl,\ C5\%}$ | 0.041 | 0.041 | 0.042 | 0.042 |
| Efficiency at $t_{C5\%}$; $DAE_{C5\%}$ | 92% | 92% | 93% | 92% |
| Bleedthrough contribution between $t_{C5\%}$ & $t_{C95\%}$ (g); $m_{efl,\ CB5-95\%}$ | 0.010 | 0.009 | 0.007 | 0.008 |
| MTZ effluent between $t_{C5\%}$ & $t_{C95\%}$ (g); $m_{efl,\ CM5-95\%}$ | 0.200 | 0.175 | 0.143 | 0.182 |
| Total effluent at $t_{C95\%}$ (g); $m_{efl,\ C95\%}$ | 0.251 | 0.225 | 0.192 | 0.232 |
| Time for 95% BT beyond bleedthrough (min); $t_{C95\%}$ | 552 | 542 | 495 | 517 |
| Total butane adsorbed at $t_{C95\%}$; (g); $m_{ads,\ C95\%}$ | 0.670 | 0.677 | 0.634 | 0.629 |
| Total butane delivered at $t_{C95\%}$ (g) | 0.921 | 0.903 | 0.826 | 0.861 |
| Efficiency at $t_{C95\%}$; $DAE_{C95\%}$ | 73% | 75% | 77% | 73% |
| Time for 25% influent in effluent (min); $t_{C0.125\ vol\ \%}$ | 387 | 403 | 378 | 373 |
| Bleedthrough contribution between $t_{C5\%}$ & $t_{C0.125\ vol\ \%}$ (g); $m_{efl,\ CB5\%-0.125\ vol\ \%}$ | 0.003 | 0.004 | 0.002 | 0.002 |
| MTZ effluent between $t_{C5\%}$ & $t_{C0.125\ vol\ \%}$ (g); $m_{efl,\ CM5\%-0.125\ vol\ \%}$ | 0.015 | 0.016 | 0.008 | 0.009 |
| Total effluent at $t_{C0.125\ vol\ \%}$ (g); $m_{efl,\ C0.125\ vol\ \%}$ | 0.059 | 0.060 | 0.052 | 0.052 |
| Total butane adsorbed at $t_{C0.125\ vol\ \%}$; (g); $m_{ads,\ C0.125\ vol\ \%}$ | 0.586 | 0.611 | 0.579 | 0.570 |
| Total butane delivered at $t_{C0.125\ vol\ \%}$ (g) | 0.65 | 0.67 | 0.63 | 0.62 |
| Efficiency at $t_{C0.125\ vol\ \%}$; $DAE_{C0.125\ vol\ \%}$ | 91% | 91% | 92% | 92% |

Figure 44:
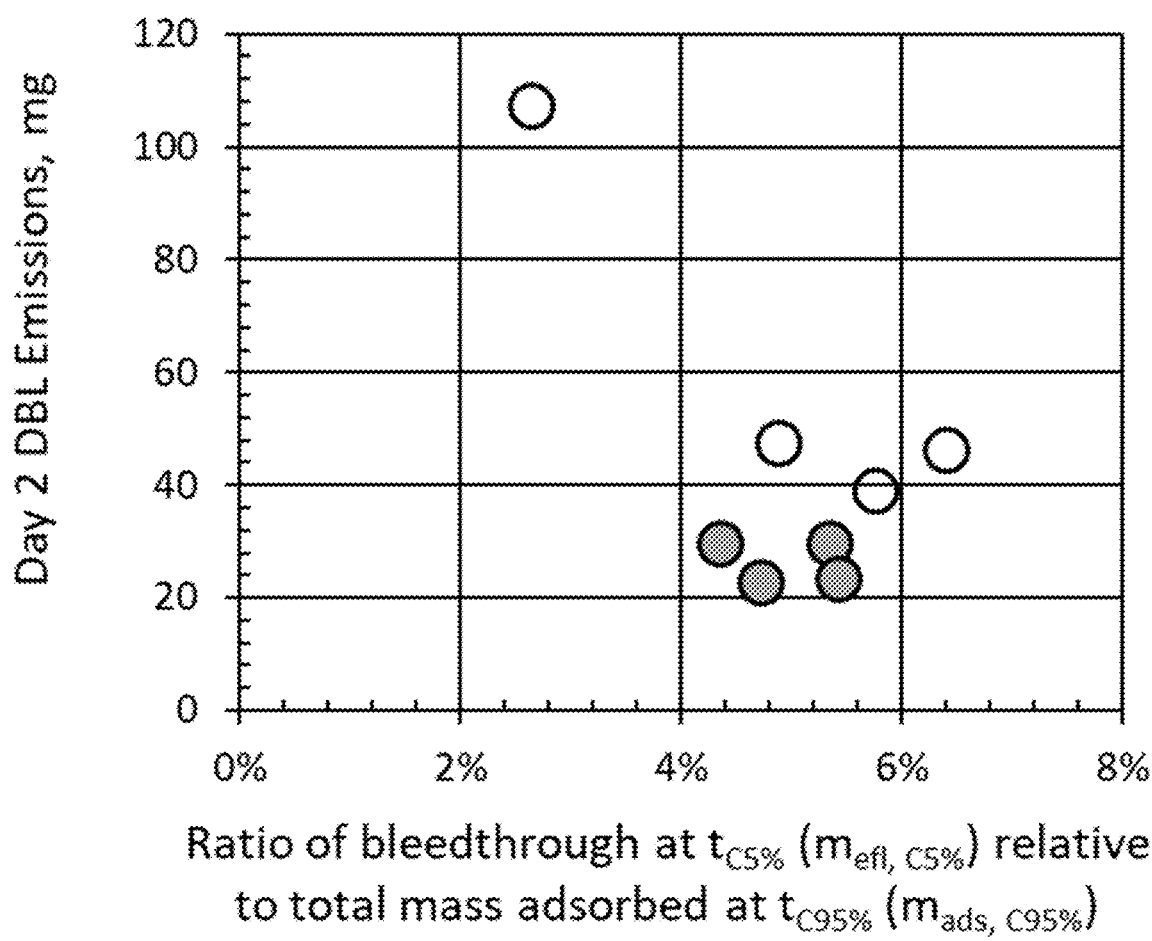
FIG. 44 are test data for 35 mm diameter×150 mm long comparative (open circles) and inventive examples (filled circles) for day 2 DBL emissions as a function of the PPAV bleedthrough relative to total mass adsorbed before 95% BT.

The bleedthrough emissions component ($m_{efl,\ C5\%}$) of the cycled PPAV might alternatively be considered as a potential predictor of the diurnal breathing loss emissions encountered by the canister system containing the PPAV part during the BETP test. However, no such correlation was evident. For example, in comparing comparative Examples 1, and 15-17 with inventive Examples 2-4 and 7, there was no distinctive level between inventive and comparative examples for the bleedthrough mass before 5% breakthrough, $m_{efl,\ C5\%}$, when considered as a mass (FIG. 42), as a percentage of total influent before 95% MTZ breakthrough (FIG. 43) or as percentage of total mass loaded before 95% MTZ breakthrough (FIG. 44). Therefore, the performance of the PPAV part as an adsorbent volume component within the canister system was not predictable from available test methods for dynamic adsorption (See Tables 14-17). Indeed, in special comparative tests where the vapor challenges imposed on the vent-side PPAV were measured in the breathing loss step of the BETP test, there actually appeared to be an increased challenge to the auxiliary canister containing the PPAV for the systems where the PPAV part's cell density was increased and cell pitch was decreased. In these tests with the Type A canister system, the PPAV part was removed just prior to the DBL portion of the BETP protocol (auxiliary canister 300 removed in FIG. 5) and the DBL emissions were measured. As shown in Table 18, vapor load imposed by the main canister during day 2 of the DBL portion of the BETP protocol (in repeat experiments with each example, but with the DBL emissions step of the BETP protocol conducted with the auxiliary canister 300 removed) surprisingly increased about linearly with the cell density of the PPAV part that had been installed within the auxiliary canister during the prior preparation steps, meaning that systems with the inventive examples in place provided the system with low emissions performance despite the additional vapor load challenge.

TABLE 18

Examples with PPAV removed.

| | Comparative Example 1 | Inventive Example 2 | Inventive Example 4 |
|---|---|---|---|
| Canister System GWC, g | 143.8 | 143.2 | 143.0 |
| PPAV BWC, g/dL | 4.13 | 4.54 | 4.45 |
| Average channel hydraulic diameter (mm); $t_{c,\ Dh} = 4\Sigma A_c/\Sigma P_c$ | 1.28 | 0.91 | 0.67 |
| Hydraulic diameter cell pitch (mm); $CP_{Dh} = t_{c,\ Dh} + t_{w,\ avg}$ | 1.59 | 1.19 | 0.94 |
| Cell Density (cpsi); $n_c/(\pi D_o^2/4)$ | 239 | 419 | 667 |
| Day 2 Emissions, mg | 46.0 | 29.2 | 23.1 |

Emissions with Auxiliary Canister 300 Removed

| | Comparative Example 1R | Inventive Example 2R | Inventive Example 4R |
|---|---|---|---|
| Day 2 Emissions, mg | 830 | 858 | 932 |

While not being bound by theory, it appears that one central factor is the bulk phase mass transfer within the PPAV monolith channels, with narrow channel dimensions being favorable, as afforded by a high cell density. However, it does not appear that a narrow channel width is sufficient for the low emissions effect (see Examples 14, 24 and 25. A second factor appears to additionally be sufficient total open area as also afforded by a high cell density, such that the velocity of gas flow through the PPAV part at some point in the cycling process is not excessive and so that there is sufficient residence time (See Example 14 with relatively narrow channel width, but also with insufficient open area from a conventional cell density and pitch). Nonetheless, it is clear from the inventive examples that follow the embodiments teach a method for attaining unexpectedly low bleed emissions with a evaporative emissions canister system, even when the amount of purge is exceedingly small. Furthermore, the surprising effect on DBL emissions for the canister system is not predicted by available tests of properties and dynamic performance of the PPAV part alone.

The contents of all references, patents, pending patent applications and published patents, cited throughout this application are hereby expressly incorporated by reference.

Those skilled in the art will recognize or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

We claim:

1. An evaporative emission control canister system comprising:
   one or more canisters including a fuel-side adsorbent volume, and at least one vent-side parallel passage adsorbent volume (PPAV), wherein the at least one vent-side PPAV comprises an outer surface and a plurality of parallel passages or channels extending therethrough parallel to the outer surface, and
   wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof.

2. The evaporative emission control canister system of claim 1, wherein the average channel hydraulic diameter ($t_{c, Dh}$) is less than or equal to 1.20.

3. The evaporative emission control canister system of claim 1, wherein the hydraulic diameter cell pitch ($CP_{Dh}$) is less than or equal to 1.45 mm.

4. The evaporative emission control canister system of claim 1, wherein the PPAV further comprises at least one of the following: (i) a plurality channel width ($t_{a, avg}$) of less than about 1.25 mm; (ii) a plurality channel width cell pitch ($CP_{tc, avg}$) of less than about 1.5 mm; (iii) a cell density of from about 285 to about 1000 cpsi; (iv) a cell wall thickness of less than about 0.5 mm; (v) a BWC of less than about 10 g/dL; (vi) an incremental adsorption capacity between 5% and 50% n-butane at 25 C of less than about 50 g/L; or (vii) a combination thereof.

5. The evaporative emission control canister system of claim 4, wherein the plurality channel width ($t_{c, avg}$) of the PPAV is less than about 1.20 mm.

6. The evaporative emission control canister system of claim 4, wherein the plurality channel width cell pitch ($CP_{tc, avg}$) of the PPAV is less than about 1.45 mm.

7. The evaporative emission control canister system of claim 4, wherein the cell density is from about 300 to about 900 cpsi (e.g., from about 400 to about 900 or from about 400 to 800 or from about 400 to about 600).

8. The evaporative emission control canister system of claim 4, wherein the cell wall thickness of the PPAV is from about 0.1 mm to about 0.5 mm.

9. The evaporative emission control canister system of claim 4, wherein the at least one vent-side PPAV has a BWC of less than about 9.5 g/dL.

10. The evaporative emission control canister system of claim 4, wherein the at least one vent-side PPAV has a gram-total BWC of less than 10 g.

11. The evaporative emission control canister system of claim 4, wherein the at least one vent-side PPAV has an incremental adsorption capacity (IAC) between 5% and 50% n-butane at 25° C. of less than 45 g/L.

12. The evaporative emission control canister system of claim 1, wherein the at least one vent-side PPAV is a honeycomb or cylindrical honeycomb structure.

13. The evaporative emission control canister system of claim 1, wherein the at least one vent-side PPAV comprises an adsorbent material derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, or a combination thereof.

14. The evaporative emission control canister system of claim 13, wherein the at least one vent-side PPAV comprises activated carbon or carbon charcoal.

15. The evaporative emission control canister system of claim 1, wherein the system has a two-day diurnal breathing loss (DBL) of no more than 50 mg at no more than 315 liters of purge or no more than 150 bed volumes (BV) of purge applied after a 40 g/hr butane loading step as determined by the 2012 California Bleed Emissions Test Procedure (BETP).

16. An evaporative emission control system comprising
   a fuel tank for storing fuel;
   an engine having an air induction system and adapted to consume fuel; and
   one or more canisters including a fuel-side adsorbent volume and at least one vent-side parallel passage adsorbent volume (PPAV), wherein the at least one vent-side PPAV comprises an outer surface and a plurality of parallel passages or channels extending therethrough parallel to the outer surface, and wherein the parallel passages or channels are configured to have at least one of an average channel hydraulic diameter ($t_{c, Dh}$) of less than or equal to 1.25 mm, a hydraulic diameter cell pitch ($CP_{Dh}$) of less than or equal to 1.5 mm or a combination thereof,
wherein the canister includes a fuel vapor inlet conduit connecting the evaporative emission control canister system to the fuel tank;
a fuel vapor purge outlet conduit connecting the evaporative emission control canister system to the air induction system of the engine; and
a vent conduit for venting the evaporative emission control canister system to the atmosphere and for admission of purge air to the evaporative emission control canister system, wherein the evaporative emission control canister system is defined by a fuel vapor flow path from the fuel vapor inlet conduit to the fuel-side adsorbent volume toward the at least one PPAV and the vent conduit, and by an air flow path from the vent conduit to the at least one PPAV toward the fuel-side adsorbent volume and the fuel vapor purge outlet.

17. The evaporative emission control canister system of claim 16, wherein the average channel hydraulic diameter ($t_{c,\ Dh}$) is less than or equal to 1.20 mm.

18. The evaporative emission control canister system of claim 16, wherein the hydraulic diameter cell pitch ($CP_{Dh}$) less than or equal to 1.45 mm.

19. The evaporative emission control canister system of claim 16, wherein the PPAV further comprises at least one of the following: (i) a plurality channel width ($t_{c,\ avg}$) of less than about 1.25 mm; (ii) a plurality channel width cell pitch ($CP_{tc,\ avg}$) of less than about 1.5 mm; (iii) a cell density of from about 285 to about 1000 cpsi; (iv) a cell wall thickness of less than about 0.5 mm; (v) a BWC of less than about 10 g/dL; (vi) an incremental adsorption capacity between 5% and 50% n-butane at 25 C of less than about 50 g/L; or (vii) a combination thereof.

20. The evaporative emission control canister system of claim 19, wherein the plurality channel width ($t_{c,\ avg}$) of the PPAV is less than about 1.20 mm (e.g., less than or equal to 1.10 mm, less than or equal to 1.0 mm).

21. The evaporative emission control canister system of claim 19, wherein the plurality channel width cell pitch ($CP_{tc,\ avg}$) of the PPAV is less than about 1.45 mm (e.g., less than about 1.4 mm, or less than about 1.3 mm).

22. The evaporative emission control canister system of claim 19, wherein the cell density is from about 300 to about 900 cpsi (e.g., from about 400 to about 900 or from about 400 to about 800 or from about 400 to about 600).

23. The evaporative emission control canister system of claim 19, wherein the cell wall thickness of the PPAV is from about 0.1 mm to about 0.5 mm.

24. The evaporative emission control canister system of claim 19, wherein the at least one vent-side PPAV has a BWC of less than about 9.5 g/dL (e.g., less than about 9 g/dL, or less than about 6 g/dL, or from about 2.0 g/dL to about 9 g/dL).

25. The evaporative emission control canister system of claim 19, wherein the at least one vent-side PPAV has a gram-total BWC of less than 10 g.

26. The evaporative emission control canister system of claim 19, wherein the at least one vent-side PPAV has an incremental adsorption capacity (IAC) between 5% and 50% n-butane at 25° C. of less than 45 g/L (e.g., less than about 40 g/L, less than about 35 g/L, from about 5 to about 45 g/L, from about 5 to about 40 g/L, from about 5 to about 35 g/L).

27. The evaporative emission control canister system of claim 16, wherein the at least one vent-side PPAV is a honeycomb or cylindrical honeycomb structure.

28. The evaporative emission control canister system of claim 27, wherein the at least one vent-side PPAV comprises an adsorbent material derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, or a combination thereof.

29. The evaporative emission control canister system of claim 28, wherein the at least one vent-side PPAV comprises activated carbon or carbon charcoal.

30. The evaporative emission control canister system of claim 29, wherein the system has a two-day diurnal breathing loss (DBL) of no more than 50 mg at no more than 315 liters of purge or no more than 150 bed volumes (BV) of purge applied after a 40 g/hr butane loading step as determined by the 2012 California Bleed Emissions Test Procedure (BETP).

31. An evaporative emission control canister system comprising:
one or more canisters including a fuel-side adsorbent volume; and
one or more vent-side PPAV comprising an outer surface and a plurality of parallel passages or channels extending therethrough parallel to the outer surface, and wherein the parallel passages or channels are configured to have at least one of an average channel hydraulic diameter ($t_{c,Dh}$) of less than or equal to 1.25 mm, a hydraulic diameter cell pitch ($CP_{Dh}$) of less than or equal to 1.5 mm or a combination thereof, and at least one of:
(i) plurality channel width ($t_{c,\ avg}$) of less than about 1.25 mm;
(ii) plurality channel width cell pitch ($CP_{tc,\ avg}$) of less than about 1.5 mm;
(iii) cell density of from about 285 to about 1000 cpsi;
(iv) cell wall thickness of less than about 0.5 mm;
(v) BWC of less than about 10 g/dL;
(vi) an incremental adsorption capacity between 5% and 50% n-butane at 25 C of less than about 50 g/L; or
(vii) a combination thereof,
wherein the fuel-side adsorbent volume and the PPAV are in vaporous or gaseous communication and define a vapor flow path allowing air and/or fuel vapor to flow or diffuse therethrough, and
wherein the evaporative emission control canister system has a two-day diurnal breathing loss (DBL) of no more than 50 mg (e.g., 40, 30, 20, or 10 mg) at no more than 315 liters (e.g., 300, 290, 280, 270, 260, 250, 240, 230, 220, 210, 200, 190, 180, 170, 160 or 150 liters) of purge or no more than 150 bed volumes (BV) (e.g., 140, 130, 120, 110, 100, 90, 80, 75, or 70 BV)) of purge applied after a 40 g/hr butane loading step as determined by the 2012 California Bleed Emissions Test Procedure (BETP).

32. The evaporative emission control canister system of any of claims 1, wherein the at least one vent-side PPAV has an effective BWC of less than about 10 g/dL, an effective incremental adsorption capacity between 5% and 50% n-butane at 25 C of less than about 50 g/L, or a combination thereof.

* * * * *